(12) United States Patent
Sabe et al.

(10) Patent No.: US 7,657,085 B2
(45) Date of Patent: Feb. 2, 2010

(54) INFORMATION PROCESSING APPARATUS AND METHOD, RECORDING MEDIUM, AND PROGRAM

(75) Inventors: Kohtaro Sabe, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 11/089,229

(22) Filed: Mar. 24, 2005

(65) Prior Publication Data

US 2005/0220336 A1    Oct. 6, 2005

(30) Foreign Application Priority Data

Mar. 26, 2004    (JP)    ............................. 2004-093001

(51) Int. Cl.
*G06K 9/62*    (2006.01)
*G05B 13/02*    (2006.01)

(52) U.S. Cl. ........................................ 382/159; 700/47
(58) Field of Classification Search ................. 382/159; 700/47
See application file for complete search history.

(56) References Cited

U.S. PATENT DOCUMENTS

| | | | |
|---|---|---|---|
| 6,144,755 A * | 11/2000 | Niyogi et al. | ................ 382/118 |
| 6,345,110 B1 * | 2/2002 | Niyogi et al. | ................ 382/118 |
| 7,050,607 B2 * | 5/2006 | Li et al. | ........................ 382/118 |
| 2002/0102024 A1 | 8/2002 | Jones et al. | |
| 2003/0108244 A1 * | 6/2003 | Li et al. | ........................ 382/227 |
| 2003/0110147 A1 * | 6/2003 | Li et al. | ........................... 706/1 |

OTHER PUBLICATIONS

Li, S, Zhu, L, Zhang, Z, Blake, A, Zhang, HJ, Shum, H: "Statistical Learning of Multi-View Face Detection" Lecture Notes in Computer Science—Proc. $7^{TH}$ Intl Conf. in Computer Vision, vol. 2353, May 27, 2002, pp. 67-81, XP002367708 Copenhagen ISBN: 3-540-43748-7.

Yimin Wu et al: "Adaptive pattern discovery for interactive multimedia retrieval" Proceedings 2003 IEEE Conference on Computer Vision and Pattern Recognition. CVPR 2003. Madison, WI, Jun. 18-20, 2003, Proceedings of the IEEE Computer Conference on Computer Vision and Pattern Recognition, Los Alamitos, CA, IEEE Comp. Soc, US, vol. vol. 2 of 2, Jun. 18, 2003, pp. 649-655, XP010644798 ISBN: 0-7695-1900-8.

(Continued)

*Primary Examiner*—Bhavesh M Mehta
*Assistant Examiner*—Hadi Akhavannik
(74) *Attorney, Agent, or Firm*—Frommer Lawrence & Haug LLP; William S. Frommer; Ellen Marcie Emas

(57) ABSTRACT

In an information processing apparatus, such as an image processing apparatus, positive samples and negative samples are learned by a number of weak classifiers. During learning by the weak classifiers, a value of weighted majority is calculated as a sum of products of the results of classification by the respective weak classifiers and associated weights, and a learning threshold is also calculated. When the number of negative samples is greater than or equal to one half of the number of positive samples, negative samples for which the value of weighted majority is less than the learning threshold are removed.

10 Claims, 37 Drawing Sheets

OTHER PUBLICATIONS

Blum A L et al: "Selection on relevant features and examples in machine learning" Artificial Intelligence, Elsevier Science Publisher B.V., Amsterdam, NL. vol. 97, No. 1-2, Dec. 1997, pp. 245-271, XP002263360 ISSN: 0004-3702.

Schapire Robert E et al.: "Improved boosting algorithms using confidence-rated predictions" Proceedings of the 11$^{TH}$ Annual Conference on Computational Learning Theory. Colt '98. Madison, WI, Jul. 24 - 26, 1998; [Annual Conference on Computational Learning Theory], New York, NY: ACM, US, vol. 37, No. 3, Jul. 24, 1998, pp. 297-336, XP002444449 ISBN: 978-0-581-13057-0.

Shakhnarovich G et al: "A unified learning framework for real time face detection and classification" Automatic Face and Gesture Recognition, 2002. Proceedings. Fifth IEEE, International Conference on, IEEE, Piscataway, NJ, USA, May 20, 2002, pp. 16-23, XP010949330 ISBN: 978-0-7695-1602-8.

* cited by examiner

FIG. 25

```
s:=0
for t=1:K          # LOOP
        d:=d_t(x)    # CALCULATION OF WEAK HYPOTHESIS
        s:=s+(d>0)*α(t)    # d>0 RETURNS 1 IF TRUE
        if (s<R_M)              AND 0 IF FALSE
                break
        end
return s:
```

FIG. 27

```
s:=0
for t=1:k   #LOOP
        d:=d_t(x)  # CALCULATION OF
                   # WEAK HYPOTHESIS
        if(d>0)
                s:=s+α_t·d
        else
                s:=s−α_t·d
        end
        if (s<R_M(t))
                break
        end
end
return s;
```

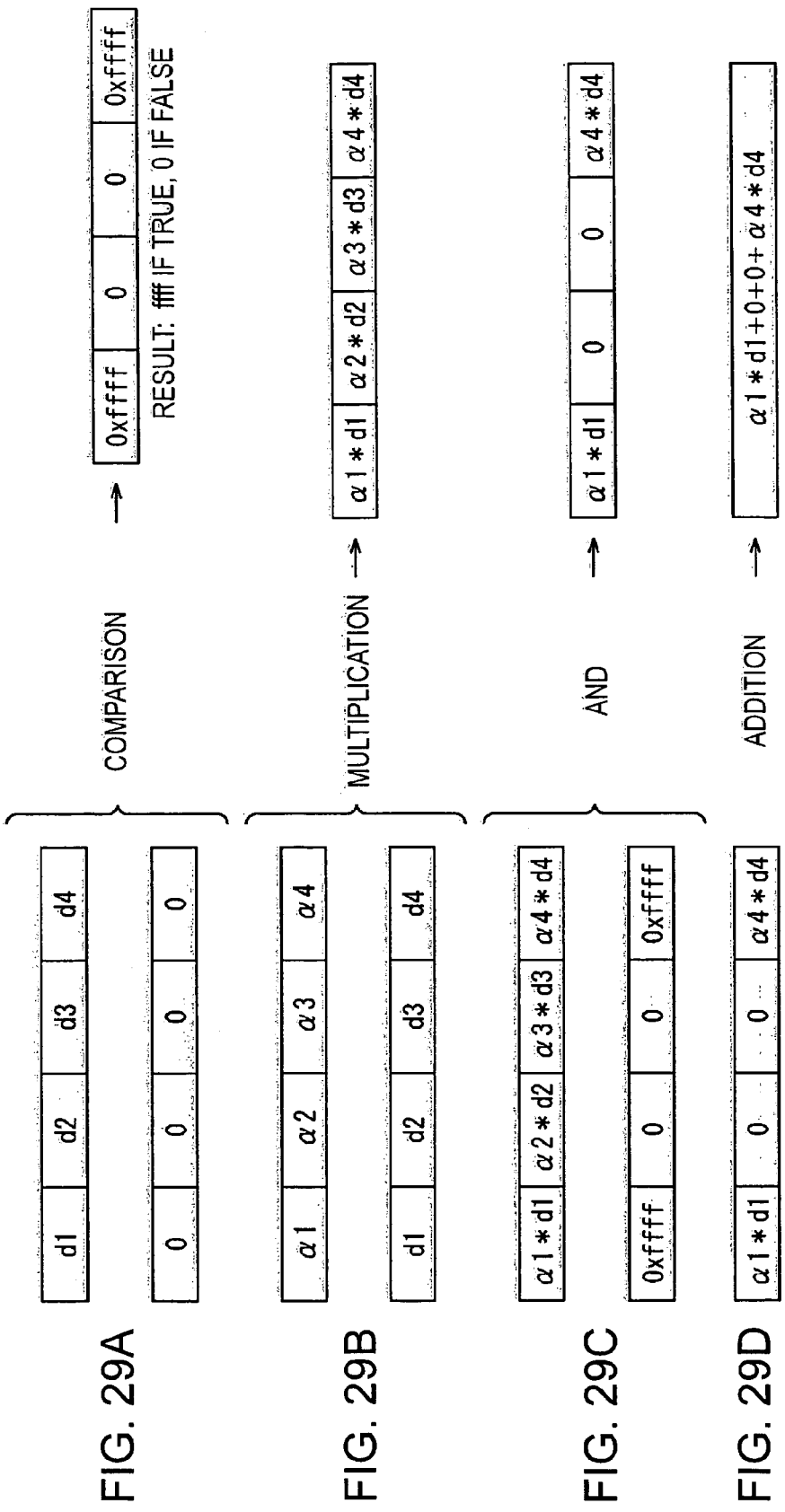

FIG. 37

| METHOD | TOTAL NUMBER OF WEAK HYPOTHESES | RATIO OF CORRECT CLASSIFICATION | RATIO OF INCORRECT CLASSIFICATION | NUMBER OF TIMES OF EVALUATING WEAK HYPOTHESES (NEGATIVE, POSITIVE) |
|---|---|---|---|---|
| ADABOOST | 405 | | | 405 |
| ADABOOST CASCADE | 253 | 98.9% | 0.88% | 31.6, 251.2 |
| ADABOOST REJECT LEARNING | 117 | 97.9% | 0.61% | 17.9, 115.6 |

INFORMATION PROCESSING APPARATUS AND METHOD, RECORDING MEDIUM, AND PROGRAM

BACKGROUND OF THE INVENTION

1. Field of the Invention

The present invention relates to information processing apparatuses and methods, recording media, and programs. More specifically, the present invention relates to an information processing apparatus and method, a recording medium, and a program that allow quick detection of an object of interest, such as a face image.

2. Description of the Related Art

Hitherto, various techniques for detecting faces from complex video scenes based only on grayscale patterns of image signals without considering motion have been proposed. For example, a face detector described in U.S. Unexamined Patent Application Publication No. 2002/0102024 employs AdaBoost, which uses filters, such as Haar-basis filters, as weak classifiers (weak learners). The face detector is capable of quickly calculating weak hypotheses using integral images and rectangle features described later.

FIGS. 1A to 1D are schematic diagrams showing rectangle features described in U.S. Unexamined Patent Application Publication No. 2002/0102024. As shown in FIGS. 1A to 1D, according to the techniques described in the document, a plurality of filters (weak hypotheses), regarding input images 142A to 142D, calculates the respective sums of luminance values in adjacent rectangular boxes of the same size and outputs the difference between the respective sums of luminance values in the two rectangular boxes. For example, regarding the input image 142A, a filter 154A that subtracts the sum of luminance values in a rectangular box 154A-2, shown as shaded, from the sum of luminance values in a rectangular box 154A-1 is constructed. Such a filter based on two rectangular boxes is referred to as a 2-rectangle feature.

Regarding the input image 142C, a rectangular box is divided into three rectangular boxes 154C-1 to 154C-3, and a filter 154C that subtracts the sum of luminance values in the middle rectangular box 154C-2, shown as shaded, from the sum of luminance values in the rectangular boxes 154C-1 and 154C-3 is constructed. Such a filter based on three rectangular boxes is referred to as a 3-rectangle feature. Regarding the input image 142D, a rectangular box is divided vertically and horizontally into four rectangular boxes 154D-1 to 154D-4, and a filter 154D that subtracts the sum of luminance values in the rectangular boxes 154D-2 and 154D-4, shown as shaded, from the rectangular boxes 154D-1 and 154D-3 is constructed. Such a filter based on four rectangular boxes is referred to as a 4-rectangle feature.

Now, an example of classifying a face image shown in FIG. 2 as a face using a rectangle feature 154B shown in FIG. 1B will be described. The 2-rectangle feature 154B is vertically divided into two rectangular boxes 154B-1 and 154B-2, and the sum of luminance values in the rectangular box 154B-1, shown as shaded, is subtracted from the sum of luminance values in the rectangular box 154B-2. Based on the fact that a region of an eye has a lower luminance value than a region of the cheek, it is possible to estimate at a certain probability whether the input image of a human face (object of interest) 138 corresponds to a face or not (positive or negative) based on an output value of the rectangular feature 154B. This is used as a weak classifier in AdaBoost.

In order to allow detection of face regions of various sizes included in input images, regions of various sizes (hereinafter referred to as search windows) must be cut out to determine whether images correspond to faces. However, for example, in the case of an input image consisting of 320×240 pixels, face regions (search windows) of approximately 50,000 sizes are included, and it takes an extremely long time to perform calculation for all the window sizes. Thus, according to U.S. Unexamined Patent Application Publication No. 2002/0102024, images referred to as integral images are used. As shown in FIG. 3, an integral image is such an image that a pixel (x, y) 162 in an input image 144 has a value corresponding to the sum of luminance values of pixels in a region that is left above the pixel 162, as expressed in expression (1) below. That is, the value of the pixel 162 is the sum of luminance values of pixels in a region 160 that is left above the pixel 162. Hereinafter, an image having pixel values according to expression (1) below will be referred to as an integral image.

$$I(x, y) = \sum_{x' < x, y' < y} S(x', y') \quad (1)$$

By using an integral image, it is possible to quickly perform calculation regarding a rectangular box of an arbitrary size. For example, as shown in FIG. 4, regarding an upper left rectangular box 170, a rectangular box 172 that is right to the rectangular box 170, a rectangular box 174 that is below the rectangular box 170, and a rectangular box 176 that is diagonally right below the rectangular box 170, let the four corners of the rectangular box 176 be denoted by $p_1$, $p_2$, $p_3$, and $p_4$ clockwise from the top left corner, and integral images thereof by P1, P2, P3, and P4. P1 corresponds to a sum A of luminance values in the rectangular box 170 (P1=A). P2 corresponds to the sum of the sum A and a sum B of luminance values in the rectangular box 172 (P2=A+B). P3 corresponds to the sum of the sum A and a sum C of luminance values in the rectangular box 174 (P3=A+C). P4 corresponds to the sum of the sums A, B, C and a sum D of luminance values in the rectangular box 176 (P4=A+B+C+D). The sum D of luminance values in the rectangular box 176 can be calculated by P4−(P2+P3)−P1. That is, the sum of luminance values in a rectangular box can be calculated quickly by adding or subtracting pixel values at the four corners of the rectangular box. Usually an input image is converted into different scales, and search windows having the same size as learning samples used for learning are cut out from the scaled images, allowing detection by search windows of different sizes. However, as described earlier, the amount of computation becomes huge when input images are scaled so that search windows of all sizes can be set. Thus, according to the techniques described in U.S. Unexamined Patent Application Publication No. 2002/0102024, integral images that allow quick calculation of the sums of luminance values in respective rectangular boxes are used, and the amount of computation is reduced by using rectangle features.

However, the face detector described in U.S. Unexamined Patent Application Publication No. 2002/0102024 is capable of detecting only objects of sizes that are integer multiples of the sizes of learning samples used for learning. This is because according to the techniques described in the document, instead of changing the size of search window by scaling an input image, an input image is converted into an integral image and face regions in different search windows are detected using the integral image. That is, since the integral image is discrete on a pixel-by-pixel basis, for example, when a window size of 20×20 is used, it is not possible to set a size of 30×30 for a search window, so that it is not possible to detect a face of this window size.

Furthermore, since only differences between luminance values of adjacent rectangular boxes are used as rectangle features in order to increase computation speed, it is not possible to recognize change in luminance between remote rectangular boxes. Thus, the ability of detecting objects is limited.

Although it is possible, for example, by scaling an integral image, to perform searching by a window of an arbitrary size and to use differences between luminance values in remote rectangular boxes, scaling an integral image increases the amount of computation, canceling the effect of increasing computation speed by using the integral image. Furthermore, in order to consider differences between luminance values in remote rectangular boxes, the number of filters needed becomes huge. This also increases the amount of computation.

SUMMARY OF THE INVENTION

The present invention has been made in view of the situation described above, and it is an object thereof to further increase computation speed during learning and detection when an object of interest is detected based on ensemble learning.

According to an aspect of the present invention, an information processing apparatus is provided. The information processing apparatus includes a selecting unit for selecting a weak classifier using data weights in each iteration of learning; a reference-value calculating unit for calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers; a removing unit for removing some of the learning samples based on the reference value calculated; a weight calculating unit for calculating data weights based on the learning samples that have not been removed; and a reflecting unit for reflecting the data weights calculated by the weight calculating unit on selection of a weak classifier by the selecting unit in a next iteration of learning.

The reference-value calculating unit may accumulate values obtained by weighting positive results of classification by the weak classifiers by the confidences associated with the respective weak classifiers.

The reference-value calculating unit may calculate the cumulative sums in parallel.

The reference-value calculating unit may calculate a classification reference value that is used when discrimination is performed using the weak classifiers that have been learned, the reference-value calculating unit also calculates a learning reference value that is less than the discrimination reference value, and the removing unit removes learning samples with reference to the learning reference value.

The weak classifiers may calculate results of classification based on a difference between a threshold and a difference between values of two pixels in image data of the learning samples.

According to another aspect of the present invention, an information processing method is provided. The information processing method includes a selecting step of selecting a weak classifier using data weights in each iteration of learning; a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers; a removing step of removing some of the learning samples based on the reference value calculated; a weight calculating step of calculating data weights based on the learning samples that have not been removed; and a reflecting step of reflecting the data weights calculated in the weight calculating step on selection of a weak classifier in the selecting step in a next iteration of learning.

According to another aspect of the present invention, a recording medium having recorded thereon a computer-readable program is provided. The program includes a selecting step of selecting a weak classifier using data weights in each iteration of learning; a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers; a removing step of removing some of the learning samples based on the reference value calculated; a weight calculating step of calculating data weights based on the learning samples that have not been removed; and a reflecting step of reflecting the data weights calculated in the weight calculating step on selection of a weak classifier in the selecting step in a next iteration of learning.

According to another aspect of the present invention, a program is provided. The program allows a computer to execute a selecting step of selecting a weak classifier using data weights in each iteration of learning; a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers; a removing step of removing some of the learning samples based on the reference value calculated; a weight calculating step of calculating data weights based on the learning samples that have not been removed; and a reflecting step of reflecting the data weights calculated in the weight calculating step on selection of a weak classifier in the selecting step in a next iteration of learning.

According to the present invention, a weak classifier is selected using data weights in each iteration of learning. Then, a reference value is calculated based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers. Then, some of the learning samples are removed based on the reference value calculated. Then, data weights calculated based on the learning samples that have not been removed are reflected on selection of a weak classifier in a next iteration of learning.

According to the present invention, it is possible to detect faces in real time. Particularly, the speed of learning and/or detection can be increased.

BRIEF DESCRIPTION OF THE DRAWINGS

FIG. 25 is a diagram :showing code corresponding to the process shown in FIG. 24;

FIG. 27 is a diagram showing code corresponding to the process shown in FIG. 26;

FIG. 29A to 29D are diagrams for explaining specific examples of parallel processing;

FIG. 37 is a diagram showing a comparison of results of discrimination based on AdaBoost, AdaBoost cascade, and AdaBoost reject learning.

DESCRIPTION OF THE PREFERRED EMBODIMENTS

Figure 15:
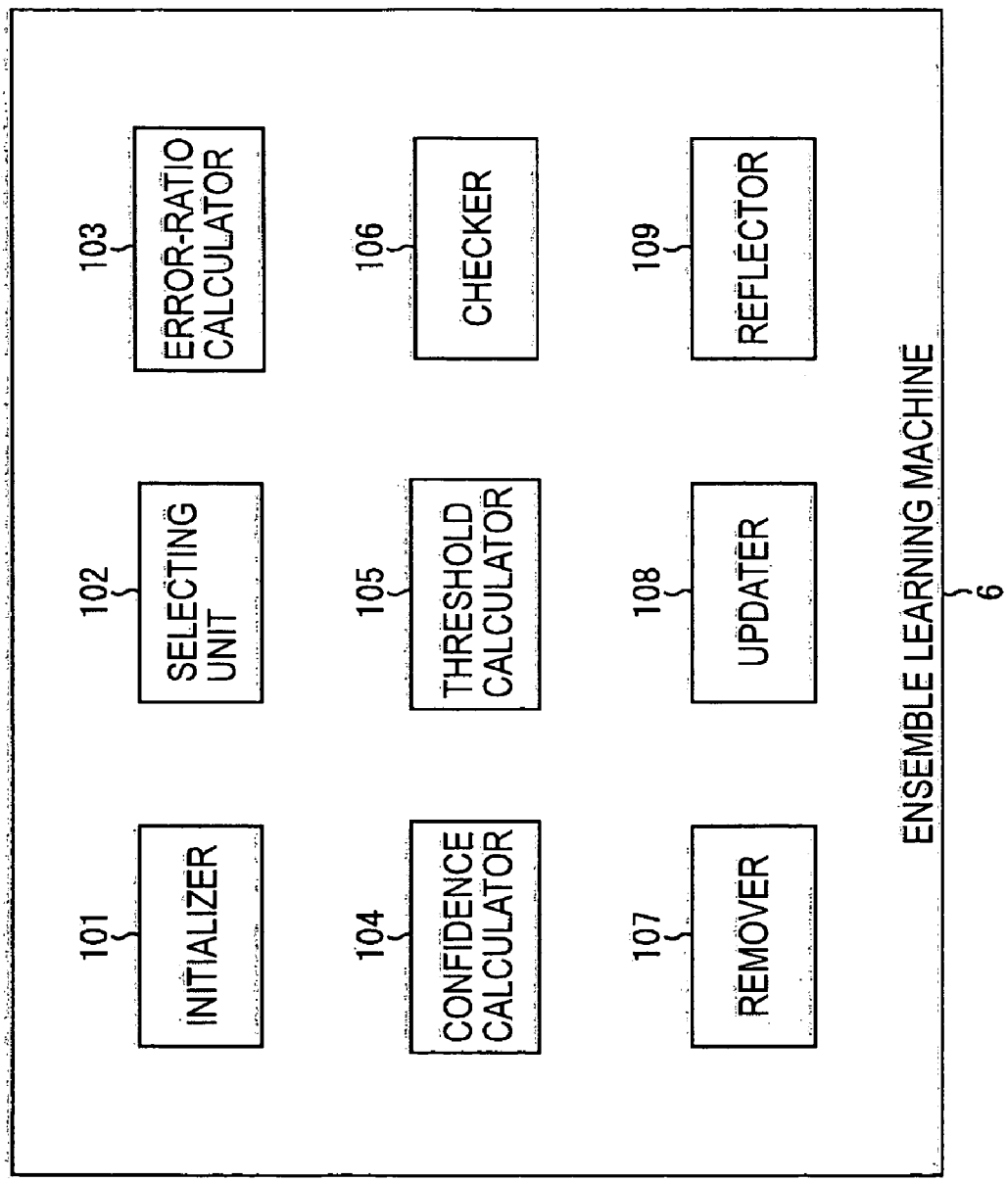
FIG. 15 is a block diagram showing an example functional construction of an ensemble learning machine.
Figure 16:
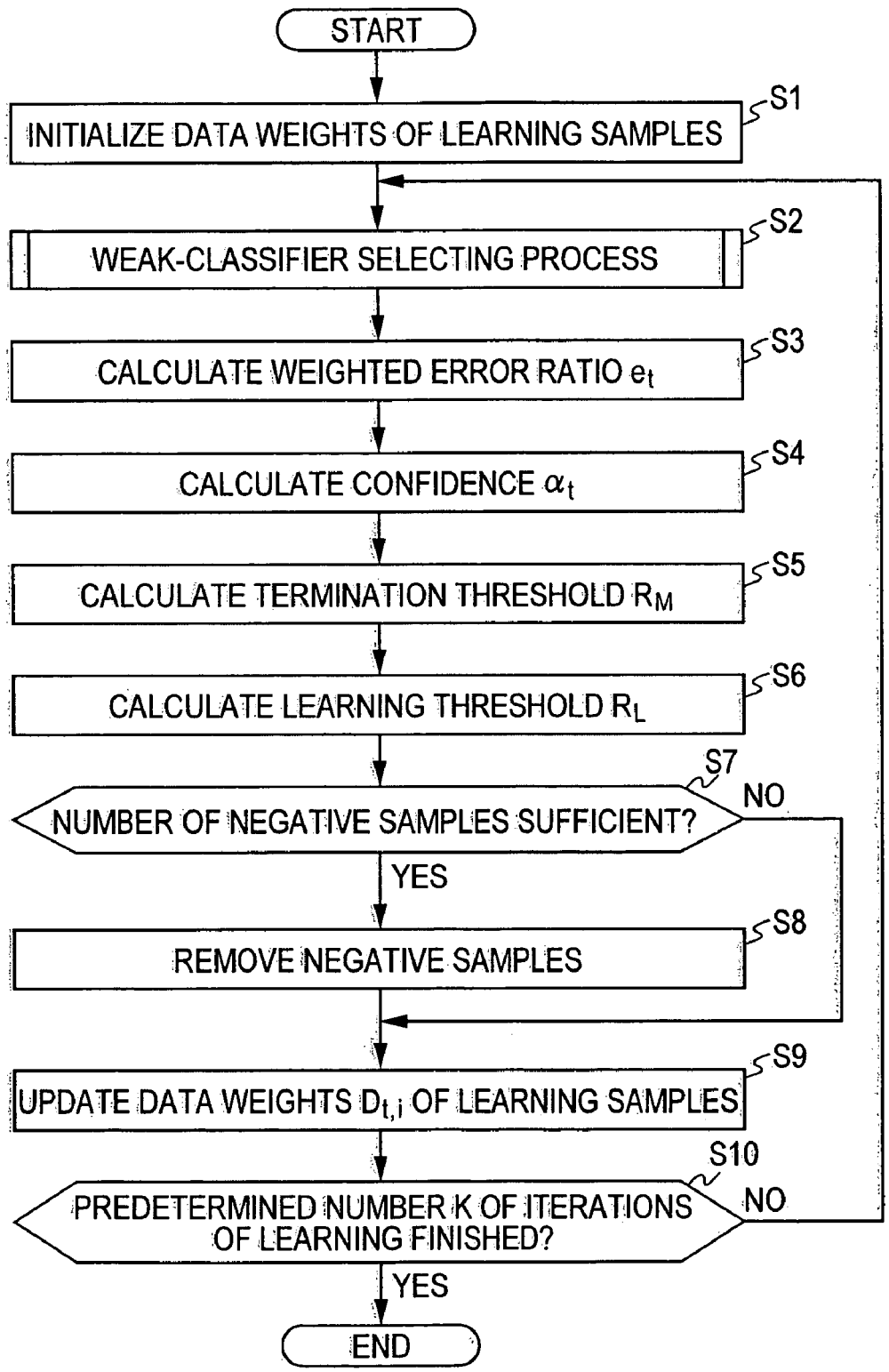
FIG. 16 is a flowchart of a method of learning by the ensemble learning machine.

An information processing apparatus according to the present invention includes a selecting unit (e.g., a selecting unit 102, shown in FIG. 15, for executing step S2 shown in FIG. 16) for selecting a weak classifier (e.g., weak classifiers $21_1$ to $21_K$ shown in FIG. 9) using data weights (e.g., data weights $D_t$ according to expression (9), expression (13), or expression (14)) in each iteration of learning; a reference-value calculating unit (e.g., a threshold calculator 105 shown in FIG. 15) for calculating a reference value (e.g., a discrimination threshold $R_M$ and a learning threshold $R_L$ in steps S5 and S6 shown in FIG. 16) based on cumulative sums (e.g., F(x) according to expression (7)) that are calculated for respective learning samples, the cumulative sums being calculated by accumulating values obtained by weighting results of classification of the respective learning samples by weak classifiers that have been selected, the weighting being based on confidences (e.g., $\Delta_t$ according to expression (11)) associated with the respective weak classifiers; a removing unit (e.g., a remover 107, shown in FIG. 15, for executing step S8 shown in FIG. 16) for removing some of the learning samples based on the reference value calculated; a weight calculating unit (e.g., an updater 108, shown in FIG. 15, for executing step S9 shown in FIG. 16) for calculating data weights based on the learning samples that have not been removed; and a reflecting unit (e.g., a reflector 109, shown in FIG. 15, for executing step S10 shown in FIG. 16) for reflecting the data weights calculated by the weight calculating unit on selection of a weak classifier by the selecting unit in a next iteration of learning.

Figure 24:
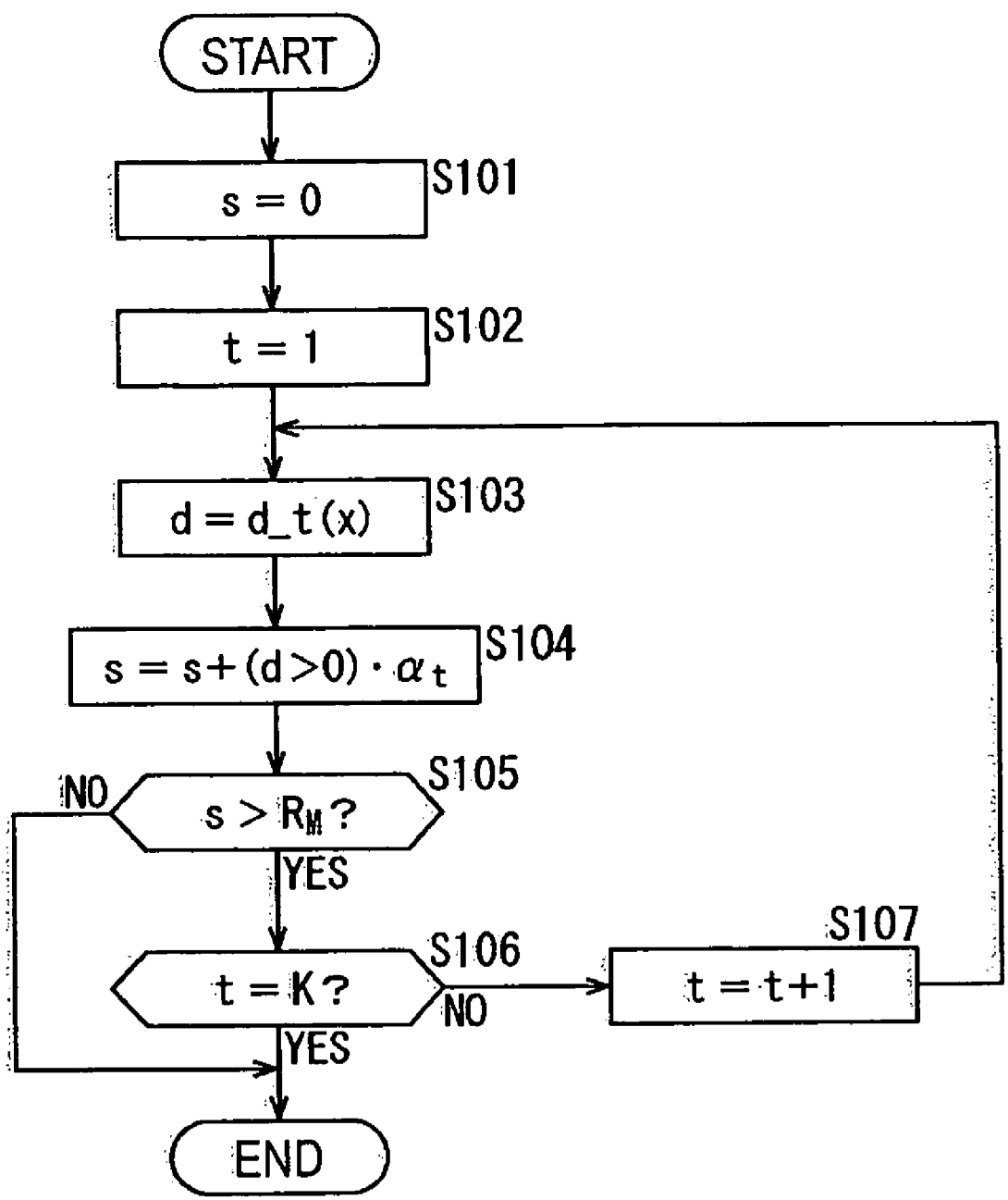
FIG. 24 is a flowchart of termination based on a termination threshold.

The reference-value calculating unit may accumulate values obtained by weighting positive results of classification by the weak classifiers by the confidences associated with the respective weak classifiers (e.g., step S104 shown in FIG. 24).

Figure 28:
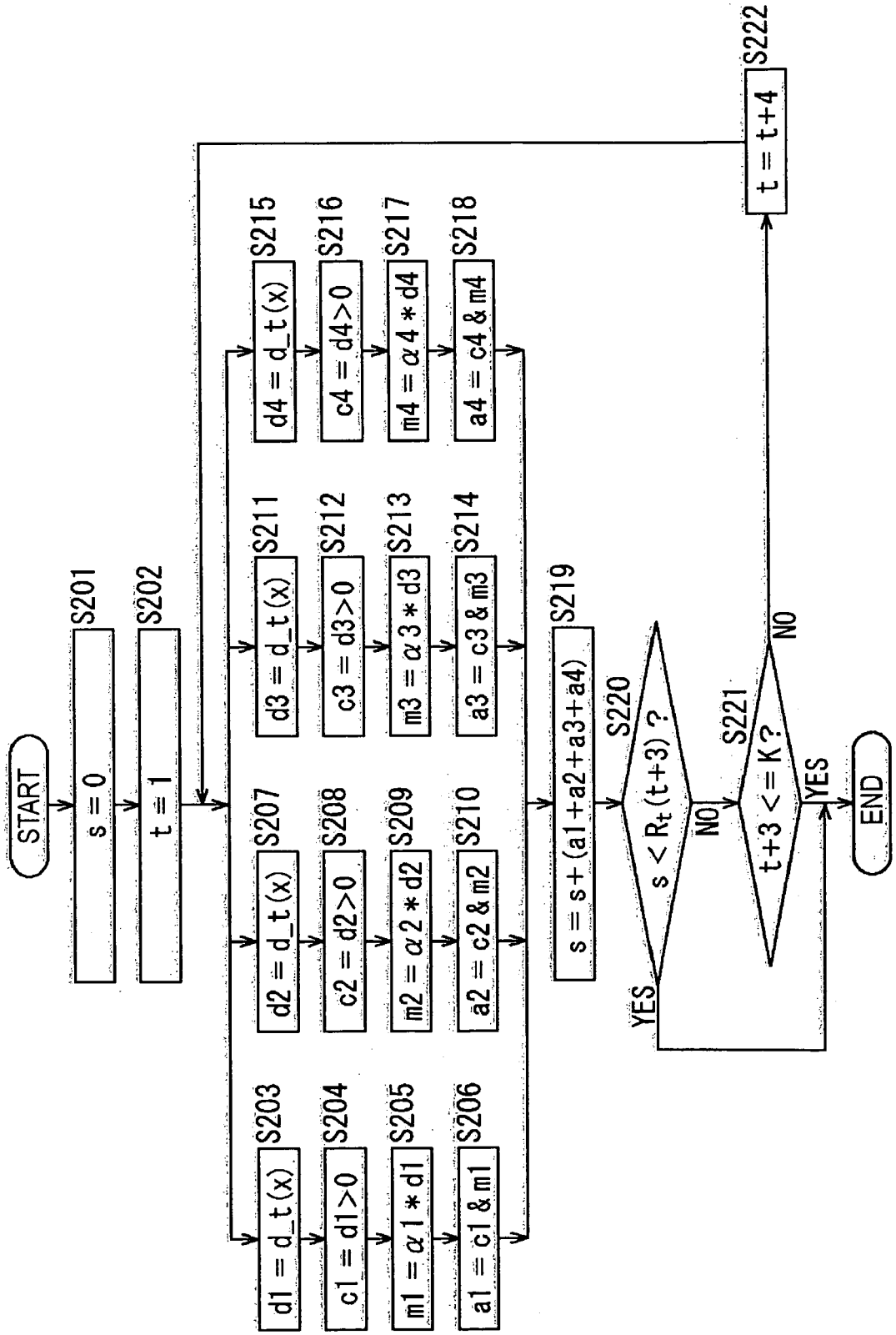
FIG. 28 is a flowchart of parallel processing based on a termination threshold.

The reference-value calculating unit may calculate the cumulative sums in parallel (e.g., steps S203 to S218 shown in FIG. 28).

The reference-value calculating unit may calculate a classification reference value (e.g., a discrimination threshold $R_M$ in step S5 shown in FIG. 16) that is used when discrimination is performed using the weak classifiers that have been learned, the reference-value calculating unit also calculates a learning reference value (e.g., a learning threshold $R_L$ in step S6 shown in FIG. 16) that is less than the discrimination reference value, and the removing unit removes learning samples with reference to the learning reference value (e.g., step S8 in FIG. 16).

Figure 20:
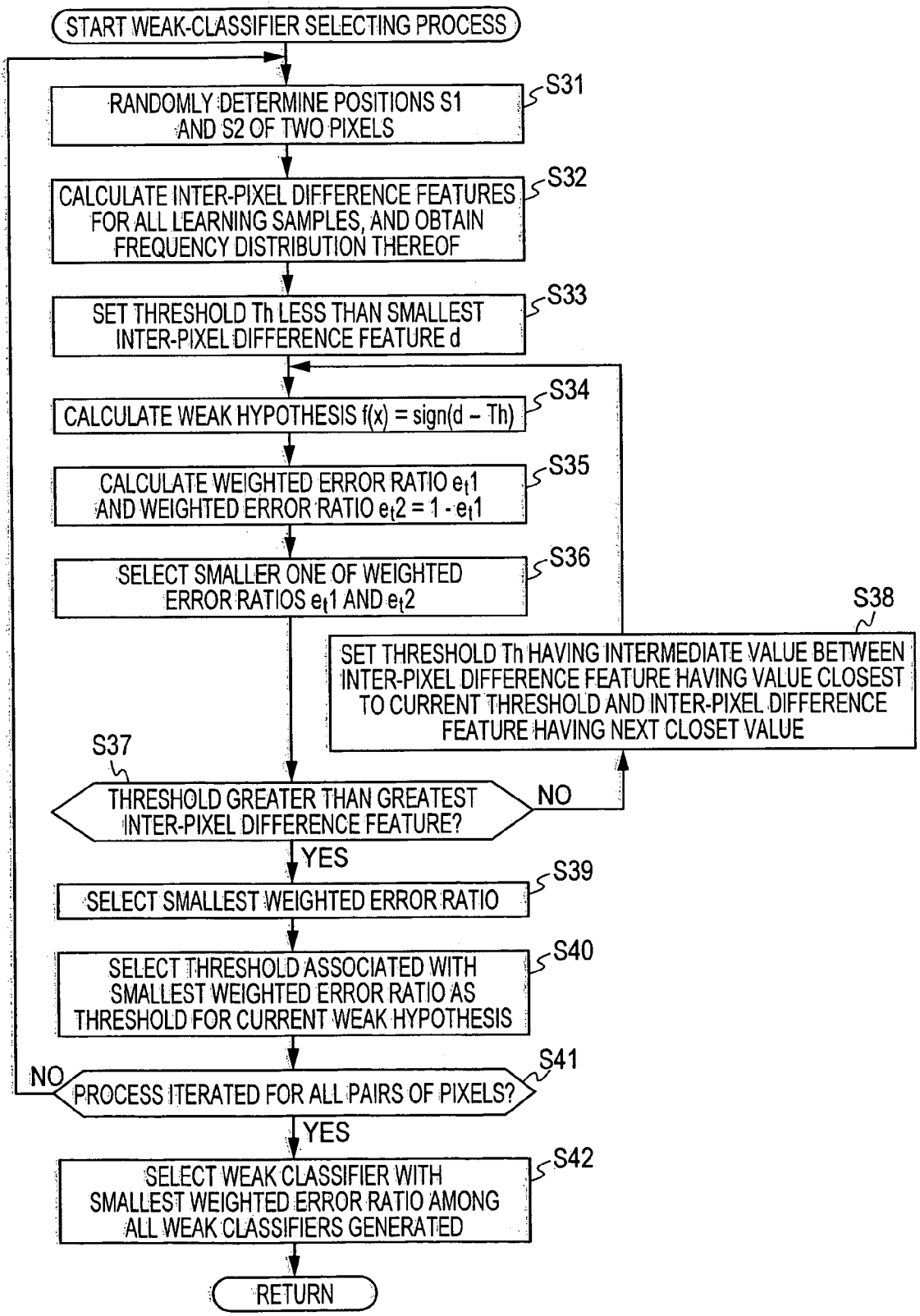
FIG. 20 is a flowchart of a selecting process executed by weak classifiers.

The weak classifiers may calculate results of classification based on a difference between a threshold (e.g., a threshold Th in step S34 shown in FIG. 20) and a difference (e.g., an inter-pixel difference feature d according to expression (2))

between values of two pixels in image data of the learning samples (e.g., step S34 shown in FIG. 20).

An information processing method, a program recorded on a recording medium, and a program according to the present invention includes a selecting step (e.g., step S2 shown in FIG. 16) of selecting a weak classifier (e.g., weak classifiers $21_1$ to $21_K$ shown in FIG. 9) using data weights (e.g., data weights $D_t$ according to expression (9), expression (13), or expression (14)) in each iteration of learning; a reference-value calculating step (e.g., steps S5 and S6 shown in FIG. 16) of calculating a reference value (e.g., a discrimination threshold $R_M$ and a learning threshold $R_L$ in steps S5 and S6 shown in FIG. 16) based on cumulative sums (e.g., F(x) according to expression (7)) that are calculated for respective learning samples, the cumulative sums being calculated by accumulating values obtained by weighting results of classification of the respective learning samples by weak classifiers that have been selected, the weighting being based on confidences (e.g., $\alpha_t$ according to expression (11)) associated with the respective weak classifiers; a removing step (e.g., step S8 shown in FIG. 16) of removing some of the learning samples based on the reference value calculated; a weight calculating step (e.g., step S9 shown in FIG. 16) of calculating data weights based on the learning samples that have not been removed; and a reflecting step (e.g., step S10 shown in FIG. 16) of reflecting the data weights calculated in the weight calculating step on selection of a weak classifier in the selecting step in a next iteration of learning.

Now, an embodiment of the present invention will be described in detail with reference to the drawings. In this embodiment, the present invention is applied to an information processing apparatus that functions as an object detecting apparatus for detecting an object of interest from an image through ensemble learning.

A learning machine that is obtained by ensemble learning is composed of a large number of weak hypotheses and a combiner for combining the weak hypotheses. An example of combiner that combines outputs of weak hypotheses with fixed weights irrespective of input is boosting. In boosting, using results of learning of previously generated weak hypotheses, the distribution of learning samples is modified so that weights of misclassified learning samples (examples) are increased, and learning of new weak hypotheses is performed based on the modified distribution. Thus, weights for objects that are difficult to learn to classify relatively increase, so that weak classifiers that lean to correctly classify learning samples with high weights, which are difficult to learn to classify, are progressively selected. In this case, weak hypotheses for learning are progressively generated, and weak hypotheses generated later depend on previously generated weak hypotheses.

When detecting an object of interest, results of classification by a large number of hypotheses progressively generated by learning as described above are used. For example, in the case of AdaBoost, all the results of classification (1 for objects of interest and −1 for objects not of interest) by the weak hypothesis (hereinafter referred to as weak classifiers) generated by learning are fed to a combiner. The combiner calculates the sum of the classification results weighted by confidences calculated during learning for the respectively associated weak classifiers to output a value of weighted majority, and determines whether the input image corresponds to an object of interest by evaluating the output of the combiner.

The weak classifiers determine whether an image corresponds to an object of interest based on certain features. As will be described later, the weak classifiers may output deterministic values as to whether an image corresponds to an object of interest, or probabilistic values representing the likelihood of being an object of interest. An ensemble learning machine in this embodiment uses weak classifiers that determine whether an image corresponds to an object of interest using very simple features, i.e., differences between luminance values of pairs of pixels (hereinafter referred to as inter-pixel difference features), allowing quick detection of an object of interest.

(1) Object Detecting Apparatus

Figure 1A:
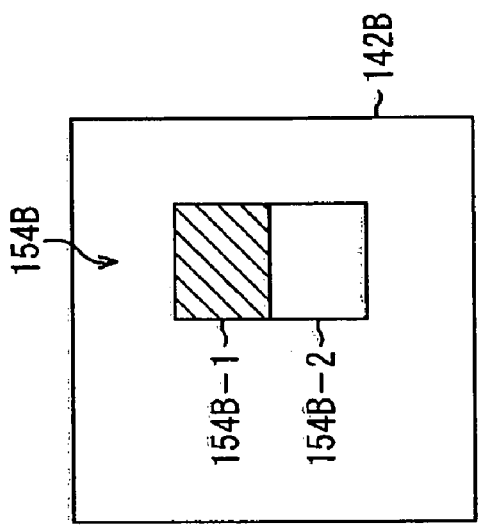
FIGS. 1A to 1D are schematic diagrams showing rectangle features used in the related art.
Figure 1B:
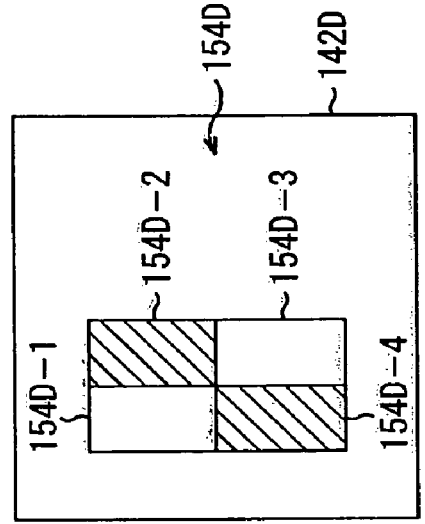
Figure 1C:
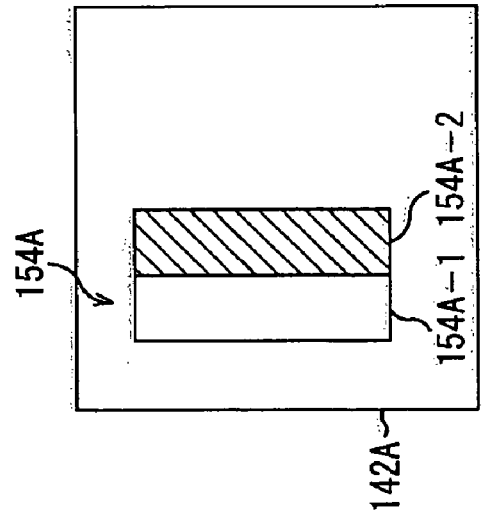
Figure 1D:
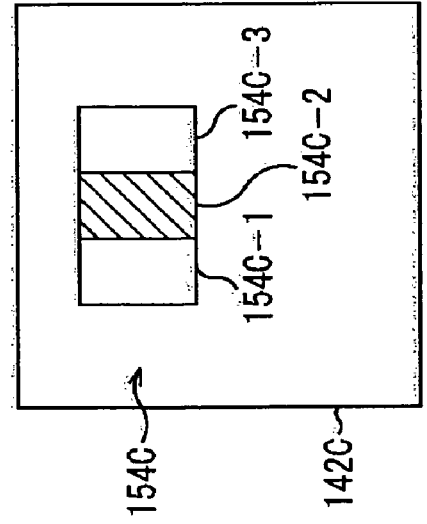
Figure 2:
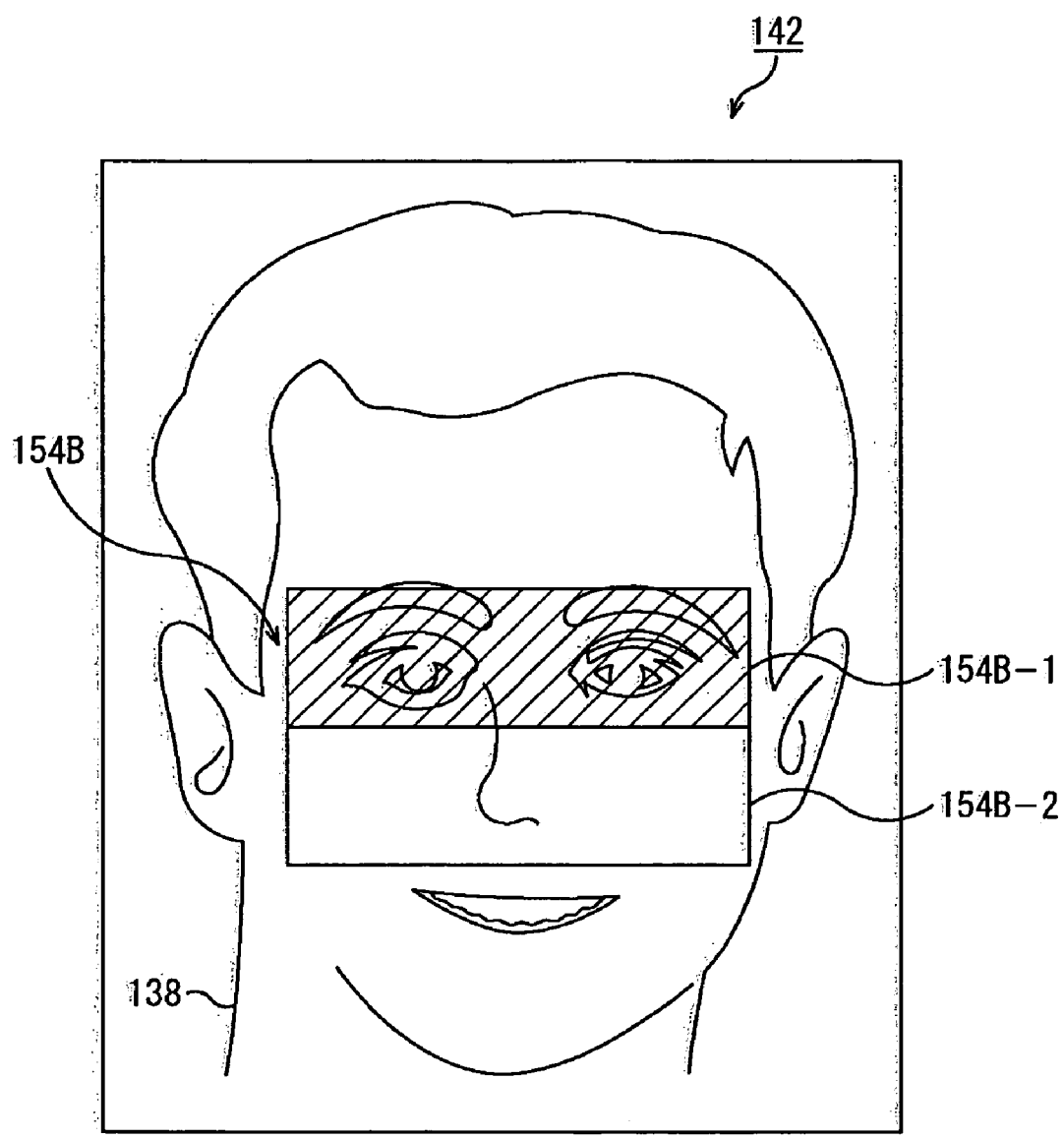
FIG. 2 is a diagram for explaining a method for classifying a face image using the rectangle features according to the related art.
Figure 3:
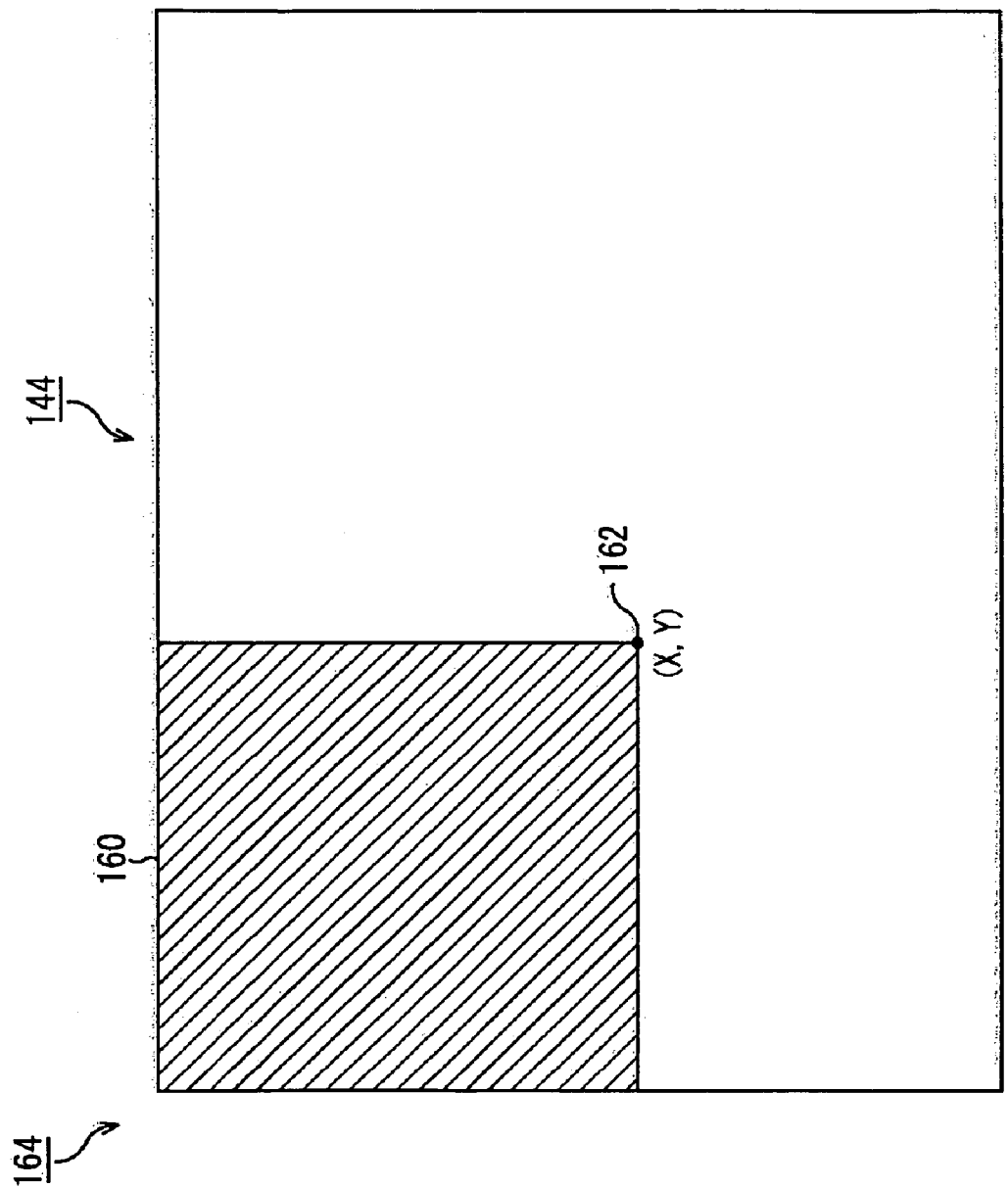
FIG. 3 is a schematic diagram showing an integral image used in the related art.
Figure 4:
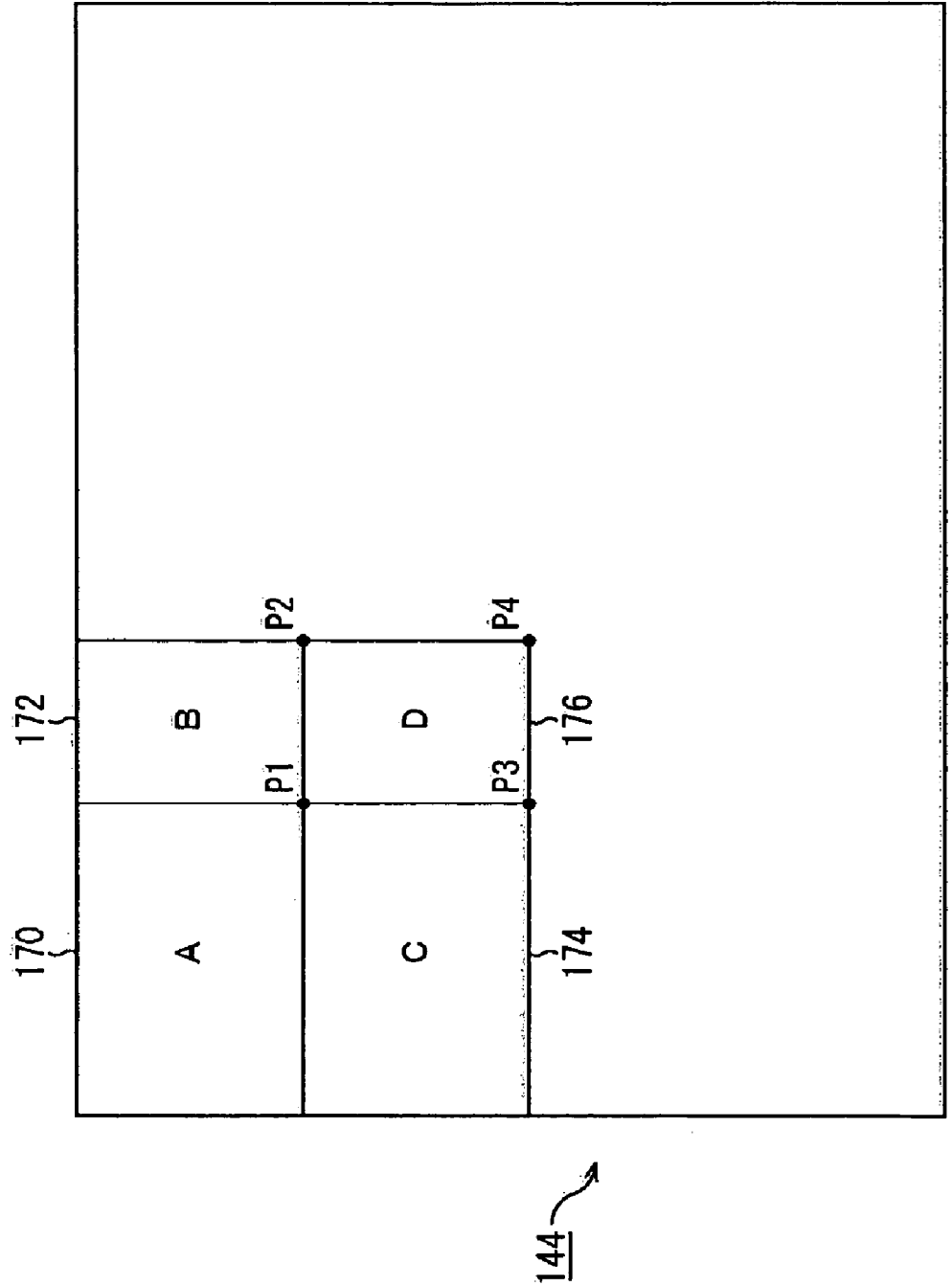
FIG. 4 is a diagram showing a method for calculating the sum of luminance values in a rectangular box using the integral image according to the related art.
Figure 5:
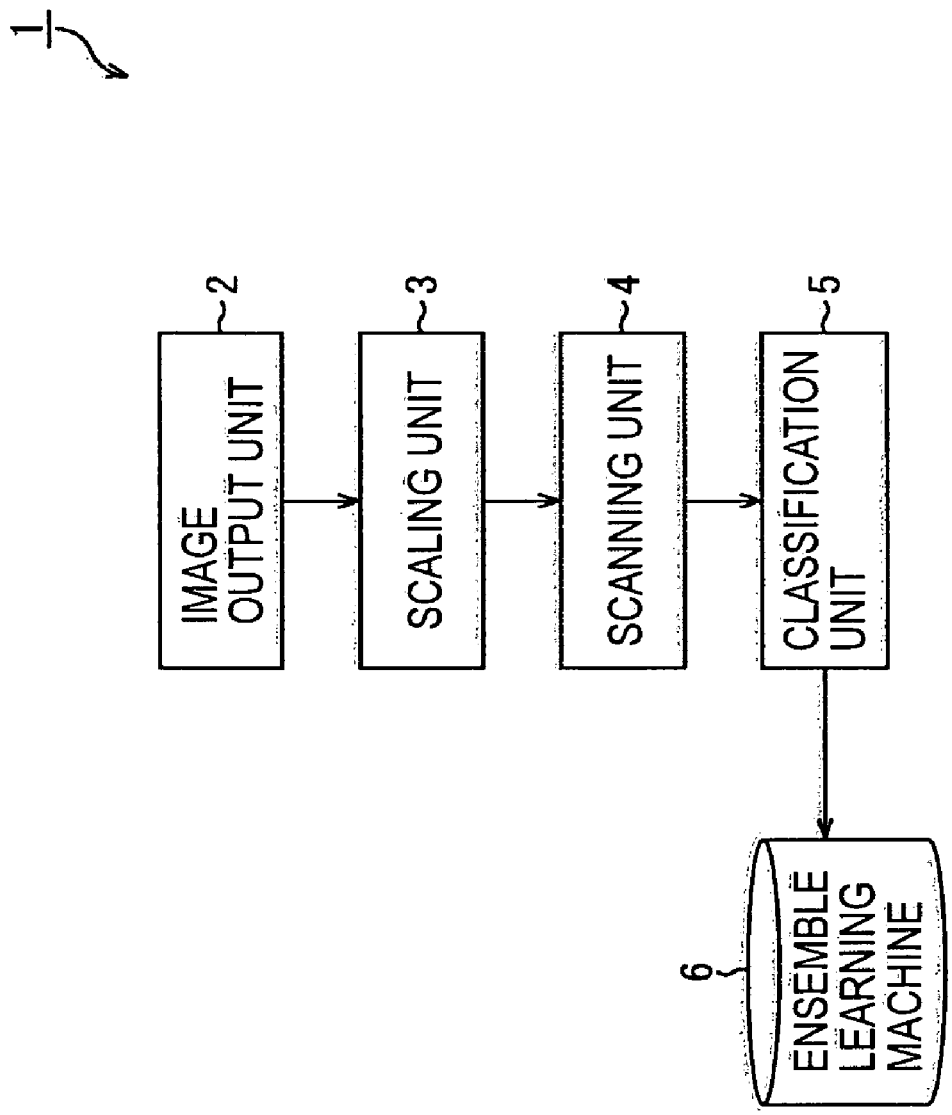
FIG. 5 is a functional block diagram showing processing functions of an object detecting apparatus according to an embodiment of the present invention.

FIG. 5 is a functional block diagram showing processing functions of an object detecting apparatus according to this embodiment. As shown in FIG. 5, an object detecting apparatus 1 includes an image output unit 2 for outputting a grayscale image (luminance image) as an input image, a scaling unit 3 for scaling, i.e., enlarging or reducing, the input image, a scanning unit 4 for sequentially scanning the scaled input image, for example, from top left to bottom right, using a window having a specified size, outputting an image in the window as a window image, and a classification unit 5 for classifying whether each window image obtained by sequential scanning by the scanning unit 4 corresponds to an object of interest or not. The object detecting apparatus 1 outputs a position and size of an object of interest, indicating a region of the object of interest in the input image.

The scaling unit 3 enlarges or reduces the input image to each specified scale to output scaled images. The scanning unit 4 sequentially scans each of the scaled images using a window of a size corresponding to the size of an object to be detected, thereby cutting out window images. The classification unit 5 classifies whether each of the window images corresponds to a face.

The classification unit 5, with reference to results of learning by an ensemble learning machine 6 that performs ensemble learning of a plurality of weak classifiers constituting the classification unit 5, classifies whether a current window image corresponds to an object of interest (e.g., an image of a face) or an object not of interest (e.g., an image that is not an image of a face).

The object detecting apparatus 1, when a plurality of objects is detected from the input image, outputs a plurality of pieces of region information. Furthermore, when some of the regions overlap each other among the plurality of regions, the object detecting apparatus 1 is capable of selecting one of the regions having the highest evaluation for the object of interest by a method described later.

The grayscale image output from the image output unit 2 is first input to the scaling unit 3. The scaling unit 3 reduces the image by bilinear interpolation. In this embodiment, instead of first generating a plurality of reduced images in the scaling unit 3, the scaling unit 3 repeats a process of outputting an image needed to the scanning unit 4 and generating a further reduced image only after processing of the previous image has been finished.

Figure 6:
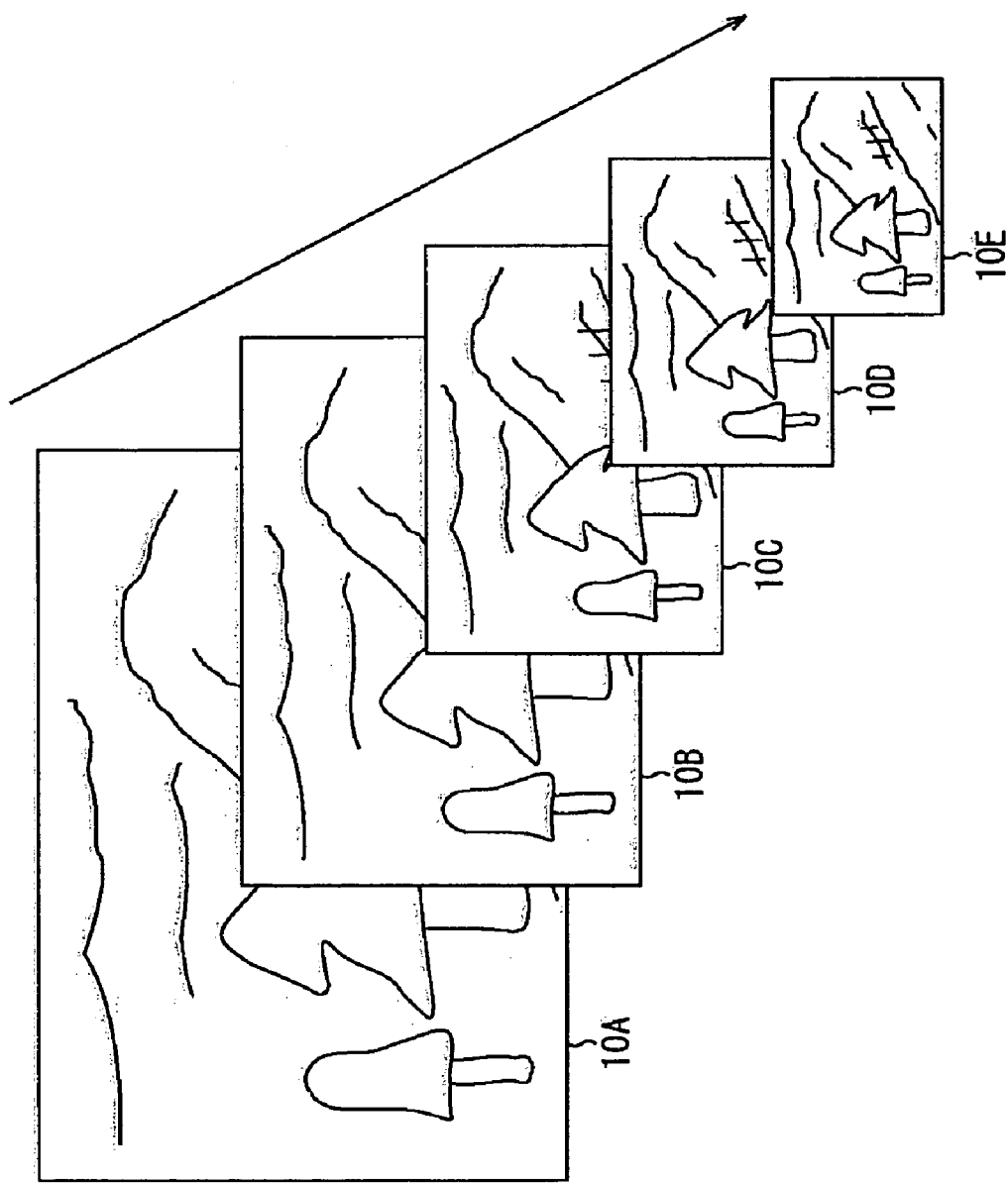
FIG. 6 is a diagram for explaining scale conversion.

That is, as shown in FIG. 6, the scaling unit 3 first outputs an input image 10A as it is to the scanning unit 4. Then, after processing of the input image 10A by the scanning unit 4 and the classification unit 5 is finished, the scaling unit 3 generates an input image 10B by reducing the size of the input image 10A. Furthermore, after processing of the input image 10B by the scanning unit 4 and the classification unit 5 is finished, the scaling unit 3 generates an input image 10C by further reducing the size of the input image 10B. Similarly, the scaling unit 3 progressively generates reduced images 10D, 10E, and so forth of increasingly reduced sizes until the size of a reduced image becomes smaller than the size of the window being used for scanning by the scanning unit 4. When the process is finished, the image output unit 2 outputs a next input image to the scaling unit 3.

Figure 7:
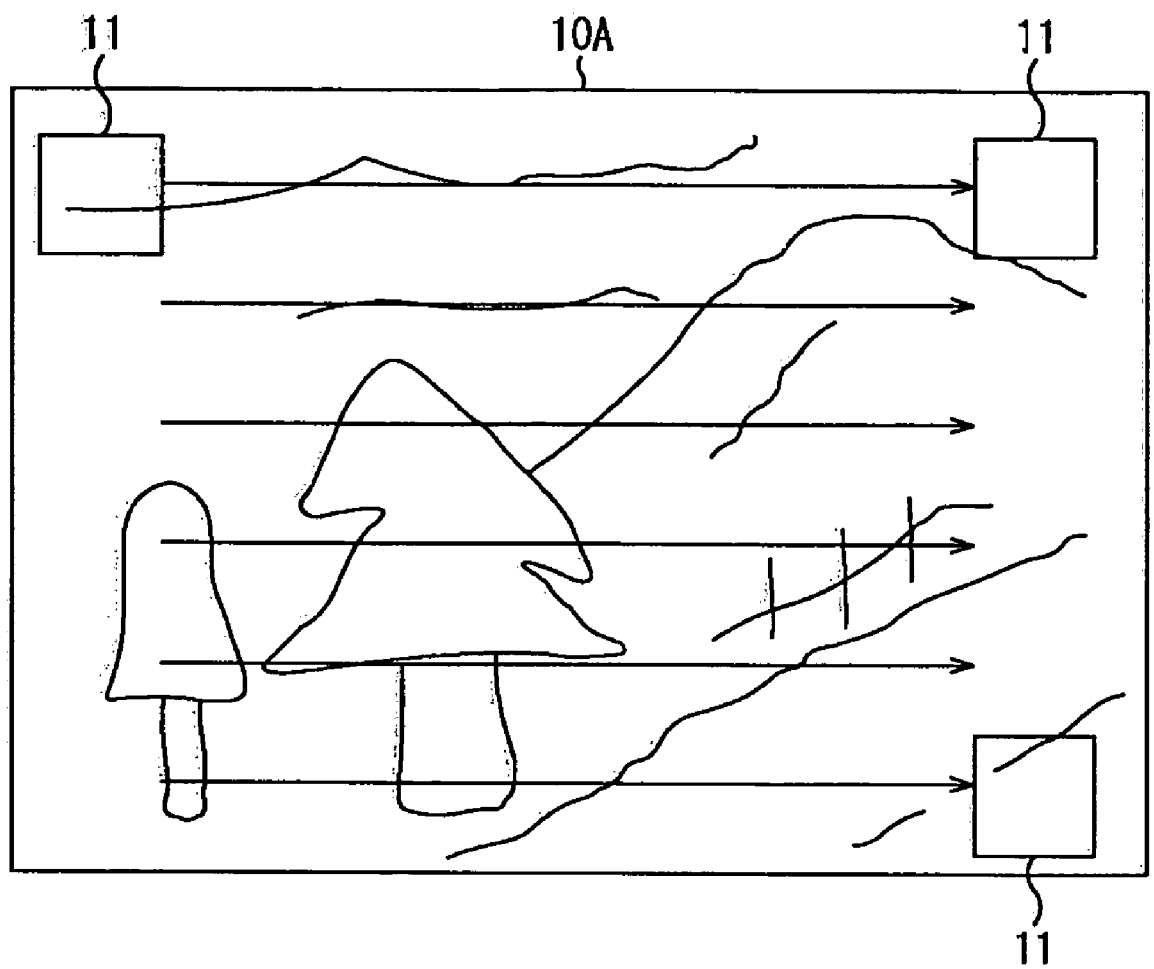
FIG. 7 is a diagram for explaining scanning using a search window.

As shown in FIG. 7, the scanning unit 4, for example, when the image 10A is fed thereto, sequentially applies to the entire image a window 11 having the same size as a window size S accepted by the classification unit 5 at the downstream thereof, outputting an image in the window 11 at each position (hereinafter referred to as a cutout image or a window image) to the classification unit 5.

Figure 8:
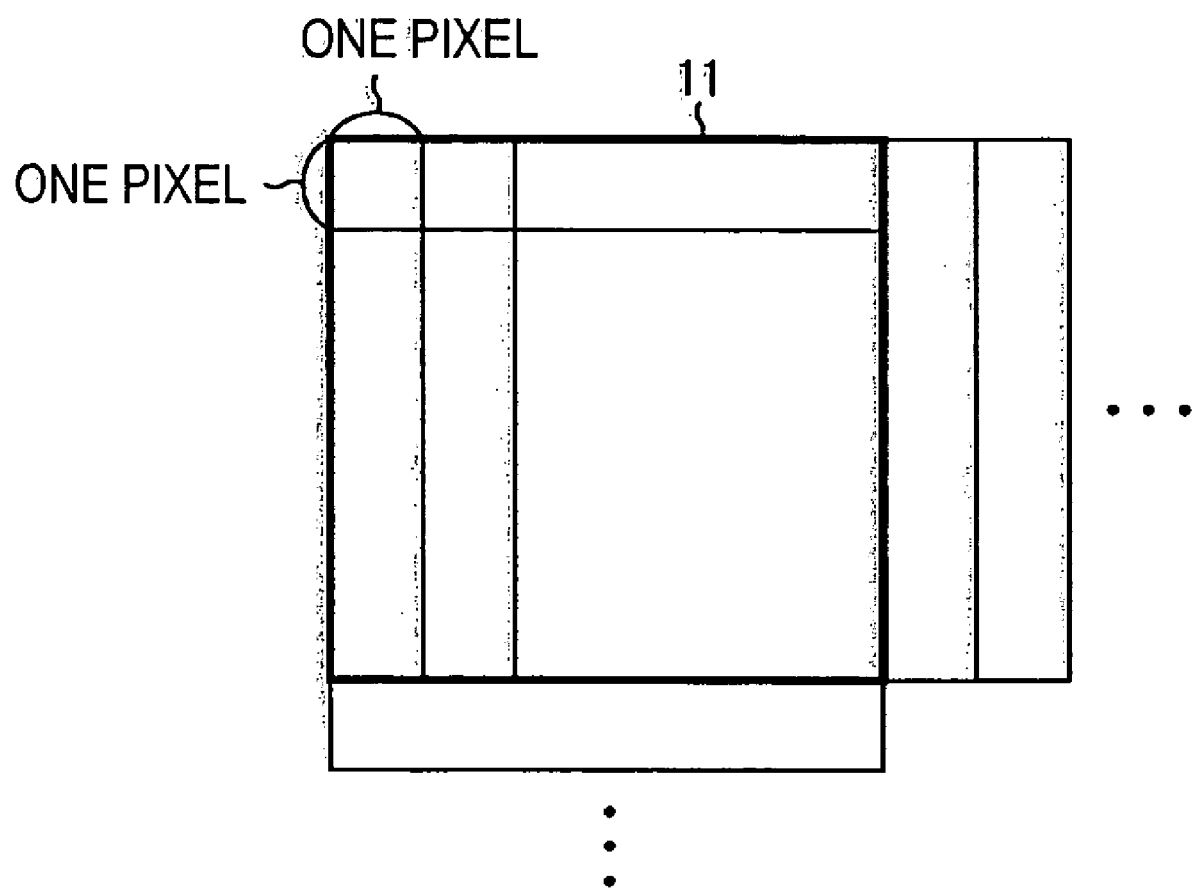
FIG. 8 is a diagram for explaining movement of a search window.

Scanning based on the window 11 is carried out on a pixel-by-pixel basis, as shown in FIG. 8. That is, after a cutout image in the window 11 at a given position is output from the scanning unit 4, the window 11 is shifted rightward by one pixel for a next scan so that a cutout image in the window 11 at the shifted position is fed to the classification unit 5.

Although the window size S is fixed, since the scaling unit 3 progressively reduces the size of the input image to various scales as described earlier, it is possible to detect an object of an arbitrary size.

That is, whatever the size of a face in an image, the size of the face in the image eventually becomes substantially the same as the window size S as the image size is increasingly reduced. Thus, it is possible to detect whether the image in the window 11 is an image of a human face or not.

Figure 9:
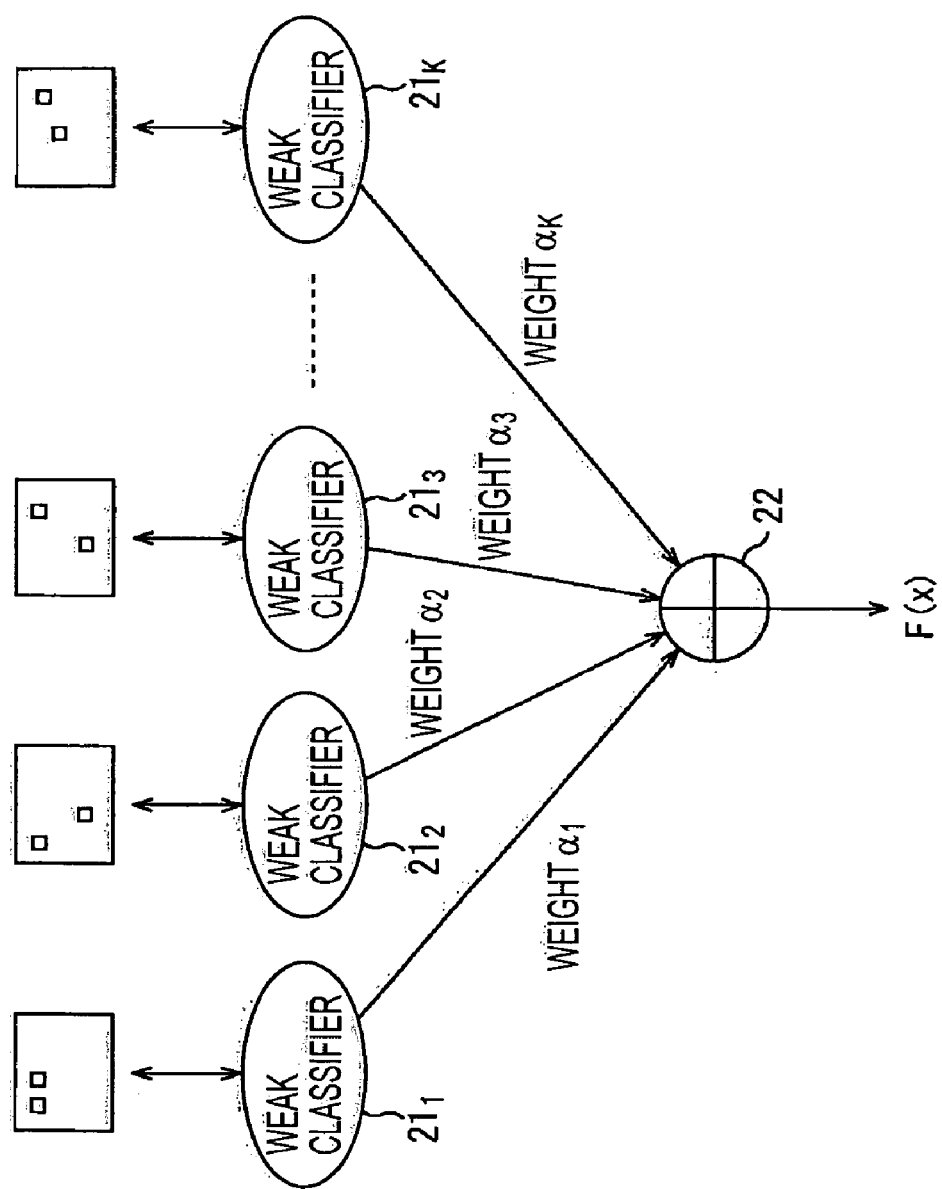
FIG. 9 is a diagram showing the construction of a classification unit.

The classification unit 5 classifies whether a cutout image fed from the upstream corresponds to an object of interest, e.g., a face. As shown in FIG. 9, the classification unit 5 is composed of a plurality of weak classifiers $21_i$ (i=1, 2, 3, ..., K) obtained by ensemble learning, and an adder 22 for calculating a value F(x) of weighted majority by multiplying outputs (classification results) of the respective classifiers $21_i$ with respectively associated weights $\alpha_i$ (i=1, 2, 3, ..., K).

Each of the weak classifiers $21_1$ to $21_K$ determines whether the image in the window 11 is an image of a human face based on two arbitrary pixels among the pixels in the window 11. K denotes the number of possible pairs of two pixels that can be chosen from the image in the window 11.

In the classification unit 5, the weak classifiers $21_i$ sequentially output estimation values f(x) as to whether the input window image corresponds to an object of interest, and the adder 22 calculates a value F(x) of weighted majority to yield an output. Based on the value F(x) of weighted majority, a determiner (not shown in FIG. 9) determines whether the window image corresponds to an object of interest.

The ensemble learning machine 6 learns in advance the weak learners $21_i$ and weights to be used to multiply outputs (estimation values) of the respective weak learners $21_i$, by ensemble learning described later. Ensemble learning may be performed by any method that allows majority calculation of results obtained by a plurality of classifiers. For example, ensemble learning based on boosting, such as AdaBoost, which weights data to calculate a value of weighted majority, may be used.

Each of the weak classifiers $21_i$ constituting the classification unit 5 uses the difference between luminance value of two pixels (an inter-pixel difference feature) as a feature for classification. Each of the weak classifiers $21_i$ compares a feature learned from learning samples including a plurality of grayscale images that are labeled in advance as to whether the image corresponds to an object of interest or not with a feature of the window image, deterministically or probabilistically outputting an estimation value as to whether the window image corresponds to an object or not.

The adder 22 multiplies estimation values obtained by the weak classifiers $21_i$ by weights that serve as confidences of the respective weak classifiers $21_i$, and outputs the sum of the results (a value of weighted majority). In the case of Ada-Boost, the plurality of weak classifiers $21_i$ sequentially calculates estimation values, and a value of weighted majority is progressively updated accordingly. The plurality of weak classifiers is progressively generated by ensemble learning by the ensemble learning machine 6 according to an algorithm described later using learning samples, and the weak classifiers calculate estimation values, for example, in the order of generation. The weights (confidences) used for weighted majority are learned in a learning process for generating weak classifiers, which will be described later.

Each of the weak classifiers $21_i$, when it generates a binary output as in the case of AdaBoost, classifies an inter-pixel difference feature into two classes on the basis of a threshold for classification as to whether the image corresponds to an object of interest. Alternatively, classification may be based on a plurality of thresholds. The weak classifiers may probabilistically output continuous values representing the likelihood indicating whether the image corresponds to an object of interest based on the inter-pixel difference feature. Features (thresholds) needed by the weak classifier $21_i$ for classification are also learned during learning according to the algorithm described above.

Furthermore, in this embodiment, at the time of calculating a value of weighted majority, without waiting for results of calculation by all the weak classifiers, calculation can be terminated even in the course of calculation when it is considered that the image does not correspond to an object of interest depending on the value calculated. For this purpose, a termination threshold (reference value) is learned in the learning process. By terminating calculation, the amount of computation for detection can be considerably reduced. Thus, it is possible to enter a process of classifying a next window image in the course of calculation without waiting for results of calculation by all the weak classifiers, allowing quick processing.

As described above, the classification unit 5 functions as a determiner for calculating a value of weighted majority as an evaluation value for determining whether a window image corresponds to an object of interest based on the evaluation value. Furthermore, each time one of the plurality of weak classifiers generated by learning in advance outputs an estimation value, the classification unit 5 updates the value of weighted majority obtained by multiplying evaluation values by weights for the respective weak classifiers obtained by learning and summing the results of multiplication. The classification unit 5 also controls whether to terminate calculation of estimation values on the basis of the termination threshold each time updating the value of weighted majority (evaluation value).

The classification unit 5 is generated by ensemble learning by the ensemble learning machine 6 according to a predetermined algorithm using learning samples. Now, description will first be directed to a method of ensemble learning by the ensemble learning machine 6, and then to a method of classifying an object in an input image using the classification unit 5 obtained by ensemble learning.

(2) Ensemble Learning Machine

The ensemble learning machine 6 performs ensemble learning according to a boosting algorithm using a plurality of weak classifiers as described above so that a strong classification can be obtained as a result. Although each of the weak classifiers is constructed very simply, having low ability of classifying face and non-face by itself, high ability of classification can be achieved by combining, for example, on the order of hundreds to thousands of weak classifiers. The ensemble learning machine generates weak classifiers using, for example, on the order of thousands of learning samples labeled in advance (i.e., correct classifications are assigned) including sample images of objects of interest and objects not of interest, e.g., face images and non-face images, by selecting (learning) a hypothesis according to a predetermined learning algorithm from a large number of learning models (combinations of hypotheses), determining a combination of weak classifiers. Although each of the weak classifiers has low classification ability by itself, a classifier having high classification ability can be obtained depending on selection and combination of weak classifiers. Thus, the ensemble learning machine 6 learns a combination of weak classifiers, i.e., selection of weak classifiers and weights on output values of the respective weak classifiers for calculating a value of weighted majority.

Next, a learning method used by the ensemble learning machine 6 to obtain an appropriate combination of a large number of classifiers according to a learning algorithm will be described. Before describing the learning method of the ensemble learning machine 6, leaning data that serves as features in this embodiment among learning data learned by ensemble learning, more specifically, inter-pixel difference features for constructing weak classifiers and a termination threshold (reference value) for terminating detection during a classification process (detection process) will be described.

(3) Construction of Weak Classifiers

The classification unit 5 in this embodiment is constructed of a plurality of weak classifiers. Each of the weak classifiers is constructed very simply so as to determine whether an input image corresponds to a face based on the difference between luminance values of two pixels selected from all the pixels in the input image (an inter-pixel difference feature). Thus, in a classification process, the weak classifiers calculate results of classification quickly. Images input to the weak classifiers in the learning process are learning samples, and images input to the weak classifiers in the classification process are window images cut-out from scaled images.

Figure 10:
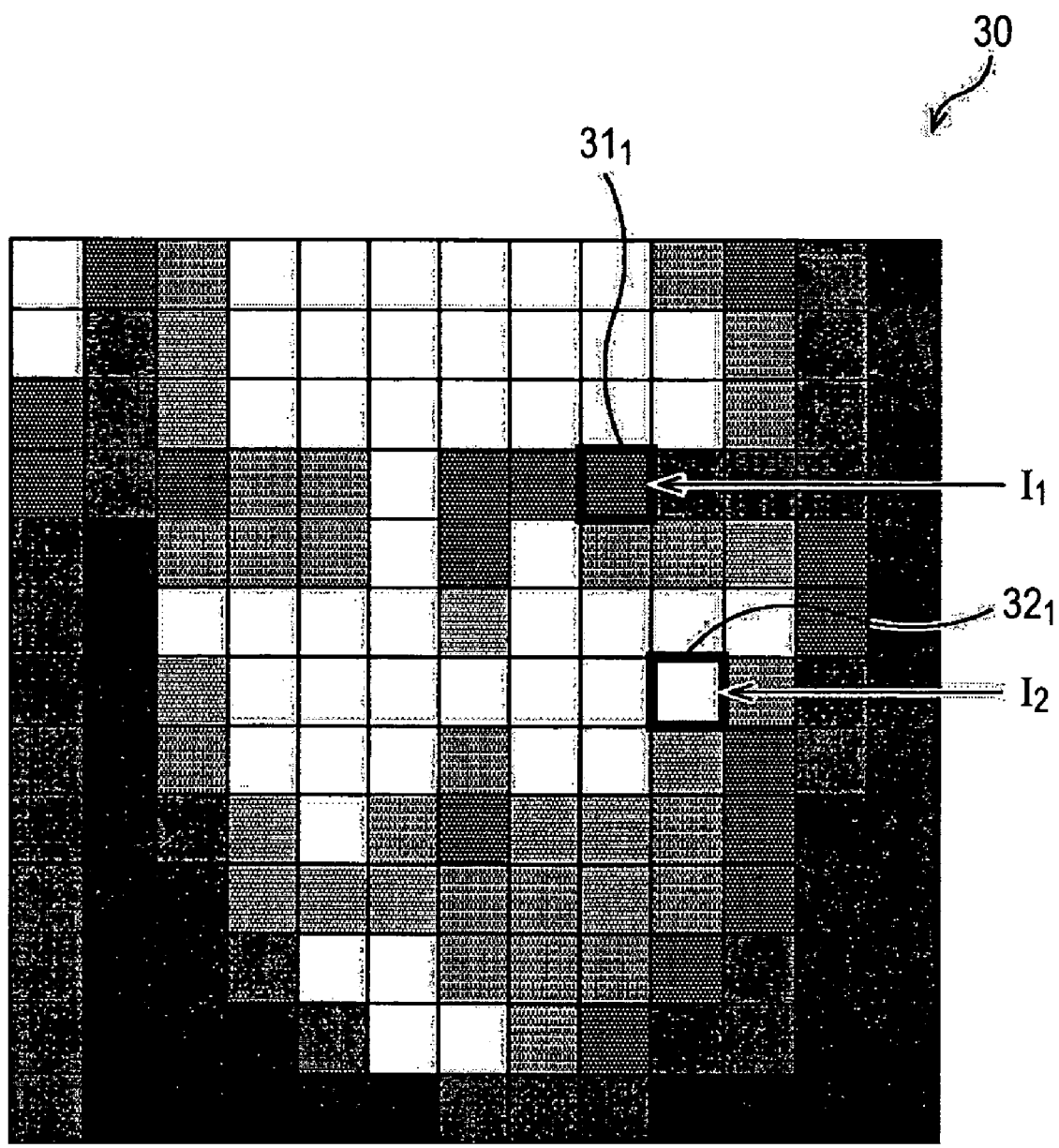
FIG. 10 is a diagram for explaining an inter-pixel difference feature.

FIG. 10 is a schematic diagram showing an image for explaining an inter-pixel difference feature. In an image 30, the difference between luminance values of arbitrarily chosen two pixels, e.g., the difference between a luminance value $I_1$ of a pixel 31 and a luminance value $I_2$ of a pixel 32, i.e., a value d expressed by expression (2) below, is defined as the inter-pixel difference feature:

$$d = I_1 - I_2 \quad (2)$$

The ability of each of the weak classifiers depends on which inter-pixel difference feature d is used for face detection. Thus, a pair of pixels used by each of the weak classifiers must be selected from combinations of arbitrary two pixels included in a sample image or a window image (referred to as a filter or a weak hypothesis).

For example, AdaBoost requires each weak classifier a deterministic output of "+1" (i.e., an object of interest) or "−1" (i.e., an object not of interest). Thus, in the case of AdaBoost, a weak classifier can be constructed by classifying an inter-pixel difference feature d of a pair of pixels at arbitrary positions into two classes (+1 and −1) using one or more thresholds.

In the case of a boosting algorithm that outputs continuous values (real values) representing the probability distribution of learning samples instead of outputting binary values, such as Real-AdaBoost or GentleBoost, a weak classifier outputs a likelihood (probability) of an input image corresponding to an object of interest. As described above, the output of a weak classifier may be either deterministic or probabilistic. Now, these two types of weak classifiers will be described.

(3-1) Binary-Output Weak Classifiers

A weak classifier that generates a deterministic output performs two-class classification as to whether an image corresponds to an object of interest based on the value of an inter-pixel difference feature d. Let the luminance values of two pixels in a target image region be denoted by $I_1$ and $I_2$, and a threshold for classifying the target image region as an object of interest or not based on the inter-pixel difference feature d by $Th_1$. Then, the class that the target image region belongs to can be determined according to whether expression (3) below is satisfied:

$$I_1 - I_2 > Th_1 \quad (3)$$

In order to construct a weak classifier, positions of two pixels and a threshold must be determined. A method for this purpose will be described later. Expression (3) above is used in a case of the simplest threshold check. Alternatively, threshold check may be based on two thresholds as expressed in expression (4) or expression (5) below:

$$Th_{11} > I_1 - I_2 > Th_{12} \quad (4)$$

$$I_1 - I_2 < Th_{21} \text{ or } Th_{22} > I_1 - I_2 \quad (5)$$

Figure 11A:
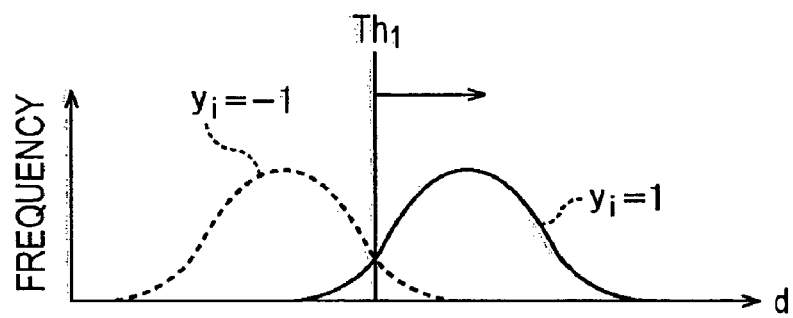
FIGS. 11A to 11C are diagram for explaining relationship between an inter-pixel difference feature and a threshold.
Figure 11B:
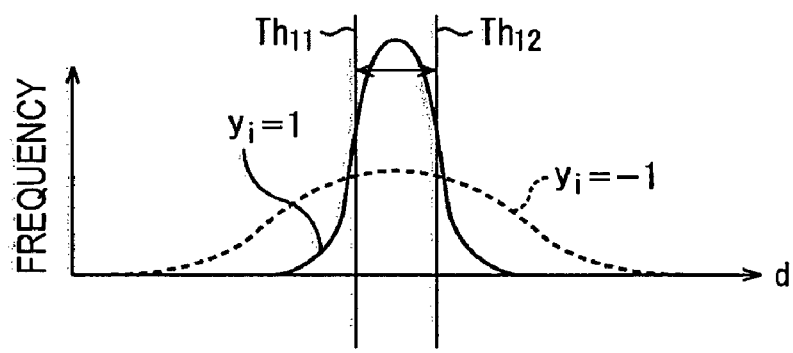
Figure 11C:
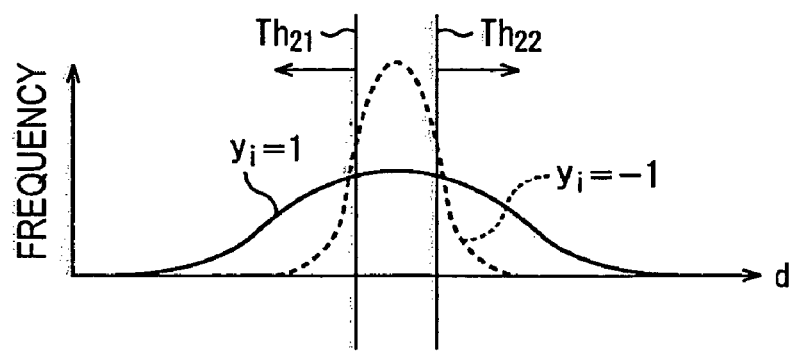

FIGS. 11A to 11C are schematic diagrams showing characteristic cases of the frequency distribution of data according to the three classification methods expressed in expressions (3) to (5) above, in which the vertical axes represent frequency and the horizontal axes represent inter-pixel difference feature d. In FIGS. 11A to 11C, $y_i$ denotes an output of a weak classifier, a broken line represents the distribution of learning samples classified as $y_i = -1$ (i.e., objects not of interest), and a solid line represents the distribution of learning samples classified as $y_i = 1$ (i.e., objects of interest). Histograms shown in FIGS. 11A to 11C are obtained by taking frequencies of the same values of inter-pixel difference feature d regarding learning samples including a large number of face images and non-face images.

Figure 12:
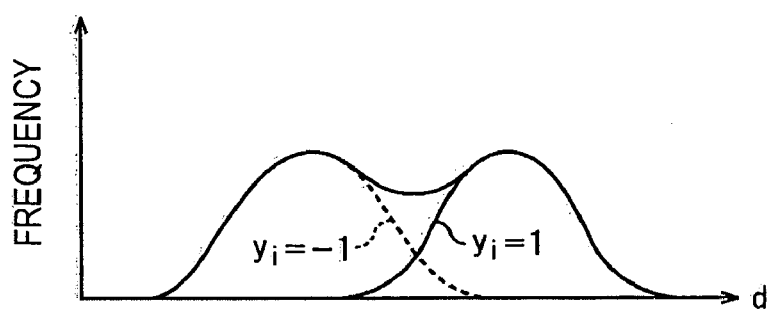
FIG. 12 is a diagram for explaining a frequency distribution.

The solid line and the broken line represent the distributions of learning samples classified as $y_i = 1$ and $y_i = -1$, respectively, independently of each other. Thus, the total distribution of inter-pixel difference feature d is as shown in FIG. 12.

For example, when the histogram is such that the distribution of objects not of interest as represented by the broken line and the distribution of objects of interest as represented by the solid line form similar normal curves with peaks thereof horizontally shifted with respect to each other as shown in FIG. 11A, a threshold $Th_1$ is set at a boundary therebetween so that it is possible to classify whether an image corresponds to an object of interest according to expression (3) above. For example, in the case of AdaBoost, letting an output (classification result) of a weak classifier be denoted by f(x), the output f(x)=1 (i.e., an object of interest) or f(x)=−1 (i.e., an object not of interest). FIG. 11A shows an example where it is determined that the image corresponds to an object of interest when the inter-pixel difference feature d is greater than the threshold $Th_1$ and the output of the weak classifier f(x)=−1.

When the peaks of the two histograms are located at substantially the same positions and the widths of the distributions thereof differ, using a value in the vicinity of an upper limit and a value in the vicinity of a lower limit of the inter-pixel difference feature d of the narrower distribution as thresholds, it is possible to classify whether the image corresponds to an object of interest according to expression (4) or (5) above. FIG. 11B shows an example where the image is classified as corresponding to an object of interest when the inter-pixel difference feature d is within the narrower distribution, and the output of the weak classifier is f(x)=1. FIG. 11C shows an example where the image is classified as corresponding to an object of interest when the inter-pixel difference feature d is in one of the ranges defined by excluding the narrower distribution from the wider distribution, and the output of the weak classifier is f(x)=1.

The weak classifier is constructed by determining an inter-pixel difference feature d and a threshold. The inter-pixel difference feature d must be chosen so that error ratio will be minimized, i.e., so that classification ratio will be high. For example, regarding labeled learning samples for two pixel positions are determined, a histogram such as the one shown in FIG. 11 is obtained, and a threshold is determined so that correct classification ratio will be maximized, i.e., so that incorrect classification ratio (error ratio) will be minimized. The two pixel positions are determined so that, for example, error ratio will be minimized in consideration of the threshold. In AdaBoost, however, data weights reflecting the degrees of difficulty of classification are assigned to the respective learning samples, and learning is performed so that weighted error ratio described later will be minimized by choosing an appropriate inter-pixel difference feature (choosing an appropriate pair of pixels whose luminance values are used to define a feature).

(3-2) Continuous-Output Weak Classifiers

A type of weak classifier that produces probabilistic outputs, such as Real-AdaBoost or GentleBoost, outputs continuous values as described earlier. In this case, in contrast to the case described above in which a classification problem is solved based on a predetermined threshold to produce a binary output (f(x)=1 or −1), the weak classifier outputs the likelihood of an input image corresponding to an object of interest, for example, in the form of a probability density function.

Let the probability density function of objects of interest in learning samples with input of inter-pixel difference features d be denoted by $P_P(x)$, and the probability density function of objects not of interest in the learning samples as $P_n(x)$. Then, the probabilistic output representing the likelihood (probability) of an image corresponding to an object of interest can be expressed by a function f(x) expressed in expression (6) below:

$$f(x)=P_P(x)-P_n(x) \quad (6)$$

Figure 13A:
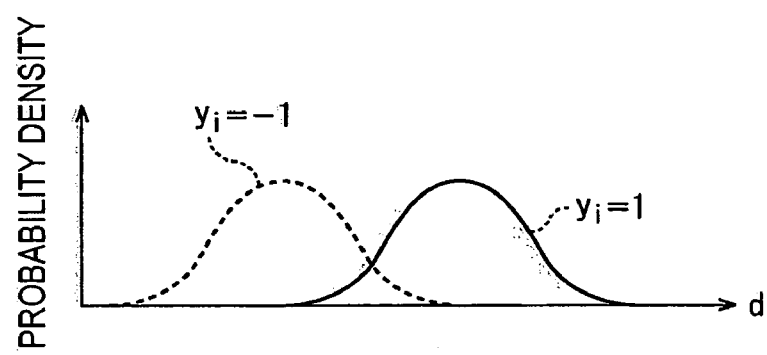
FIGS. 13A and 13B are diagrams for explaining inter-pixel difference features based on probability density.
Figure 13B:
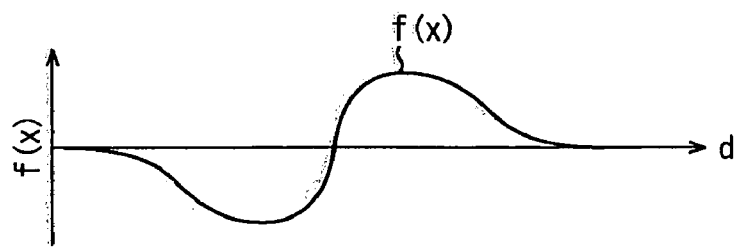

FIG. 13A is a diagram showing a case of a characteristic frequency distribution of data, in which the vertical axis represents probability density and the horizontal axis represent inter-pixel difference feature d. FIG. 13B is a graph showing the function f(x) for the data distribution shown in FIG. 13A, in which the vertical axis represents value of the function f(x) and the horizontal axis represents inter-pixel difference feature d. In FIG. 13A, the broken line represents the probability density of images corresponding to objects not of interest, and the solid line represents the probability density of images corresponding to objects of interest. Calculating the function f(x) according to expression (6) above yields the graph shown in FIG. 13B. The weak classifier outputs a function f(x) corresponding to the inter-pixel difference feature d according to expression (2) above, obtained from a learning sample or a window image input thereto into the learning process or the classification process. The function f(x) represents the likelihood of an image corresponding to an object of interest. For example, when an object not of interest corresponds to −1 and an object of interest corresponds to 1, the function f(x) is possible to take on continuous values between −1 to 1. For example, a table defining inter-pixel difference features d and corresponding values of f(x) is stored, and a value of f(x) corresponding to a given input is read and output. Thus, although the amount of storage needed becomes somewhat larger than the threshold $Th_1$ or the thresholds $Th_{11}$ and $Th_{12}$ or $Th_{21}$, and $Th_{22}$, classification performance is improved.

It is expected that classification performance is improved when these estimation methods (classification methods) are used in combination during ensemble learning. When only a single classification method is used, execution speed is increased.

The weak classifiers used in this embodiment are advantageous in that they are capable of quickly classifying objects as described above since features used (inter-pixel difference features d) are very simple. When faces are detected as objects of interest, very favorable classification results can be obtained based on the threshold check of the inter-pixel difference features d according to expression (3), which is simplest among the classification methods described above. Which classification method is suitable for the weak classifiers to work effectively varies depending on the problem in question, and a method of setting a threshold is suitably chosen in each case. Furthermore, depending on the nature of the problem, instead of difference between luminance values of two pixels, difference among luminance values of three or more pixels may be used as a feature.

(4) Termination Threshold

Now, a termination threshold will be described. In an ensemble learning machine based on boosting, usually, whether a window image corresponds to an object of interest is determined by calculating a value of weighted majority based on the outputs of all the weak classifiers constituting the classification unit 5. The value of weighted majority is calculated by progressively summing up results of classification (estimation values) by the weak classifiers. For example, letting the number of weak classifiers be denoted by t (=1, . . . , K), majority weights (confidences) for the respective weak classifies by $\Delta_t$, and the outputs of the respective weak classifiers by $f_t(x)$, the value F(x) of weighted majority in the case of AdaBoost can be calculated according to expression (7) below:

$$F(x) = \sum_t \alpha_t f_t(x) \quad (7)$$

Figure 14:
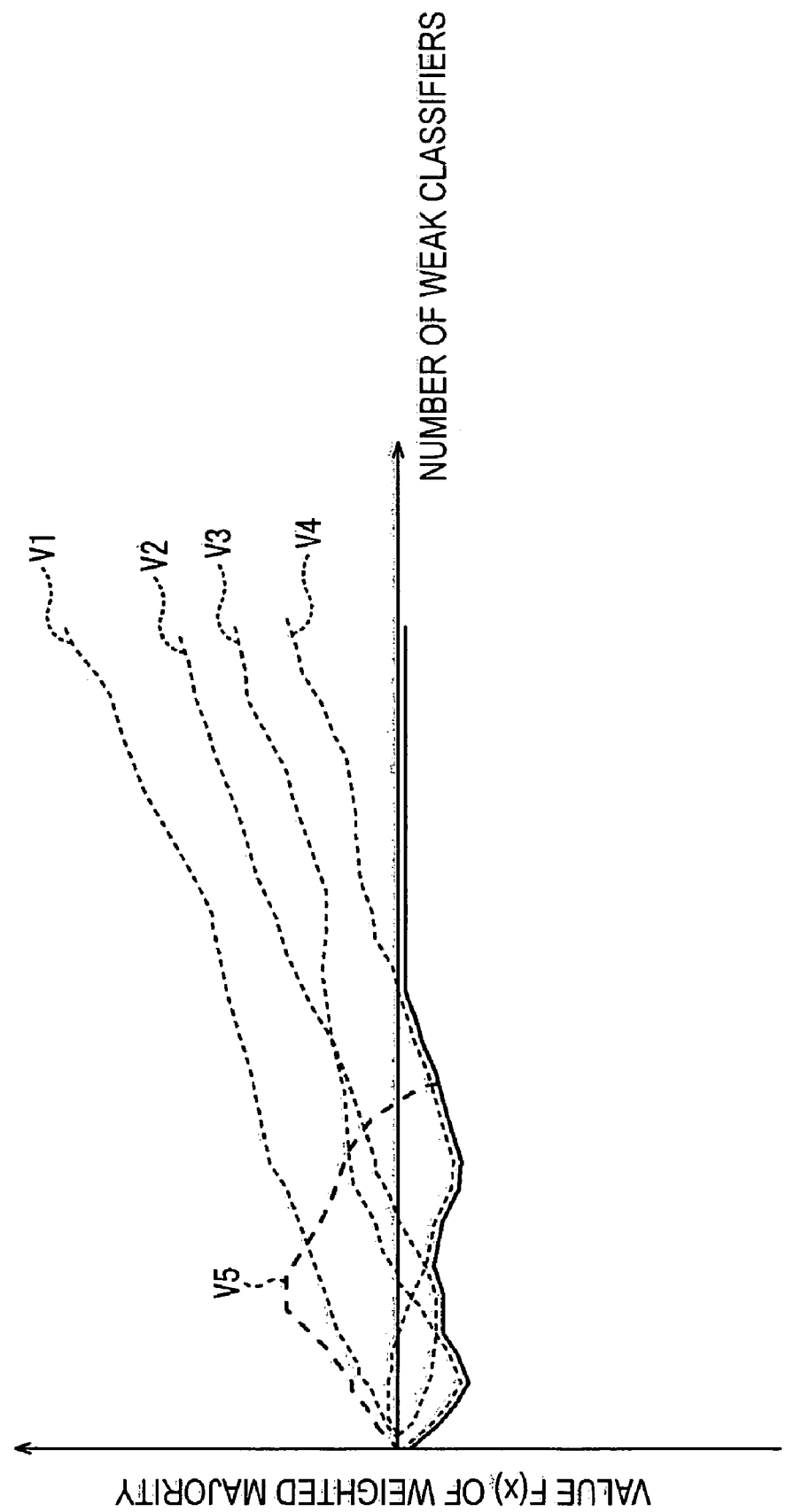
FIG. 14 is a diagram showing change in the value F(x) of weighted majority.

FIG. 14 is a graph showing how the value F(x) of weighted majority according to whether an input image corresponds to an object of interest changes, in which the horizontal axis represents the number of weak classifiers and the vertical axis represents the value F(x) of weighted majority according to expression (7) above. In FIG. 14, data $V_1$ to $V_4$ represented by broken lines represent values F(x) of weighted majority in cases where estimation values f(x) are sequentially calculated by the weak classifiers with images (learning samples) labeled as objects of interest as inputs. As indicated by the data $V_1$ to $V_4$, when input images correspond to objects of interest, the value F(x) of weighted majority according to classification by a certain number of weak classifiers becomes positive.

In this embodiment, a method that is different from the normal boosting algorithm is employed. More specifically, in a process of progressively summing up results of classification by weak classifiers, even before results from all the weak classifiers are obtained, learning or classification can be terminated when a learning sample or a window image can be clearly classified as not corresponding to an object of interest. A termination threshold (reference value) for determining whether to terminate classification is learned in the learning process.

By using the termination threshold, when it is reliably estimated that an image does not correspond to an object of interest without using results output from all the weak classifiers, calculation of estimated values f(x) by the weak classifiers can be terminated in the middle. This serves to reduce the amount of computation considerably compared with a case where all the weak classifiers are used to calculate a value of weighted majority, allowing quick processing.

The termination threshold may be chosen to be a minimum value that can be taken by the value of weighted majority as a result of classification of a learning sample indicating an object to be detected among labeled learning samples. In the learning process or the classification process, results of classification of a learning sample or a window image by the weak classifiers are sequentially weighted and output. That is, the value of weighted majority is progressively updated. On each occasion of updating, i.e., each time a classification result is output by one of the weak classifiers, the updated value is compared with the termination threshold. When the updated value of weighted majority becomes less than the termination threshold, it is possible to determine that the learning sample or the window image does not correspond to an object of interest, so that calculation can be terminated. This serves to save useless computation, serving to improve the speed of the learning process or the classification process.

That is, a termination threshold $R_M$ for the output $f_M(x)$ of the M-th weak classifier is a minimum value of the value $F(x)$ of weighted majority for learning samples $x_j$ (j=1 to J) for positive samples (i.e., learning samples corresponding to objects of interest) among learning samples $x_i$ (i=1 to N), which can be expressed, as in expression (8) below:

$$R_M = \min\left(\sum_{t=1}^{M} \alpha_t f_t(x_1), \sum_{t=1}^{M} \alpha_t f_t(x_2), \ldots, \sum_{t=1}^{M} \alpha_t f_t(x_j), 0\right) \quad (8)$$

As expressed in expression (8), when the minimum value of the value F(x) of weighted majority of the learning samples $x_1$ to $x_J$ corresponding to objects of interest exceeds 0, 0 is set as the termination threshold $R_M$. This holds in the case of AdaBoost, which performs classification with a threshold of 0, and does not necessarily hold depending on the method of ensemble learning. In the case of AdaBoost, as represented by a solid line in FIG. 14, the termination threshold $R_M$ is chosen to be a minimum value that can be taken among the values F(x) of weighted majority of all the data $V_1$ to $V_4$ when input images corresponding to objects of interest are input, and when the minimum value of the values F(x) of weighted majority of all the data $V_1$ to $V_4$ exceeds 0, the termination threshold $R_M$ is chosen to be 0.

In this embodiment, termination thresholds $R_M$ ($R_1$ to $R_K$) used when generating weak classifiers are learned, so that in the classification process described later, estimation values are sequentially output by a plurality of weak classifiers and the value of weighted majority is progressive updated as in data $V_5$. When the value becomes less than the termination threshold $R_M$, classification by subsequent weak classifiers is refrained. That is, by learning the termination thresholds $R_M$, when an estimation value is calculated by a weak classifier, it is possible to determine whether to perform calculation by a next weak classifier. Thus, when it is clear that an image does not correspond to an object of interest without waiting for results of classification by all the weak classifiers, calculation can be terminated in the course of classification. This serves to improve the speed of detection.

(5) Learning Method

Next, a method of learning by the ensemble learning machine 6 will be described. In an ordinary two-class pattern recognition problem, such as a problem of classifying whether given data corresponds to a face, images that serve as learning samples (training data), manually labeled in advance (i.e., correct classifications are assigned), are prepared. The learning samples include images of regions of objects to be detected (i.e., positive samples), and irrelevant images of regions randomly extracted (i.e., negative samples), such as landscapes.

A learning algorithm is applied based on the learning samples to generate learning data that is used during classification. In this embodiment, the learning data used during classification includes the following four types of data:

(A) K pairs of two pixel positions
(B) K thresholds for weak classifiers
(C) K weights for weighted majority (K confidences for weak classifiers)
(D) K termination thresholds (5-1) Generation of Weak Classifiers Now, an algorithm for learning the four types of learning data (A) to (D) from a large number of learning samples will be described.

In order to execute a learning process, the ensemble learning machine 6 is functionally constructed as shown in FIG. 15. Referring to FIG. 15, the ensemble learning machine 6 includes an initializer 101, a selecting unit 102, an error-ratio calculator 103, a confidence calculator 104, a threshold calculator 105, a checker 106, a remover 107, an updater 108, and a reflector 109. Although not shown, these components are allowed to exchange data with each other as needed.

The initializer 101 initializes data weights of learning samples. The selecting unit 102 executes a weak-classifier selecting process. The error-ratio calculator 103 calculates weighted error ratios $e_t$. The confidence calculator 104 calculates confidences $\alpha_t$. The threshold calculator 105 calculates discrimination thresholds $R_M$ and learning thresholds $R_L$. The checker 106 checks whether the number of samples is sufficient. The remover 107 removes negative samples, i.e., learning samples labeled as objects not of interest, when the number of samples is sufficient. The updater 108 updates data weights $D_t$ of the learning samples. The reflector 109 manages the number of iterations of the learning process.

FIG. 16 is a flowchart of the method of learning by the ensemble learning machine 6. Although AdaBoost, which is a learning algorithm that uses specific values as thresholds for weak classification, will be described herein, other learning algorithms for performing ensemble learning to combine weak classifiers may be used. For example, Real-AdaBoost, which uses continuous values representing the likelihoods (probabilities) of correct classifications as thresholds, may be used.

As described earlier, first, N learning samples $(x_i, y_i)$ labeled in advance as objects of interest or objects not of interest are prepared.

Figure 17:
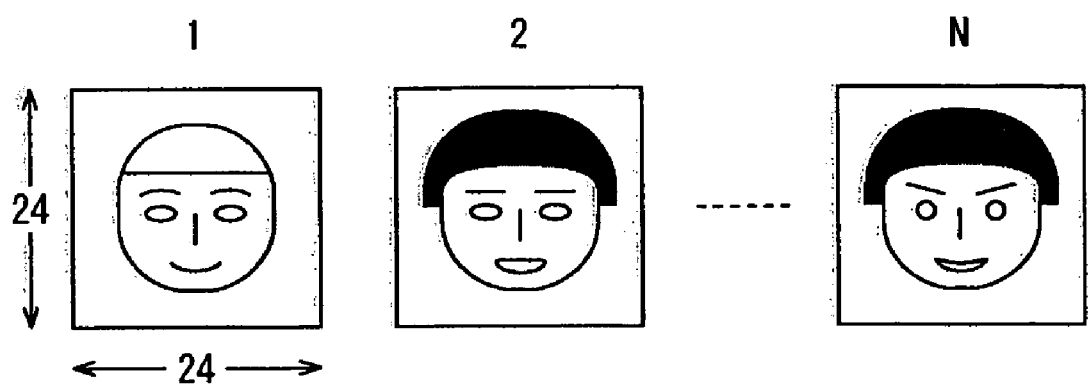
FIG. 17 is a diagram for explaining learning samples.

For example, the learning samples are N images of human faces, each consisting of 24×24 pixels, as shown in FIG. 17.

The respective meanings of $x_i$, $y_i$, X, Y, and N are as follows:

Learning samples $(x_i, y_i)$: $(x_1, y_1), \ldots, (x_N, y_N)$ $x_i \in X$, $y_i \in \{-1, 1\}$ X: Data of learning samples
Y: Labels (correct classifications) of learning samples
N: Number of learning samples That is, $x_i$ denotes a feature vector composed of all the luminance values of a learning sample image. $y_i = -1$ indicates that a learning sample is labeled as an object not of interest, while $y_i = 1$ indicates that a learning sample is labeled as an object of interest.

In step S1, the initializer 101 initializes data weights of learning samples. In boosting, data weights are varied among learning samples, and data weights for learning samples that are difficult to classify are relatively increased gradually. Results of classification are used to calculate error ratios for evaluating weak classifiers. By multiplying the classification results by the data weights, evaluations of weak classifiers that misclassify difficult learning samples become lower than actual classification ratios. Before the data weights of the learning samples are progressively updated in step S9 described later, the data weights are all initialized to the same value as expressed in expression (9) below:

$$D_{1,i} = \frac{1}{N} \quad (9)$$

$D_{1,i}$ denotes data weights of learning samples $x_i$ ($=x_1$ to $x_N$) at the iteration number $t=1$, where N denotes the number of learning samples.

In step S2, the selecting unit 102 executes a weak-classifier selecting process to generate a weak classifier for each iteration of steps S2 to S9. The weak-classifier selecting process will be described later in detail with reference to FIG. 20.

In step S3, the error-ratio calculator 103 calculates a weighted error ratio $e_t$. More specifically, a weighted error ratio $e_t$ of the weak classifier generated in step S2 is calculated according to expression (10) below:

$$e_t = \sum_{i: f_t(x_i) \neq y_i} D_{t,i} \quad (10)$$

As expressed in expression (10) above, the weighted error ratio $e_t$ is a sum of data weights of learning samples that are misclassified by the weak classifier ($f_t(x_i) \neq y_i$), i.e., learning samples labeled as $y_i = 1$ and classified as $f_t(x_i) = -1$ and learning samples labeled as $y_i = -1$ and classified as $f_t(x_i) = 1$. The weighted error ratio $e_t$ increases when the classifier misclassifies a learning sample having a large data weight $D_{t,i}$, i.e., a learning sample that is difficult to classify. The weight error ratio $e_t$ is less than 0.5, due to a reason described later.

In step S4, the confidence calculator 104 calculates a confidence $\alpha_t$ of the weak classifier. More specifically, based on the weighted error ratio $e_t$ expressed in expression (10) above, a confidence $\alpha_t$ used for weighted majority is calculated according to expression (11) below. The confidence $\alpha_t$ is a confidence of a weak classifier generated in the t-th iteration.

$$\alpha_t = \frac{1}{2} \ln\left(\frac{1 - e_t}{e_t}\right) \quad (11)$$

As is apparent from expression (11) above, the confidence $\alpha_t$ of the weak classifier increases as the weighted error ratio $e_t$ decreases.

In step S5, the threshold calculator 105 calculates a discrimination threshold $R_M$. As described earlier, the discrimination threshold $R_M$ is a termination threshold (reference value) used to terminate classification in the course of a classification process. The discrimination threshold $R_M$ is chosen according to expression (8) given earlier to be a minimum value among 0 and values of weighted majority of positive samples $x_1$ to $x_J$, i.e., learning samples corresponding to objects of interest. As described earlier, it is in the case where classification is performed by AdaBoost using 0 as a threshold that a minimum value or 0 is chosen as the termination threshold. In any case, the termination threshold $R_M$ is chosen to be such a maximum value that allows at least all positive samples to pass.

Then, in step S6, the threshold calculator 105 calculates a learning threshold $R_L$ according to expression (12) below:

$$R_L = R_M - m \quad (12)$$

In expression (12) above, m denotes a positive value that serves as a margin. That is, the learning threshold $R_L$ is chosen to be a value that is less than the discrimination threshold $R_M$ by the margin m.

Then, in step S7, the checker 106 checks whether the number of negative samples is sufficient. More specifically, the checker 106 determines that the number of negative samples is sufficient when the number of negative samples is greater than or equal to one half of the number of positive samples. When the number of negative samples is greater than or equal to one half of the number of positive samples, in step S8, the remover 107 removes negative samples. More specifically, the remover 107 removes negative samples for which the value F(x) of weighted majority expressed by expression (7) is less than the learning threshold $R_L$ calculated in step S6. When it is determined in step S7 that the number of negative samples is less than one half of the number of positive samples, step S8 for removing negative samples is skipped.

Figure 18:
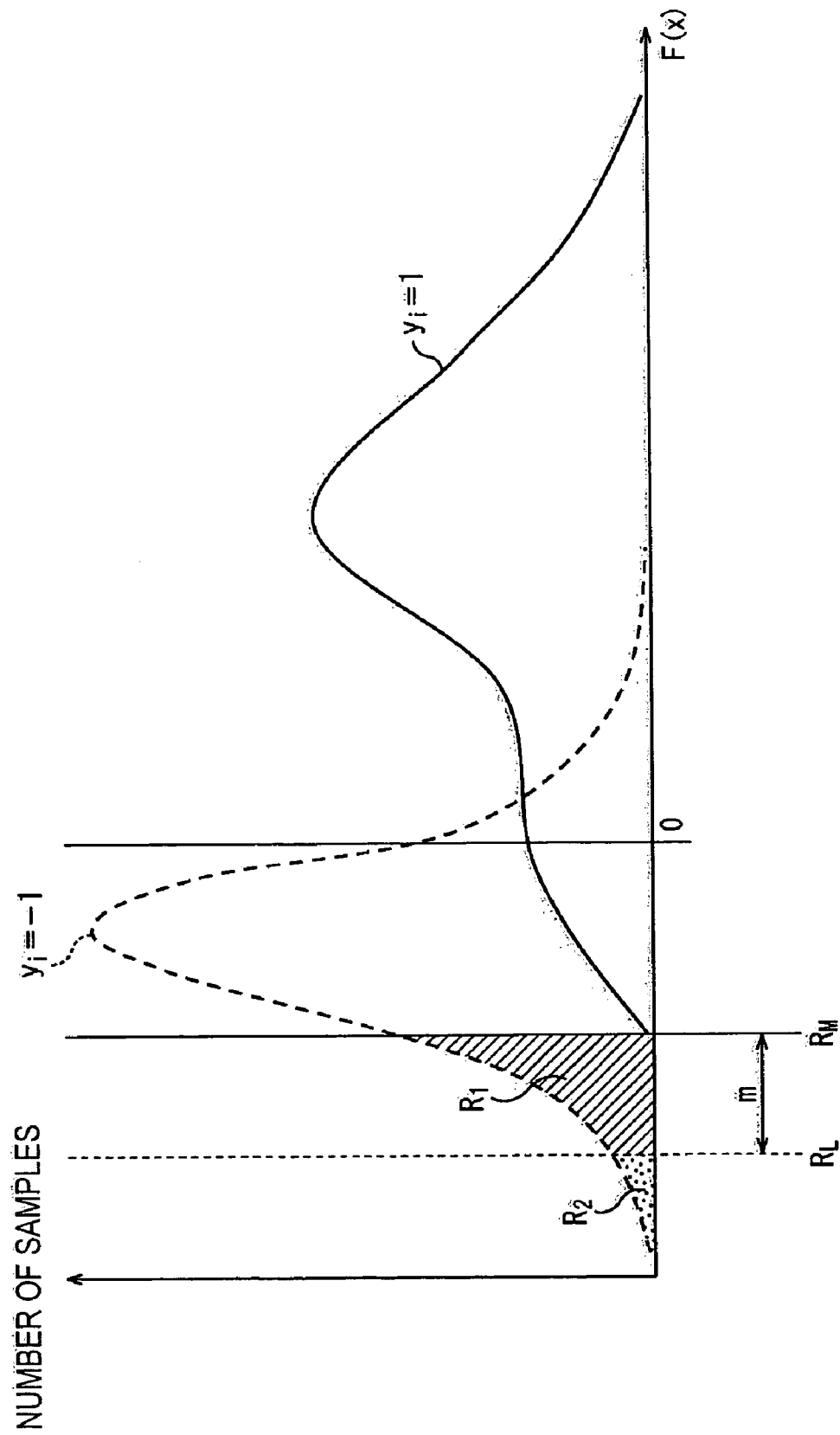
FIG. 18 is a diagram for explaining a discrimination threshold and a learning threshold.

This will be further described with reference to FIG. 18. FIG. 18 shows the distribution of the value F(x) of weighted majority in relation to the number of learning samples (represented on the vertical axis) when learning has advanced to a certain extent (when t iterations of learning have been performed). The solid line represents the distribution for positive samples (i.e., learning samples labeled as $y_i = 1$), and the broken line represents the distribution for negative samples (i.e., learning samples labeled as $y_i = -1$). In an object detecting process in a classification process, described later with reference to FIG. 23, when the value F(x) of weighted majority reaches the termination threshold $R_M$, subsequent classification by the weak classifier is refrained (step S65 in FIG. 23).

Also during learning, some negative samples can be removed when the value F(x) of weighted majority becomes less than the discrimination threshold $R_M$.

In the classification process, as shown in FIG. 18, negative samples in a region $R_1$ where the value F(x) of weighted majority is less than the discrimination threshold $R_M$ are essentially removed from consideration (i.e., rejected).

By removing from consideration (rejecting) samples that are to be removed (rejected) during discrimination also during learning, it is possible to perform learning so that the weighted error ratio $e_t$ is reduced to 0. However, it is known that when the number of samples is reduced, due to the nature of statistical learning, the ability of generalization of a weak classifier (the ability of discriminating each sample) is reduced. Furthermore, it is known that in boosting, the ability of generalization can be further improved by continuing learning even when the weighted error ratio $e_t$ of learning samples becomes 0. In this case, since the values of all negative samples are less than the discrimination threshold $R_M$, when the negative samples are exhausted, or when the number of positive samples differs considerably from the number of negative samples even though the negative samples are not exhausted, outputs of weak classifiers could tend to differ considerably from each other.

Thus, in this embodiment, by setting a learning threshold $R_L$ obtained by subtracting a certain margin m from a discrimination threshold $R_M$ used in a classification process, learning samples that cause extreme outputs are gradually decreased, so that learning can reach convergence quickly while maintaining the ability of generalization.

Thus, in step S8, the value F(x) of weighted majority is calculated, and negative samples in a region $R_2$ in FIG. 18 where the value F(x) of weighted majority is less than the learning threshold $R_L$ are removed.

In step S9, the updater 108 updates the data weights $D_{t,i}$ of the learning samples. More specifically, the updater 108 updates the data weights $D_{t,i}$ according to expression (13) below, using the confidence $\alpha_t$ calculated according to expression (11) given earlier. Usually, the data weights $D_{t,i}$ must be normalized so that the data weights $D_{t,i}$ sum up to 1. Thus, the data weights $D_{t,i}$ are normalized as expressed in expression (14).

$$D_{t+1,i} = D_{t,i} \exp(-\alpha_i y_i f_i(x_i)) \tag{13}$$

$$D_{t+1,i} = \frac{D_{t+1,i}}{\sum_i D_{t+1}} \tag{14}$$

In step S10, the reflector 109 determines whether the predetermined number K of iterations of learning has been finished (i.e., whether K iterations of boosting have been performed). When the K iterations have not been finished, the process returns to step S2, and subsequent steps are repeated.

K denotes the number of possible pairs of two pieces of pixel data that can be extracted from pixel data of a learning sample. For example, when each learning sample consists of 24×24 pixels, K is calculated as $24^2 \times (24^2 - 1) = 576 \times 575 = 331,200$.

Since one weak classifier is constructed for each pair of pixels, one weak classifier is generated by each iteration of steps S2 to S9. Thus, by repeating K iterations of steps S2 to S9, K weak classifiers are generated (learned).

When the K iterations of learning are finished, the learning process is exited.

(5-2) Generation of Weak Classifiers

Next, the weak-classifier selecting process in step S2 will be described. The method of generating weak classifiers differ between a case where weak classifiers output binary values and a case where weak classifiers output continuous values represented by the function f(x) expressed by expression (6) given earlier. Furthermore, in the case of binary outputs, the method slightly differs between a case where classification is based on the single threshold $Th_1$ as expressed in expression (3) and a case where classification is based on two thresholds $Th_{11}$ and $Th_{12}$ or $Th_{21}$ and $Th_{22}$ as expressed in expression (4) or (5). The following description deals with a method of learning (generating) weak classifiers that output binary values based on the single threshold $Th_1$.

Figure 19:
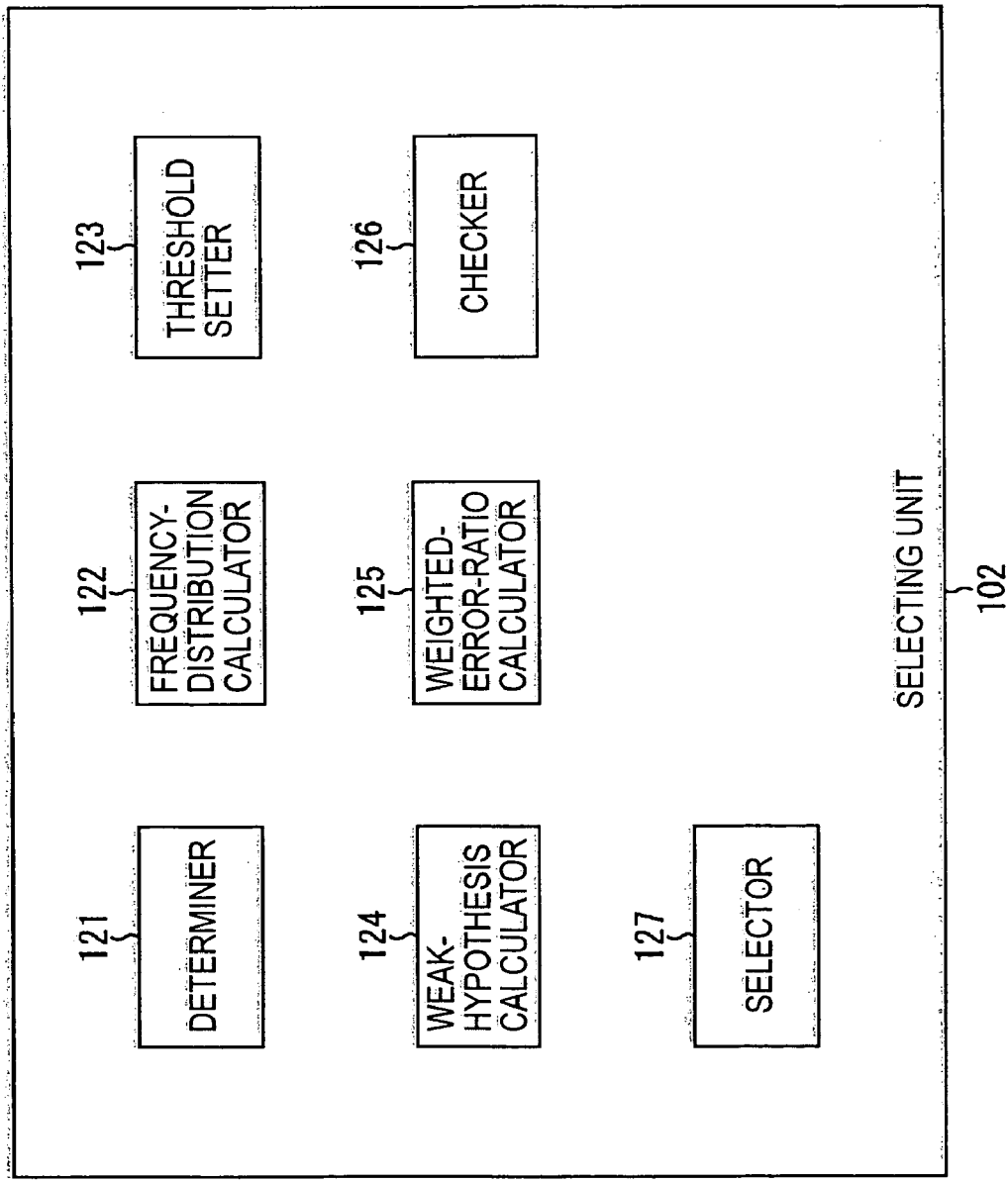
FIG. 19 is a block diagram showing an example functional construction of a selecting unit.

As shown in FIG. 19, the selecting unit 102 includes a determiner 121, a frequency-distribution calculator 122, a threshold setter 123, a weak-hypothesis calculator 124, a weighted-error-ratio calculator 125, a checker 126, and a selector 127.

The determiner 121 randomly determines two pixels from an input learning sample. The frequency-distribution calculator 122 collects inter-pixel difference features d for pairs of pixels determined by the determiner 121, obtaining a frequency distribution thereof. The threshold setter 123 sets thresholds for weak classifiers. The weak-hypothesis calculator 124 calculates weak hypotheses by weak classifiers, outputting classification results f(x).

The weighted-error-ratio calculator 125 calculates the weighted error ratio $e_t$ expressed in expression (10). The checker 126 compares the thresholds Th of weak classifiers and the inter-pixel difference features d. The selector 127 selects a weak classifier associated with a threshold Th associated with a smallest weighted error ratio $e_t$.

FIG. 20 is a flowchart of the method in step S2 of learning (generating) weak classifiers that output binary values based on the single threshold $Th_1$.

In step S31, the determiner 121 randomly determines positions S1 and S2 of two pixels in a learning sample consisting of 24×24 pixels. When a learning sample consists of 24×24 pixels, the number of possible pairs of two pixels is 576×575, and one of the pairs is selected. The positions of the two pixels will be denoted by S1 and S2, and the luminance values thereof by $I_1$ and $I_2$, respectively.

In step S32, the frequency-distribution calculator 122 calculates inter-pixel difference features for all the learning samples, and obtains a frequency distribution thereof. That is, the frequency-distribution calculator 122 calculates an inter-pixel difference feature d representing the difference ($I_1-I_2$) between the luminance values $I_1$ and $I_2$ of the pixels at the two positions S1 and S2 selected in step S31 for each of the N learning samples, obtaining a histogram (frequency distribution) shown in FIG. 11A.

Figure 21:
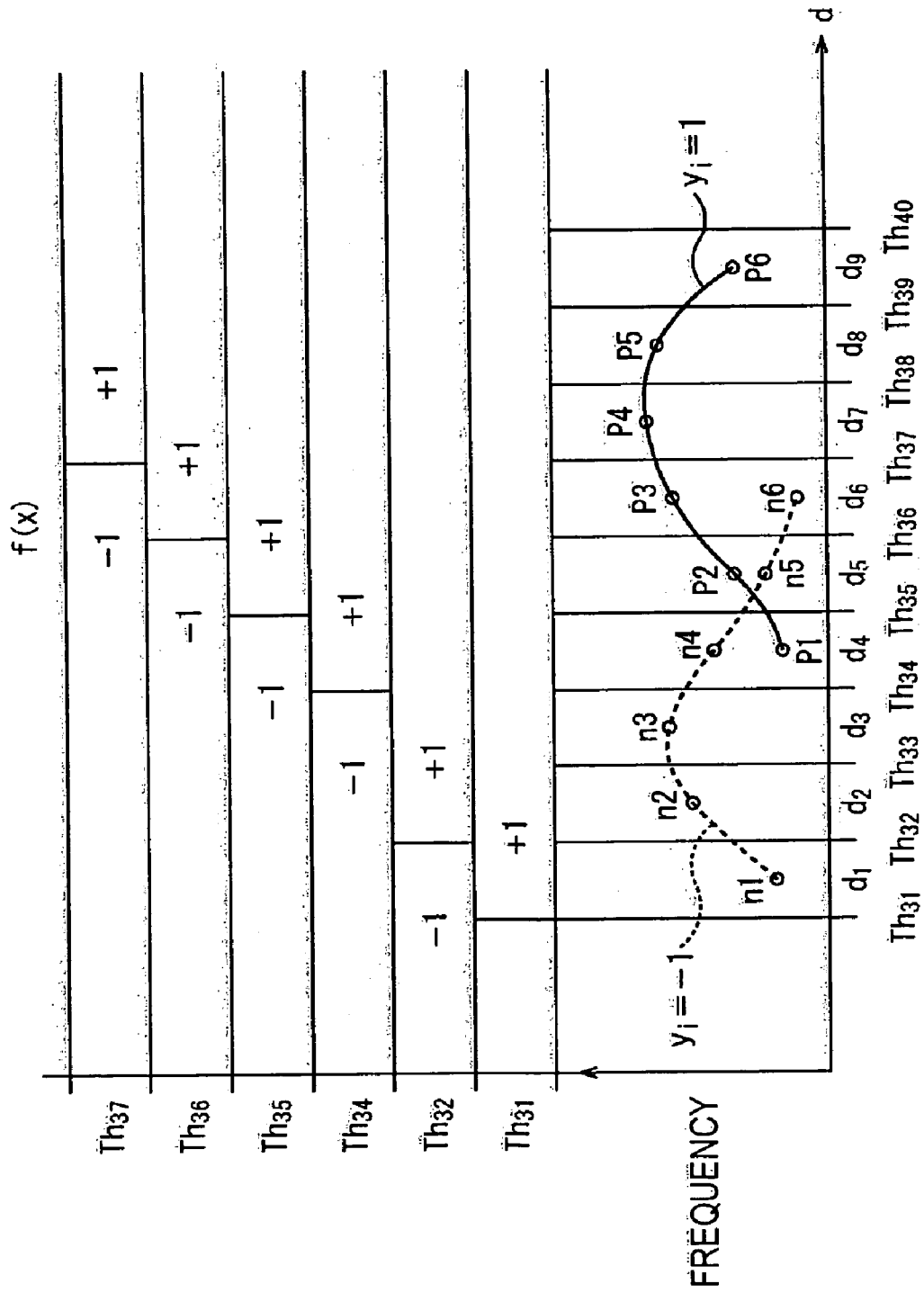
FIG. 21 is a diagram for explaining change in the value of threshold.
Figure 22:
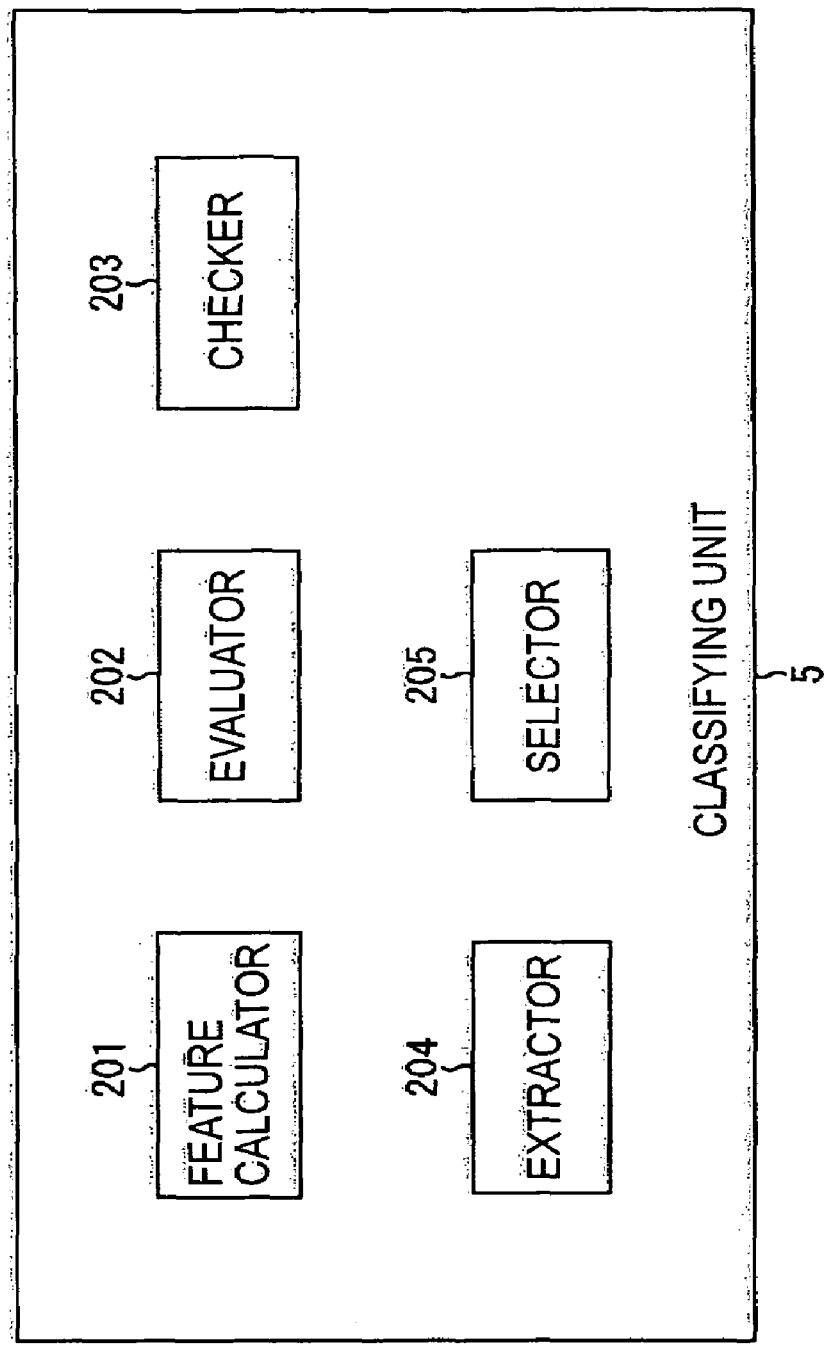
FIG. 22 is a block diagram showing an example functional construction of the classification unit.

In step S33, the threshold setter 123 sets a threshold Th that is less than the smallest inter-pixel difference feature d. For example, when the values of inter-pixel difference features d are distributed between d1 and d9 as shown in FIG. 21, the value of the smallest inter-pixel difference feature d is d1. Thus, the threshold setter 123 sets a threshold $Th_{31}$ that is less than the inter-pixel difference feature d1 as the threshold Th.

Then, in step S34, the weak-hypothesis calculator 124 calculates a weak hypothesis according to expression (15) below, where sign(A) is a function that outputs +1 when the value A is positive while outputting −1 when the value A is negative:

$$f(x) = \text{sign}(d - Th) \tag{15}$$

In this case, since $Th = Th_{31}$, irrespective of which of d1 to d9 the value of the inter-pixel difference feature d is, the value of (d−Th) is positive. Thus, the result f(x) of classification according to the weak hypothesis, expressed by expression (15), is +1.

In step S35, the weighted-error-ratio calculator 125 calculates weighted error ratios $e_t 1$ and $e_t 2$. The weighted error ratios $e_t 1$ and $e_t 2$ have the relationship expressed in expression (16) below:

$$e_t 2 = 1 - e_t 1 \tag{16}$$

The weighted error ratio $e_t 1$ is calculated according to expression (10). The weighted error ratio $e_t 1$ is a weighted error ratio in a case where $I_1$ and $I_2$ are the pixel values at the positions S1 and S2, respectively. The weighted error ratio $e_t 2$ is a weighted error ratio in a case where $I_2$ is the pixel value at the position S1 and $I_1$ is the pixel value at the position S2. That is, a combination of a first position as position S1 and a second position as position S2 differs from a combination of the first position as position S2 and the second position as position S1. Still, however, the values of the weighted error ratios $e_t1$ and $e_t2$ have the relationship expressed in expression (16). Thus, in step S35, the weighted error ratios $e_t$ of two combinations are calculated together. If otherwise, K iterations of steps S31 to S41 must be performed (where K denotes the number of all possible pairs of two pixels that can be extracted from the learning sample). In contrast, by calculating two weighted error ratios $e_t1$ and $e_t2$ in step S25, the number of iterations is reduced to one half of the number K of all possible combinations.

In step S36, the weighted-error-ratio calculator 125 selects smaller one of the weighted error ratios $e_t1$ and $e_t2$ calculated in step S35.

In step S37, the checker 126 checks whether the threshold is greater than the greatest inter-pixel difference feature. That is, the checker 126 checks whether the current threshold Th is greater than the greatest inter-pixel difference feature d (d9 in the example shown in FIG. 21). In this case, since the threshold Th is the threshold $Th_{31}$ shown in FIG. 21, it is determined that the threshold Th is less than the greatest inter-pixel difference feature d9. Then, the process proceeds to step S38.

In step S38, the threshold setter 123 sets a threshold Th having an intermediate value between an inter-pixel difference feature that is closest to the current threshold and an inter-pixel difference feature that is next closest to the current threshold. In the example shown in FIG. 21, an intermediate value $Th_{32}$ between the inter-pixel difference feature d1, which is closest to the current threshold $Th_{31}$, and the inter-pixel difference feature d2, which is next closest, is set.

Then, the process proceeds to step S34, in which the weak-hypothesis calculator 124 calculates an output f(x) of classification by the weak hypothesis according to expression (15) given earlier. In this case, the value of f(x) is +1 when the value of inter-pixel difference feature d is between d2 to d9, and the value of f(x) is −1 when the value of inter-pixel difference feature d is d1.

In step S35, the weighted error ratio $e_t1$ is calculated according to expression (10), and the weighted error ratio $e_t2$ is calculated according to expression (16). Then, in step S36, the smaller one of the weighted error ratios $e_t1$ and $e_t2$ is selected.

In step S37, it is determined again whether the threshold is greater than the greatest inter-pixel difference feature. In this case, since the threshold $Th_{32}$ is less than the greatest inter-pixel difference feature d9, the process proceeds to step S38, in which a threshold $Th_{33}$ between the inter-pixel difference features d2 and d3 is set as the threshold Th.

In this manner, the threshold Th is progressively updated to larger values. In step S34, for example, when the threshold Th is a threshold $Th_{34}$ between inter-pixel difference features d3 and d4, +1 is output if the value of the inter-pixel difference feature d is greater than or equal to d4, while outputting −1 if the value is less than or equal to d3. Similarly, the result f(x) of classification by the weak hypothesis is +1 when the value of the inter-pixel difference feature d is greater than or equal to the threshold $Th_t$ and the result f(x) is otherwise −1.

The process described above is repeated until it is determined in step S37 that the threshold Th is greater than the greatest inter-pixel difference feature. In the example shown in FIG. 21, the process is repeated until the threshold reaches a value $Th_{40}$ that is greater than the largest inter-pixel difference feature d9. That is, by iterating steps S34 to S38, weighted error ratios $e_t$ for respective values of the threshold Th are calculated for a pair of pixels selected. In step S39, the selector 127 selects the smallest weighted error ratio from the weighted error ratios $e_t$ that have been calculated. In step S40, the selector 127 selects a threshold associated with the smallest weighted error ratio as a threshold for the current weak hypothesis. That is, a threshold $Th_t$ associated with the smallest weighted error ratio $e_t$ selected in step S39 is selected as a threshold for the weak classifier (the weak classifier generated based on the pair of pixels).

In step S41, the checker 126 checks whether the process has been iterated for all the pairs of pixels. When the process has not been iterated for all the pairs of pixels, the process returns to step S31, and subsequent steps are repeated. That is, positions S1 and S2 of two pixels are determined randomly (but different from the positions previously selected), and the same process is executed for the luminance values $I_1$ and $I_2$ at the positions S1 and S2.

The process described above is repeated until it is determined that K iterations have been finished, K being the number of all possible pairs of two pixels that can be extracted from the learning sample. However, in this embodiment, as described earlier, the process is essentially executed in step S35 for the case where the positions S1 and S2 are reversed, one half of the number K of all pairs suffices in step S41.

When it is determined in step S41 that the process has been finished for all pairs, in step S42, the selector 127 selects a weak classifier associated with the smallest weighted error ratio among the weak classifiers generated. That is, by the process described above, one of the K weak classifiers (e.g., the weak classifier $21_1$ in FIG. 9) is learned and generated.

Then, the process returns to step S2 in FIG. 16, and subsequent steps are executed. The process shown in FIG. 16 is repeated until it is determined in step S10 that K iterations of learning have been finished. That is, in the second iteration of the process shown in FIG. 16, the weak classifier $21_2$ shown in FIG. 9 is generated by learning, and in the third iteration of the process shown in FIG. 16, the weak classifier $21_3$ shown in FIG. 9 is generated by learning. Similarly, in the K-th iteration of the process shown in FIG. 16, the weak classifier $21_K$ shown in FIG. 9 is generated by learning.

Although the embodiment has been described above in the context of an example where a weak classifier is generated by learning features of a plurality of weak classifiers using data weights $D_{t,i}$ obtained in step S9 of a previous iteration and selecting one of the weak classifiers associated with the smallest weighted error ratio $e_t$ according to expression (10). Alternatively, however, in step S2 described earlier, for example, a weak classifier may be generated by selecting arbitrary pixel positions from a plurality of pixel positions prepared or learned in advance. Yet alternatively, a weak classifier may be generated using learning samples that are different from learning samples used for the iterations of steps S2 to S9 described earlier. Yet alternatively, a weak classifier or a classifier generated may be evaluated using samples that are different from learning samples, as in cross validation or the jack-knife method. In cross validation, learning samples are uniformly divided into I units, learning is performed using the units other than one unit, and results of learning is evaluated using the one unit, and this process is repeated I times.

When a weak classifier performs classification based on two thresholds $Th_{11}$ and $Th_{12}$ or $Th_{21}$ and $Th_{22}$ as expressed in expression (4) or expression (5), processing in steps S34 to S38 shown in FIG. 20 slightly differs. When only one threshold Th is used as expressed in expression (3), it is possible to calculate a weighted error ratio $e_t$ by subtraction from 1. In contrast, when a correct classification is indicated by an inter-pixel difference feature that is greater than the threshold $Th_{12}$ and is less than the threshold $Th_{11}$ as expressed in expression (4), by subtraction from 1, it is understood that a correct classification is indicated when the inter-pixel difference feature is less than the threshold $Th_{22}$ or when the inter-pixel difference feature is greater than the threshold $Th_{21}$ as expressed in expression (5). That is, the inversion of expression (4) is expression (5), and the inversion of expression (5) is expression (4).

When a weak classifier outputs a classification result based on the two thresholds $Th_{11}$ and $Th_{12}$ or $Th_{21}$ and $Th_{22}$, in step S32 shown in FIG. 20, the frequency distribution of inter-pixel difference features is obtained, and values of the thresholds $Th_{11}$ and $Th_{12}$ or $Th_{21}$ and $Th_{22}$ that minimize the weighted error ratio $e_t$ are calculated. Then, in step S41, it is determined whether the predetermined number of iterations has been finished. Thus, a weak classifier associated with the smallest error ratio among the weak classifiers generated by the predetermined number of iterations is adopted.

When the weak classifier outputs continuous values as expressed in expression (6) given earlier, similarly to step S31 in FIG. 20, first, two pixels are selected randomly. Then, similarly to step S32, the frequency distribution for all the leaning samples is obtained. Furthermore, the function f(x) expressed in expression (6) is calculated based on the frequency distribution obtained. Then, a process for calculating a weighted error ratio according to a predetermined learning algorithm that outputs the likelihood of being an object of interest (positive sample) is iterated a predetermined number of times, and a parameter that minimizes error ratio (that maximizes correct classification ratio) is selected, whereby a weak classifier is generated.

In the process of generating a weak classifier, shown in FIG. 20, for example, when learning samples each consisting of 24×24 pixels are used, the number of possible pairs of two pixels is 331,200 (=576×575). Thus, a weak classifier that minimizes error ratio among weak classifier generated by a maximum of 331,200 iterations can be adopted. As described above, a weak classifier having a high ability can be generated by adopting a weak classifier that minimizes error ratio among a maximum number of weak classifiers generated by a maximum number of iterations. Alternatively, however, a weak classifier that minimizes error ratio may be adopted from weak classifiers generated by a number of iterations that is less than the maximum number of iterations, e.g., several hundred iterations.

(6) Method of Detecting Object of Interest

Next, a method of detecting an object of interest by the object detecting apparatus 1 shown in FIG. 5 will be described.

In order to carry out the method, the classification unit 5 includes a feature calculator 201, an evaluator 202, a checker 203, an extractor 204, and a selector 205.

The feature calculator 201 calculates an inter-pixel difference feature. The evaluator 202 calculates, as an evaluation value s, a value F(x) of weighted majority function F(x) according to expression (7). The checker 203 compares the evaluation value s calculated by the evaluator 202 with the discrimination threshold $R_M$ to determine whether to terminate classification by a weak classifier.

The extractor 204, when two regions of objects of interest overlap each other, extracts the regions. The selector 205 selects a region with a greater evaluation value s from the regions extracted by the extractor 204.

In a detection process (classification process), the classification unit 5 constructed of the set of weak classifiers generated in the learning process as described above is used to detect an object of interest from an image according to a predetermined algorithm. This process will be described with reference to a flowchart shown in FIG. 23.

In step S61, the scaling unit 3 reduces the scale of a grayscale image input from the image output unit 2 by a specified ratio.

The image output unit 2 may receive input of a grayscale image directly, or an input color image may be converted into a grayscale image in the image output unit 2. The scaling unit 3 first outputs an image given by the image output unit 2 as it is without scaling it, and outputs images of reduced scales at subsequent timings. For the convenience of description, all images output from the scaling unit 3 will be referred to as scaled images. A scaled image is generated at a timing when face detection in all regions of a previously output scaled image is finished. When a scaling image becomes smaller than a window image, processing of a next frame of input image is started.

In step S62, the scanning unit 4 scans the input scaled image using a search window to cut out an image. That is, the scanning unit 4 locates a search window at a specified position on the scaled image to cut out an image in the window as a window image, outputting the window image to the classification unit 5.

In step S63, the feature calculator 201 of the classification unit 5 extracts two pixels for a first weak classifier among K weak classifiers from the window image (consisting of 24×24 pixels) that has been cut out, and calculates an inter-pixel difference feature d between the two pixels.

In step S64, the evaluator 202 updates the evaluation value s by multiplying an estimation value of the current weak classifier by a confidence and adding the previous evaluation. More specifically, the evaluator 202 first initializes the evaluation value s to 0. Then, the evaluator 202 calculates an estimation value f(x) according to expression (15) as a result of classification by the weak classifier $21_1$, and weights the estimation value f(x) of the evaluation value s by the weight $\alpha_1$ according to expression (7), calculating the value F(x) of weighted majority as the evaluation value s.

A weak classifier that outputs a binary estimation value according to expressions (3) to (5) and a weak classifier that outputs an estimation value according to the function f(x) expressed in expression (6) reflect their estimation values to the evaluation value s in different ways.

When expression (2) is used for a classifier to output a binary estimation value, the evaluation value s can be expressed by expression (17) below:

$$s \leftarrow s + \begin{cases} \alpha_t & \dots Th_t < d_t \\ -\alpha_t & \dots \text{Otherwise} \end{cases} \quad (17)$$

That is, the value of the result $f_t(x)$ of classification by a weak classifier is +1 when the value of inter-pixel difference feature d is greater than the threshold $Th_t$ and is otherwise −1. Thus, the value obtained by multiplying the estimation value $f_t(x)$ by the weight at is at when the value of inter-pixel difference feature d is greater than the threshold and is otherwise $-\alpha_t$. These values are added to the previous evaluation value s according to expression (7) to update the evaluation value s, which is the value F(x) of weighted majority according to expression (7).

When expression (3) is used for a weak classifier to output a binary estimation value, the evaluation value s can be expressed by expression (18) below:

$$s \leftarrow s + \begin{cases} \alpha_t & \ldots Th_{t,1} < d_t < Th_{t,2} \\ -\alpha_t & \ldots \text{Otherwise} \end{cases} \quad (18)$$

When expression (4) is used for a weak classifier to output a binary estimation value, the evaluation value s can be expressed by expression (19) below:

$$s \leftarrow s + \begin{cases} \alpha_t & \ldots d_t < Th_{t,1} \text{ or } Th_{t,2} < d_t \\ -\alpha_t & \ldots \text{Otherwise} \end{cases} \quad (19)$$

When expression (5) is used for a weak classifier to output an estimation value according to the function f, the estimation value s can be expressed by expression (20) below:

$$s \leftarrow s + f(d) \quad (20)$$

In step S65, the checker 203 compares the estimation value s with the termination threshold $R_M$ to determine whether the evaluation value s is greater than the termination threshold $R_M$. When the evaluation value s updated in step S64 is greater than the termination threshold $R_M$, in step S66, the checker 203 determines whether K iterations of the process have been executed. When the number of iterations executed is less than K, the process returns to step S63, in which an inter-pixel difference feature of pixels selected by the feature calculator 201 for the next weak classifier $21_2$ is calculated. Then, in step S64, the estimation value f(x) of the weak classifier $21_2$ is multiplied by the confidence $\alpha_2$, and the evaluation value s is updated accordingly.

In step S65, it is checked again whether the evaluation value s is greater than the termination threshold $R_M$. When the estimation value s is greater than the termination threshold $R_M$, if the number of iterations executed has not reached K, the process again returns from step S66 to step S63, and the same process is executed again. When steps S63 to S65 have been iterated K times, classifications by the respective weak classifiers $21_1$ to $21_K$ shown in FIG. 9 have been performed, and each of the classifiers $21_i$ has determined that the image in the search window corresponds to a human face.

On the other hand, when it is determined in step S65 that the evaluation value s is less than or equal to the termination threshold $R_M$, it is determined that the image in the search window does not correspond to a human face. In this case, step S66 is skipped, and iterations for the weak classifier $21_{i+1}$ and subsequent weak classifiers are not executed. This allows quicker processing.

When K iterations of the process have been finished or when the evaluation value s becomes less than or equal to the termination threshold $R_M$, in step S67, the checker 203 determines whether another search window is to be applied. When another search window is to be applied, the process returns to step S62, in which the scanning unit 4 shifts the search window of the current scaled image by one pixel to the right, and cuts out an image defined by the search window shifted, outputting the image to the classification unit 5. Then, the classification unit 5 iterates steps S63 to S66 to determine whether the window image corresponds to a human face.

As described above, the search window is sequentially shifted by one pixel rightward or downward as shown in FIG. 7, determining whether the image in the search window at each position corresponds to a human face. When the position of the search window has reached the bottom right of the scaled image, in step S67, it is determined whether another search window is to be applied. Then, the process proceeds to step S68.

In step S68, the scaling unit 3 determines whether another scaled image is to be scanned. When another scaled image is to be scanned, in step S61, the scaling unit 3 generates a scaled image at a further reduction ratio (i.e., reduced further), outputting the scaled image to the scanning unit 4. Then, the same process described above is executed for the scaled image.

The process described above is executed until it is determined in step S68 that no further scaled image is to be scanned. That is, the process described above is repeated until a scaled image becomes smaller than a window image.

As described earlier, the search window is sequentially shifted by one pixel rightward or downward. Thus, for example, when an image in a search window is determined as corresponding to a human face, an image in a window that is shifted by one pixel rightward or downward is usually determined as corresponding to a human face. Thus, an image of the same face is detected as corresponding to a human face in a plurality of window images. Thus, when processing of all the scaled images has been finished, a process for removing overlapping of search windows is executed.

Thus, in step S69, the checker 203 determines whether two or more regions of objects of interest overlap each other. When two or more regions of objects of interest overlap each other, in step S70, the extractor 204 executes a process for extracting the two overlapping regions. For example, when it is determined that an image of a search window is obtained in a region of an object of interest, it is usually determined that an image of a search window shifted rightward by one pixel also corresponds to a human face, so that regions of these two windows is extracted. In step S71, the selector 205 selects a region with a greater evaluation value s from the two regions extracted in step S70.

The process then returns to step S69, and subsequent steps are repeated.

As described above, a region with a small estimation value s is disregarded as being unreliable, and a region of the highest evaluation value s is selected. The process described above is repeated until it is determined in step S69 that two or more regions of objects of interest do not overlap each other. When it is determined that regions of objects of interest do not overlap each other, the process for the frame is exited. Then, the process is executed for a next frame as needed.

As described above, by the method of detecting an object of interest according to this embodiment, an object of interest is detected using a classification unit constructed by weak classifiers that perform weak classifications based on inter-pixel difference features, learned by ensemble learning. Thus, simply by reading luminance values of two pixels in a window image and calculating the difference therebetween, the step of calculating a feature of an object of interest in step S63 is finished. Thus, face detection can be performed very quickly, allowing real-time face detection.

Furthermore, each time the evaluation value s is updated by adding up a value obtained by multiplying a classification result (estimation value) of a feature by a confidence for a weak classifier used for classification, the evaluation value s is compared with the termination threshold $R_M$ to determine whether to continue calculation of estimation value by weak classifiers. The calculation by weak classifiers is terminated when the evaluation value s becomes less than the termination threshold $R_M$, and the process shifts to a next window image. This considerably reduces useless calculation, allowing even quicker face detection.

That is, when all the regions of the input image and images of reduced scales are scanned to cut out window images, the probability of a window image corresponding to an object of interest is small, and most of the window images correspond to objects not of interest. By terminating classification of window images not corresponding to objects of interest, the efficiency of classification is considerably improved. On the contrary, when a large number of objects of interest to be detected is included, similarly to the method of termination based on the termination threshold, a threshold for terminating calculation of window images that are determined as clearly corresponding to objects of interest may be provided. Furthermore, by scaling an input image by the scaling unit, it is possible to set a search window of an arbitrary size, allowing detection of an object of interest of an arbitrary size.

Figure 23:
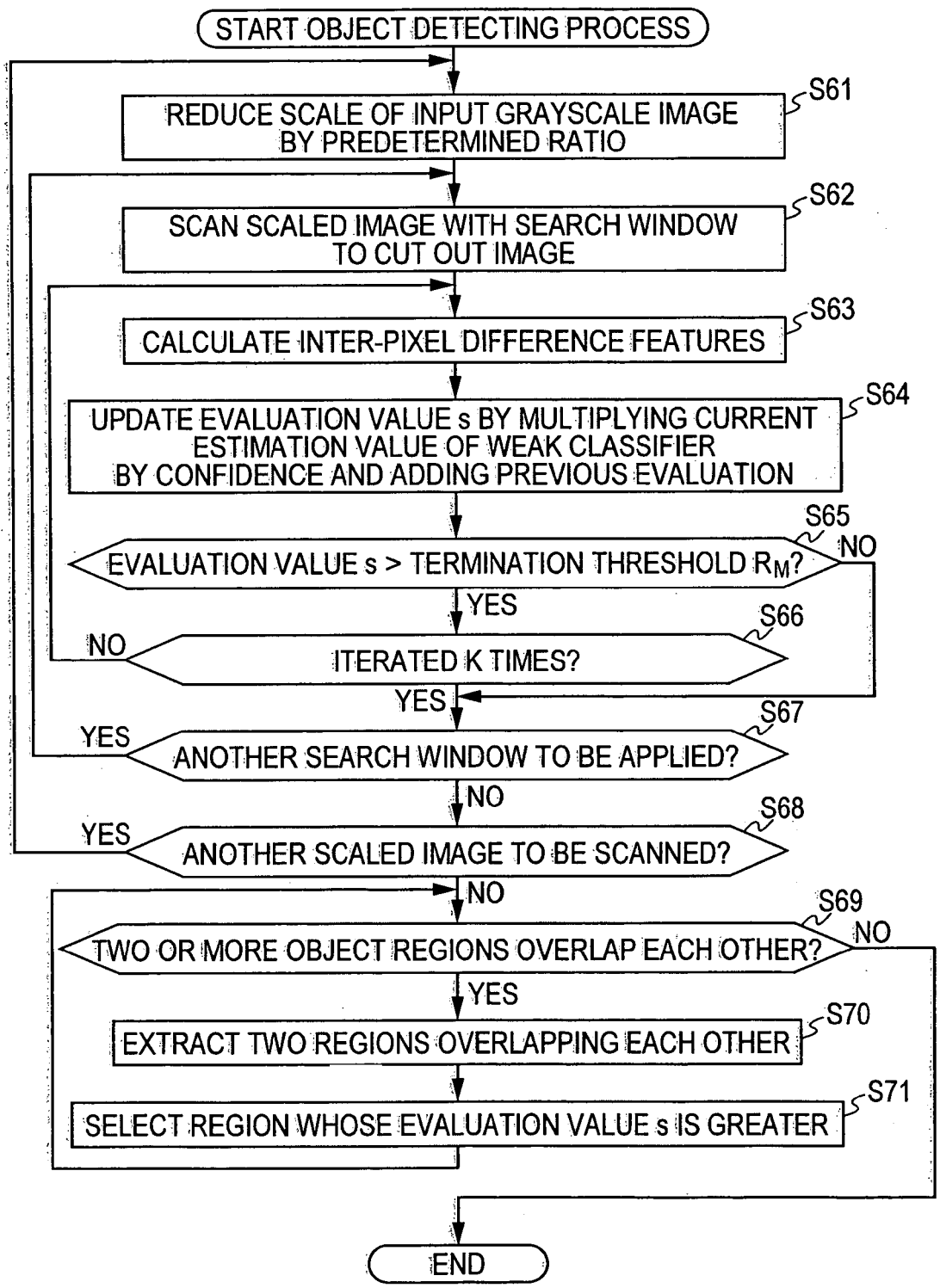
FIG. 23 is a flowchart of an object detecting process.

In steps S63 to S66 in FIG. 23, essentially, termination based on the termination threshold, shown in FIG. 24, is executed. That is, the evaluation value s is initialized to 0 in step S101, and the variable t indicating the number of iterations is initialized to 1 in step S102. Then, in step S103, an inter-pixel difference feature d is obtained (i.e., d_t(x) is set to d). In step S104, the evaluation value s is updated according to expression (21) below:

$$s = s + (d > 0) \cdot \alpha_t \quad (21)$$

The function (d>0) in expression (21) above returns +1 when the value of d is greater than 0 while outputting 0 when the value of d is less than or equal to 0.

In step S105, it is determined whether the evaluation value s obtained in step S104 is greater than the termination threshold $R_M$. When the evaluation value s is greater than the termination threshold $R_M$, it is determined in step S106 whether the variable t equals K. When the variable t does not equal K, in step S107, the variable t is incremented by one. The process then returns to step S103, and subsequent steps are repeated.

When it is determined in step S105 that the evaluation value s is less than or equal to the termination threshold $R_M$, step S106 is skipped.

In the process described above, when classification by a weak hypothesis turns out negative, output of the weak hypothesis is not added, and a weight is summed only when classification turns out positive. Thus, the termination threshold $R_M$ used in step S105 can be expressed by expression (22) below:

$$R_M(t) = \frac{R_M(t) + \text{bias}(t)}{2} \\ \text{bias}(t) = \text{bias}(t-1) + \alpha_t \quad (22)$$

Thus, it is possible to execute step S104 without branching, allowing quick processing.

The process shown in FIG. 24 can be expressed by code shown in FIG. 25.

Figure 26:
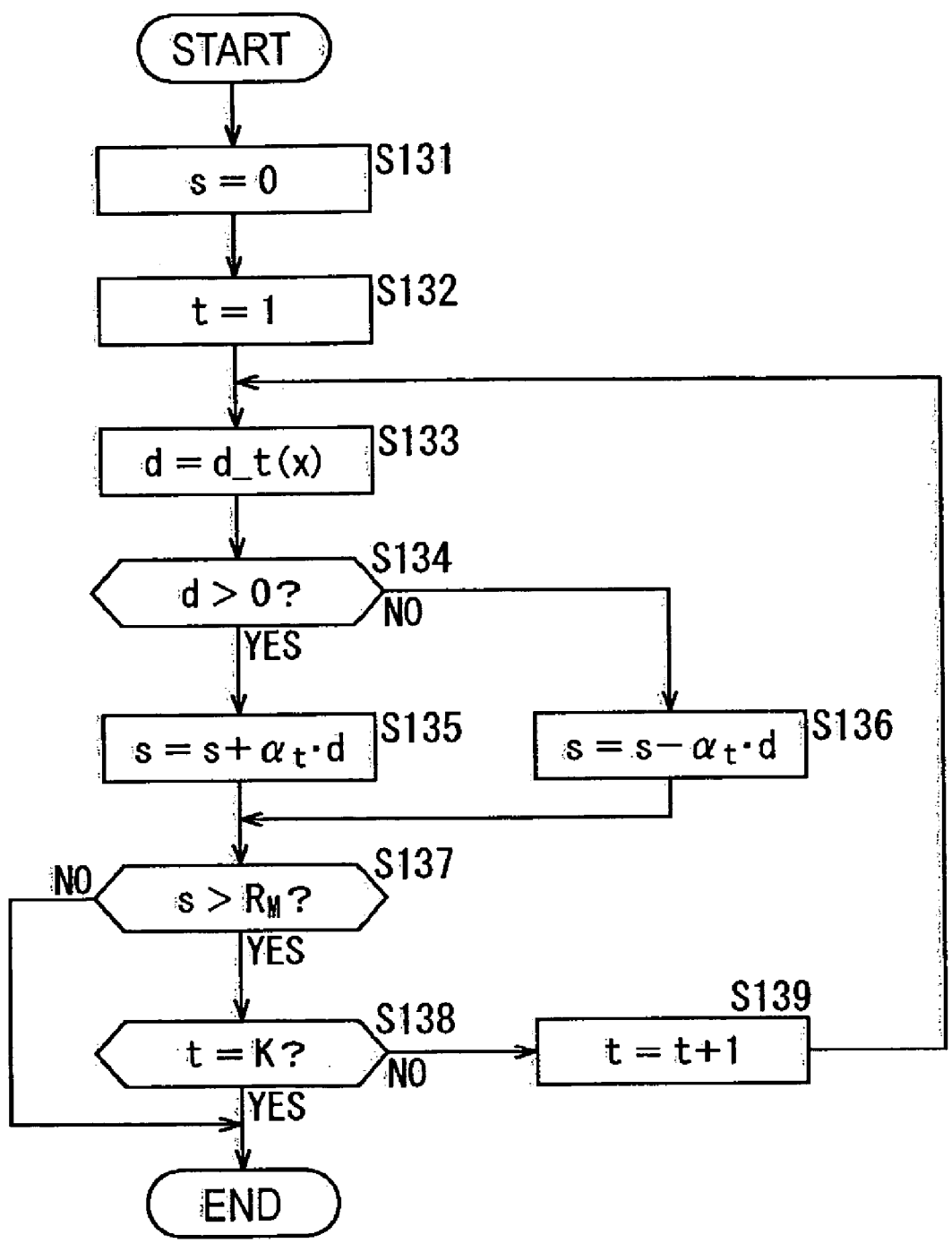
FIG. 26 is a flowchart of termination based on a termination threshold, compared with FIG. 24.

For the purpose of comparison, FIG. 26 shows a flowchart of a process in which termination based on the termination threshold in step S104 shown in FIG. 24 is implemented using branching.

That is, steps S131 to S133 in FIG. 26 correspond to steps S101 to S103 in FIG. 24, steps S137 to S139 in FIG. 26 correspond to steps S105 to S107 in FIG. 24, and steps S134 to S136 in FIG. 26 correspond to step S104 in FIG. 24.

In step S134, it is determined whether the value of d obtained in step S133 is positive. When the value of the inter-pixel difference feature d is positive, in step S135, the evaluation value s is updated according to expression (23) below:

$$s = s + \alpha_t \cdot d \quad (23)$$

On the other hand, when it is determined in step S144 that the value of the inter-pixel difference feature d is less than or equal to 0, in step S136, the evaluation value s is updated according to expression (24) below:

$$s = s - \alpha_t \cdot d \quad (24)$$

The process shown in FIG. 26 can be expressed by code shown in FIG. 27.

Processing becomes slower when such branching is involved. Thus, preferably, processing is executed as shown in FIGS. 24 and 25.

The calculation of the evaluation value s in step S104 in FIG. 24 can also be applied to calculation of expression (7) to remove negative samples during learning in step S8 shown in FIG. 16.

Furthermore, the process shown in FIG. 24 can be implemented so that calculation of the value F(x) of weighted majority for four inter-pixel difference features can be executed in parallel as in a flowchart shown in FIG. 28.

More specifically, in the process, the evaluation value s is initialized to 0 in step S201, and the variable t representing the number of iterations is initialized to 1 in step S202.

Then, in steps S203, S207, S211, and S215, values d_t(x) obtained are set to the inter-pixel difference features d1, d2, d3, and d4, respectively.

When it is determined in step S204 that the inter-pixel difference feature d1 is positive, the value thereof is set to a variable c1. When it is determined in step S208 that the inter-pixel difference feature d2 is positive, the value thereof is set to a variable c2. When it is determined in step S212 that the inter-pixel difference feature d3 is positive, the value thereof is set to a variable c3. When it is determined in step S216 that the inter-pixel difference feature d4 is positive, the value thereof is set to a variable c4.

Then, the product of the weight $\alpha_1$ and the inter-pixel difference feature d1 obtained in step S203 is set to a variable m1 in step S205. The product of the weight $\alpha_2$ and the inter-pixel difference feature d2 obtained in step S207 is set to a variable m2 in step S209. The product of the weight $\alpha_3$ and the inter-pixel difference feature d3 obtained in step S211 is set to a variable m3 in step S213. The product of the weight $\alpha_4$ and the inter-pixel difference feature d4 obtained in step S215 is set to a variable m4 in step S217.

Furthermore, the logical product of the variable c1 obtained in step S204 and the variable m1 obtained in step S205 is set to a variable a1 in step S206. The logical product of the variable c2 obtained in step S208 and the variable m2 obtained in step S209 is set to a variable a2 in step S210. The logical product of the variable c3 obtained in step S212 and the variable m3 obtained in step S213 is set to a variable a3 in step S214. The logical product of the variable c4 obtained in step S216 and the variable m4 obtained in step S217 is set to a variable a4 in step S218.

Then, in step S219, the evaluation value s is updated by adding the variables a1, a2, a3, and a4 obtained in steps S206, S210, S214, and S218, respectively.

In step S220, it is determined whether the variable s is less than the termination threshold $R_t(t+3)$. When the variable s is not less than the termination threshold $R_t(t+3)$, it is determined in step S221 whether the value of the variable t+3 is less than or equal to K. When the value of t+3 is not less than or equal to K, in step S222, the value of t is incremented by 4.

The process then returns to steps S203, S207, S211, and S215, and subsequent steps are repeated.

When it is determined in step S220 that the evaluation value s is less than the termination threshold $R_t(t+3)$, step S221 is skipped, and the process is exited.

As described above, in the process described above, steps S203 to S206, steps S207 to S210, steps S211 to S214, and steps S215 to S218 are executed in parallel, for example, by single instruction multiple data (SIMD) instructions.

This allows even quicker processing.

FIGS. 29A to 29D schematically show examples of specific values used in the process shown in FIG. 28.

FIG. 29A shows processing in steps S204, S208, S212, and S216. That is, the inter-pixel difference features d1 to d4 are compared with 0, and 0xffff is set to the variables c1 to c4 when the inter-pixel difference features d1 to d4 are greater than 0 while otherwise 0 is set to the variables c1 to c4, respectively.

FIG. 29B shows processing in steps S205, S209, S213, and S217. The weights $\alpha_1$ to $\alpha_4$ are multiplied by the inter-pixel difference features d1 to d4 to obtain $\alpha_1 \times d1$, $\alpha_2 \times d2$, $\alpha_3 \times d3$, and $\alpha_4 \times d4$, which are set to the variables m1 to m4, respectively.

FIG. 29C shows processing in steps S206, S210, S214, and S218. The logical product of $\alpha_1 \times d1$ and 0xffff, the logical product of $\alpha_2 \times d2$ and 0, the logical product of $\alpha_3 \times d3$ and 0, and the logical product of $\alpha_4 \times d4$ and 0xffff are calculated, yielding $\alpha_1 \times d1$, 0, 0, and $\alpha_4 \times d4$, which are set to the variables a1 to a4, respectively.

FIG. 29D shows addition of the variables a1 to a4 in step S219. In this example, the sum of $\alpha_1 \times d1$, 0, 0, and $\alpha_4 \times d4$ is calculated as the sum of the variables a1 to a4.

Next, an embodiment in which faces were actually detected as objects of interest will be described. It is to be understood that objects of interest are not limited to faces, and it is possible to detect any objects of interest as long as the objects of interest have two-dimensional features so that classification thereof based on inter-pixel difference features is possible to a certain extent (weak classifiers can be constructed), such as logotypes or images of objects other than human faces.

Figure 30B:
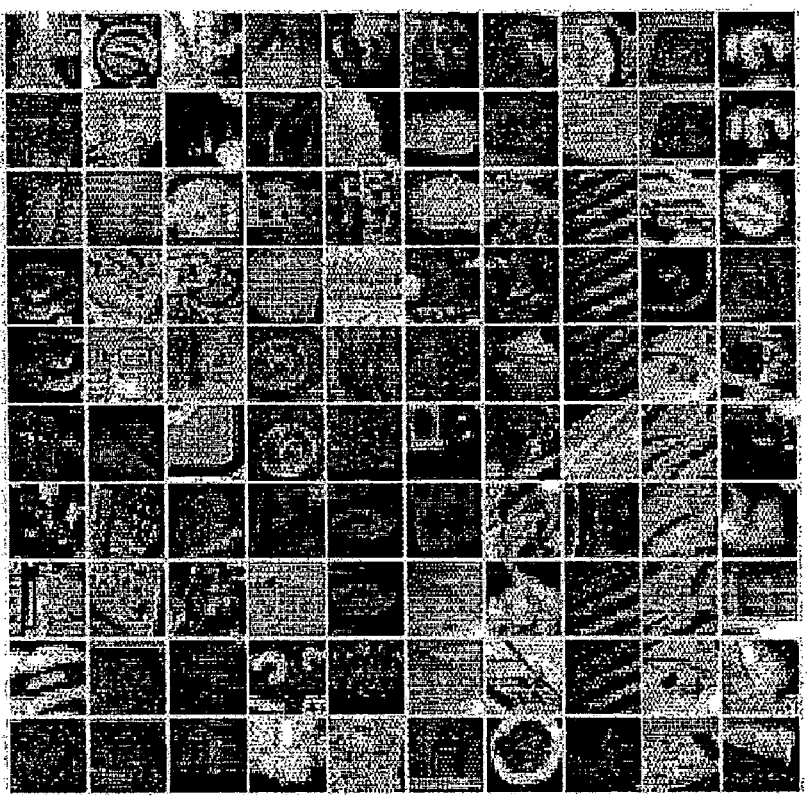
FIGS. 30A and 30B are diagrams showing a set of face images labeled as objects of interest and a set of non-face images labeled as objects not of interest.
Figure 30A:
Figure 31C:
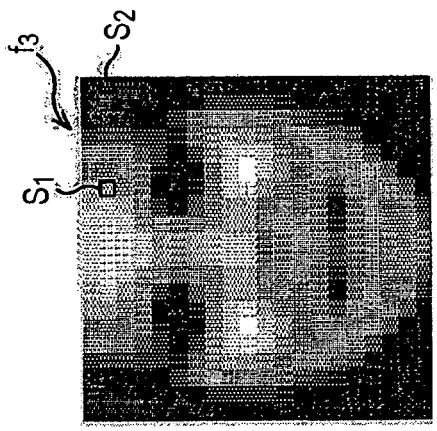
FIGS. 31A to 31F are diagrams for explaining specific examples of classifiers.
Figure 31B:
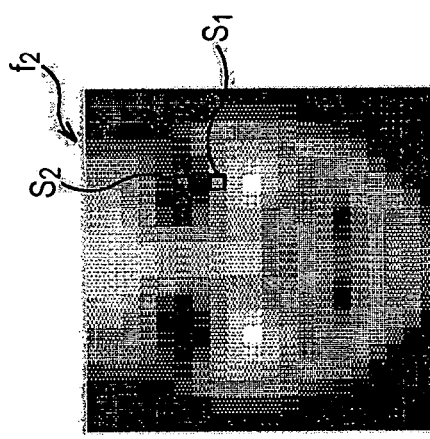
Figure 31A:
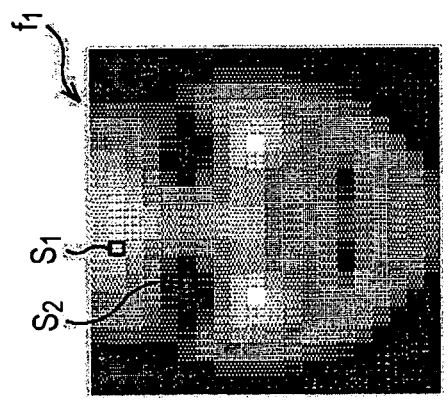
Figure 31F:
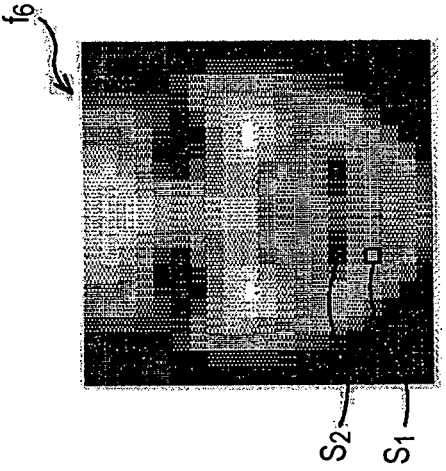
Figure 31E:
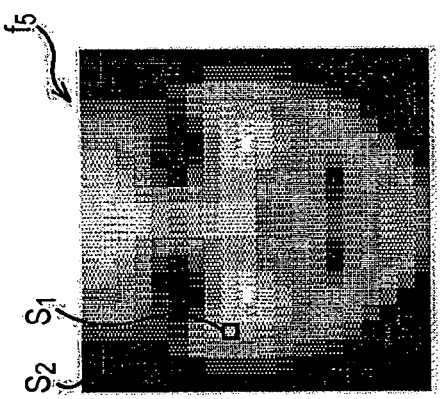
Figure 31D:
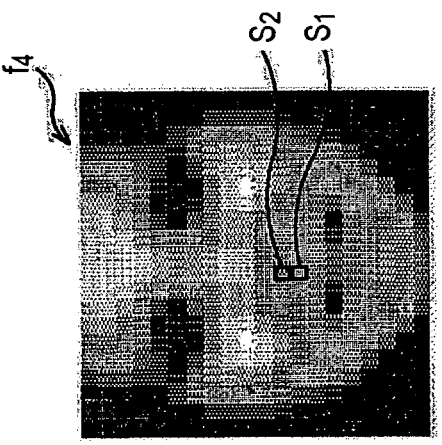

FIGS. 30A and 30B are diagrams showing some learning examples used in this embodiment. The learning samples include a set of face images shown in FIG. 30A, labeled as objects of interest (positive samples), and a set of non-face images shown in FIG. 30B, labeled as objects not of interest (negative samples). FIGS. 30A and 30B show some of the images used as learning samples. As the learning samples, for example, several thousand face images and several ten thousand non-face images are used, each of these images consisting of, for example, 24×24 pixels.

In this embodiment, a face classification problem based only on expression (3) given earlier was learned according to the algorithm shown in FIGS. 16 and 20. FIGS. 31A to 31F show first to sixth weak classifiers generated by the learning, which presumably well represent features of faces. Qualitatively speaking, a weak classifier $f_1$ shown in FIG. 31A indicates that the forehead (S1) is brighter than an eye (S2) (threshold: 18.5). A weak classifier $f_2$ shown in FIG. 31B indicates that the cheek (S1) is brighter than an eye (S2) (threshold 17.5). A weak classifier $f_3$ shown in FIG. 31C indicates that the forehead (S1) is brighter than the hair (S2) (threshold: 26.5). A weak classifier $f_4$ shown in FIG. 31D indicates that the region below the nose (S1) is brighter than the nasal cavity (S2) (threshold: 5.5). A weak classifier $f_5$ shown in FIG. 31 indicates that the cheek (S1) is brighter than the hair (S2) (threshold: 22.5). A weak classifier $f_6$ shown in FIG. 31F indicates that the jaw (S1) is brighter than the lip (S2) (threshold: 4.5).

In this embodiment, a correct classification ratio (performance on the learning samples) of 70% was achieved by the first weak classifier $f_1$, and a correct classification ratio of 80% is achieved by using all the weak classifiers $f_1$ to $f_6$. A correct classification ratio of 90% was achieved by using a combination of 40 weak classifiers, and a correct classification ratio of 99% was achieved by using a combination of 765 weak classifiers.

Figure 32B:
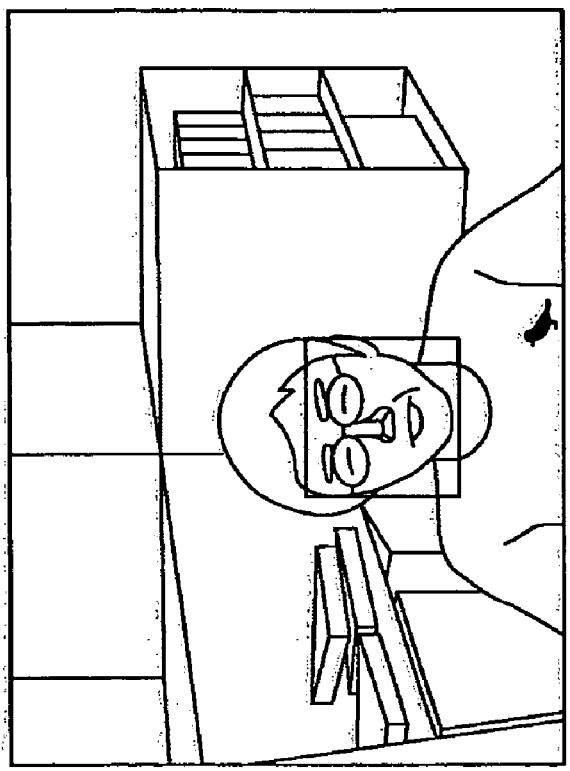
FIGS. 32A and 32B are diagrams for explaining overlapping regions
Figure 32A:
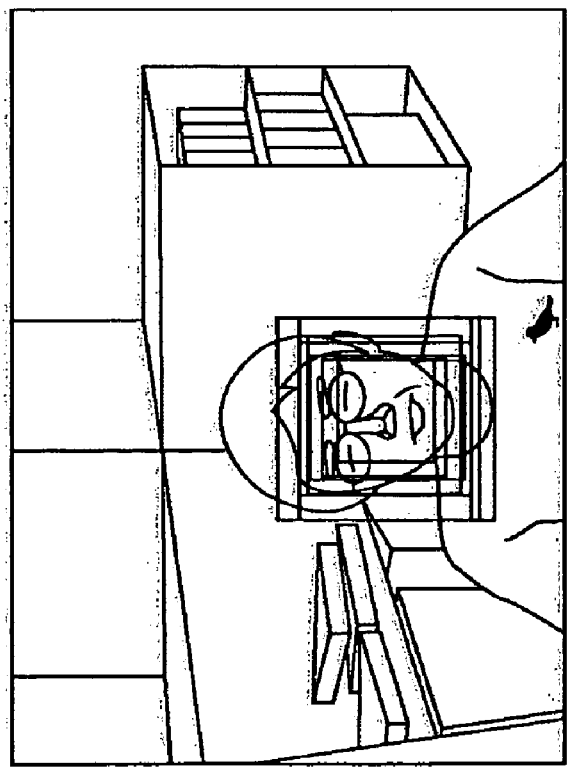

FIGS. 32A and 32B show results of detecting a face from an input image, before and after an overlapping region is removed. A plurality of frames shown in FIG. 32A corresponds to a face (object of interest) detected, and a plurality of faces (regions) is detected from an image by steps S61 to S68 shown in FIG. 23. By removing overlapping regions in steps S69 to S71, a single face is detected. When a plurality of faces exists in an image, it is possible to detect the plurality of faces simultaneously. The face detection process in this embodiment can be executed very quickly, such that it is possible to detect faces from 30 input images per second using an ordinary personal computer, allowing face detection in moving images.

Next, results of discrimination based on AdaBoost, discrimination based on AdaBoost cascade, and discrimination based on AdaBoost reject learning (discrimination by weak classifiers learned by removing unneeded negative samples as shown in FIG. 16) will be described.

Figure 33:
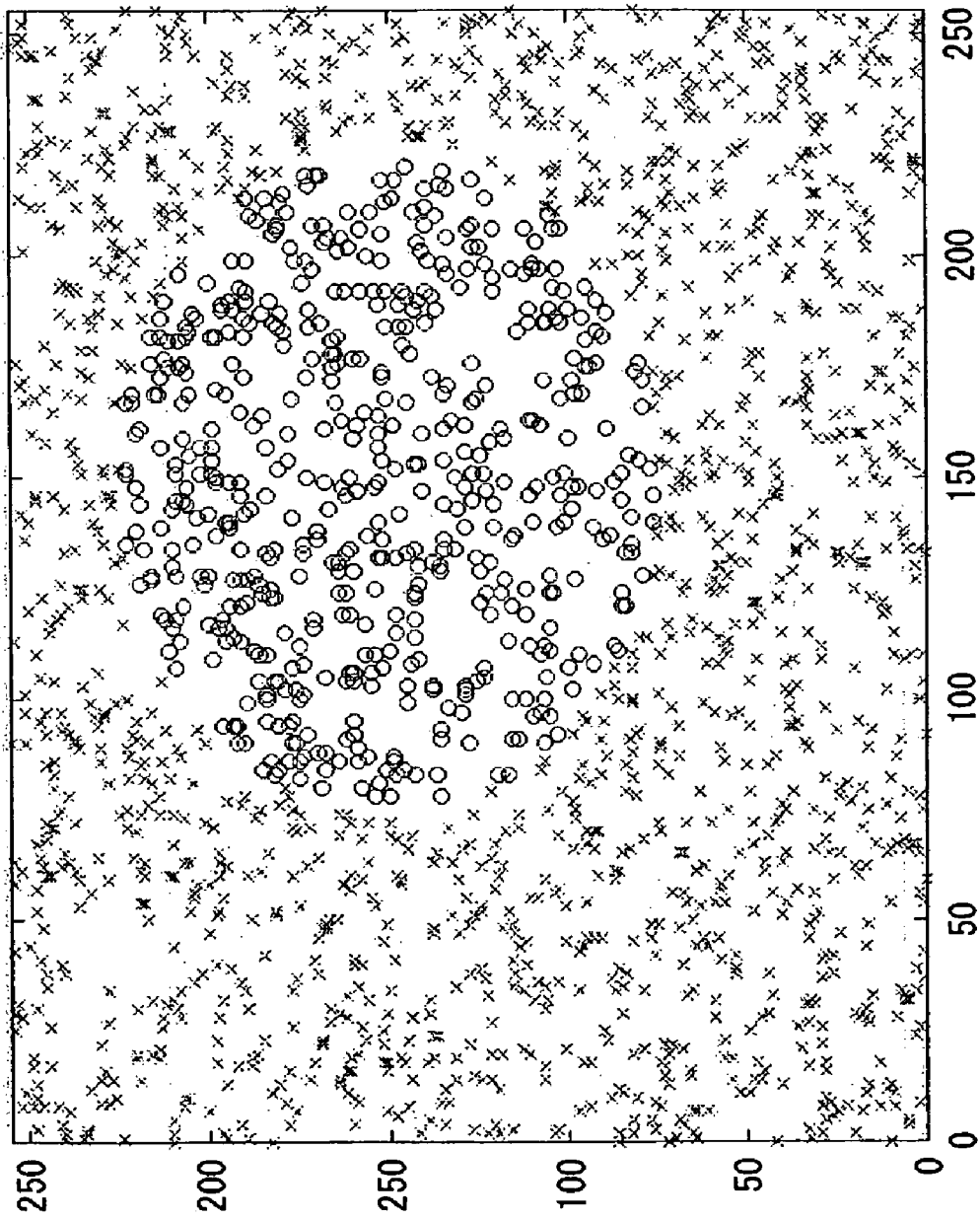
FIG. 33 is a diagram for explaining learning samples.

FIG. 33 shows learning samples used for discrimination experiments by these three methods. The horizontal axis and the vertical axis represent the pixel values $I_1$ and $I_2$, respectively, crosses represent negative samples, and circles represent positive samples.

Figure 34:
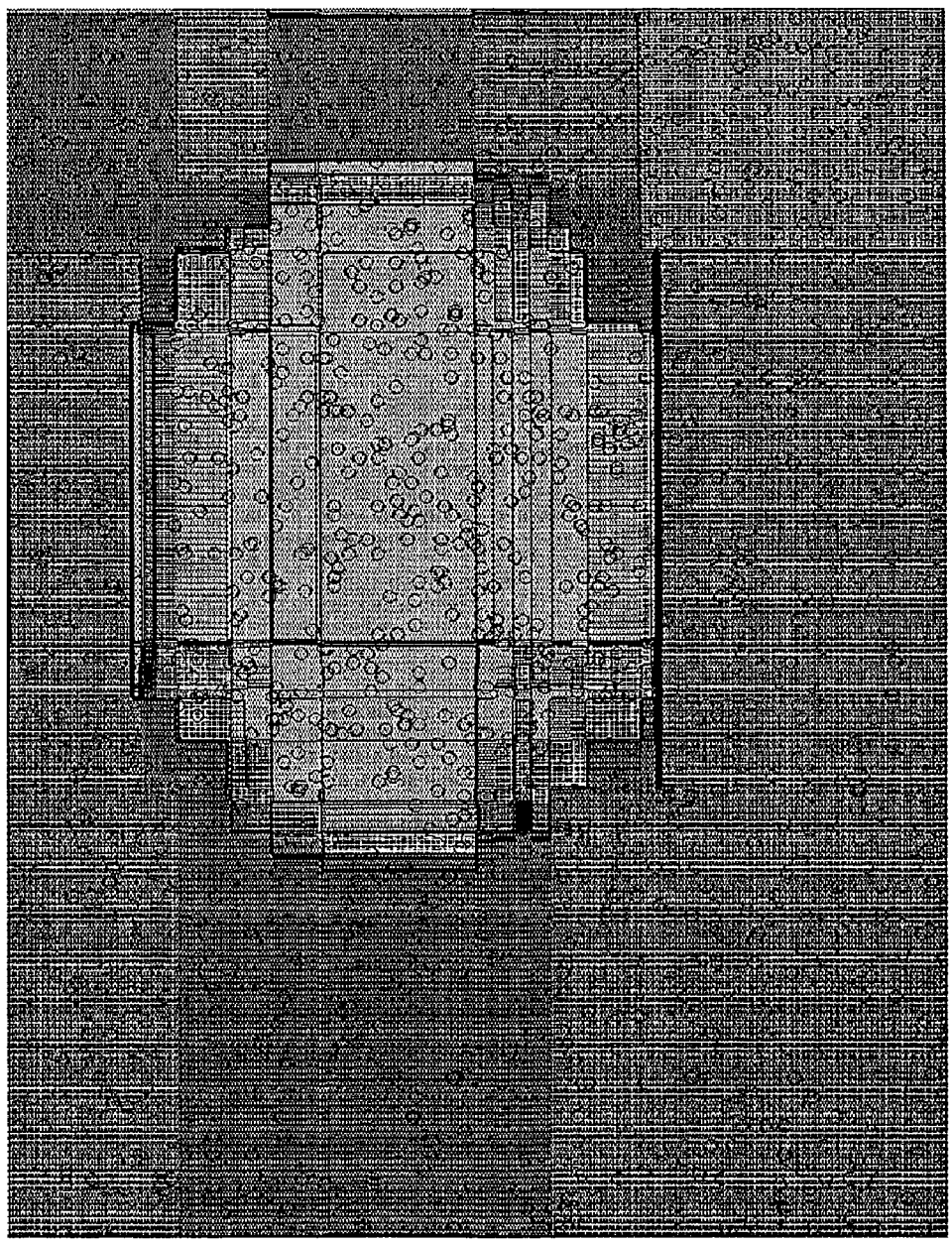
FIG. 34 is a diagram showing an example of results of discrimination based on AdaBoost reject learning.
Figure 35:
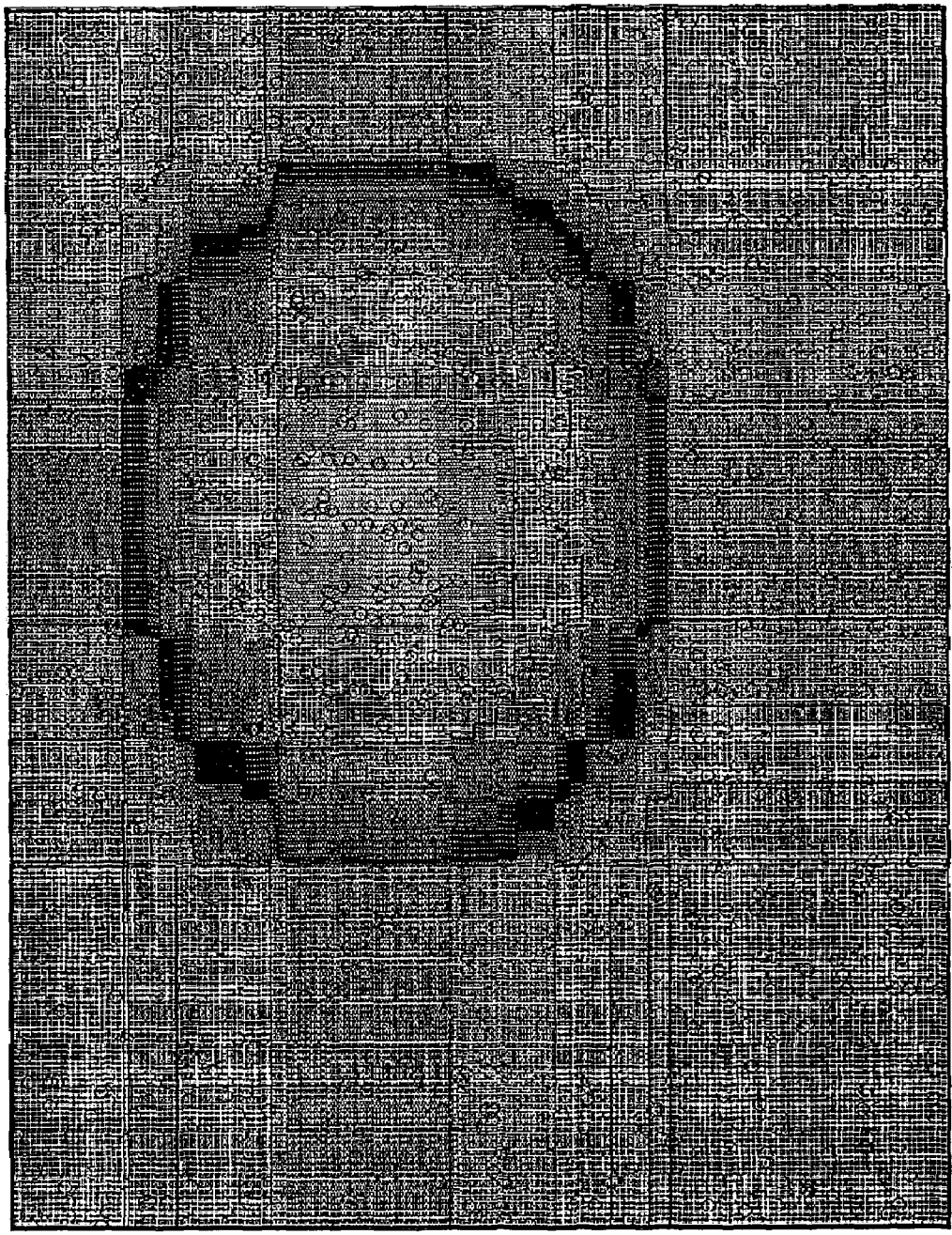
FIG. 35 is a diagram showing an example of results of discrimination based on AdaBoost.
Figure 36:
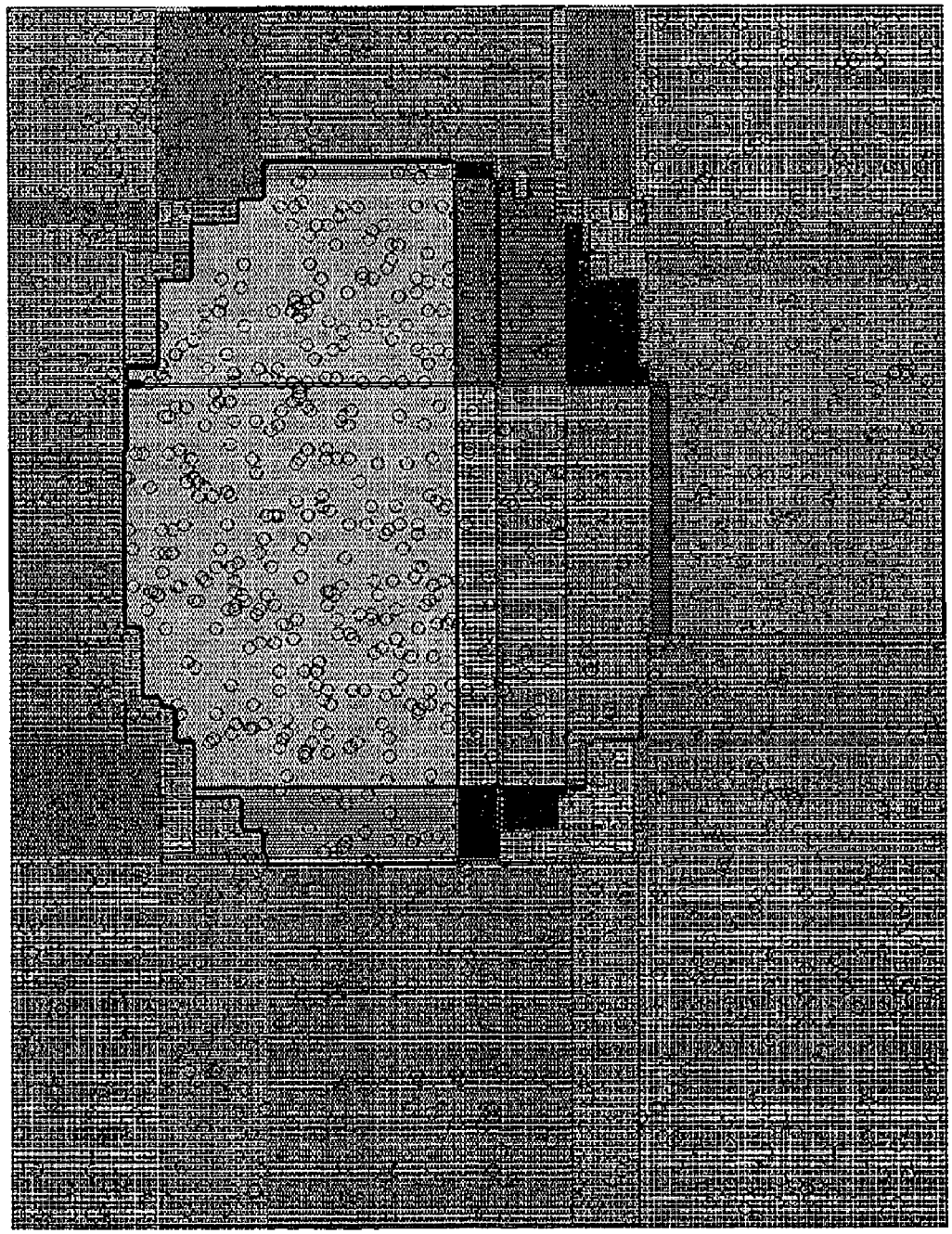
FIG. 36 is a diagram showing an example of results of discrimination based on AdaBoost cascade.

FIG. 34 shows results of discrimination based on AdaBoost reject learning. FIG. 35 shows results of discrimination based on AdaBoost. FIG. 36 shows results of discrimination based on AdaBoost cascade. Lines in FIGS. 34 to 36 represent threshold used for classification by the respective weak classifiers (boundaries between positive samples and negative samples). The value F(x) of weighted majority is greater in regions expressed as brighter. The brightest region is largest in the results of discrimination based on AdaBoost reject learning, shown in FIG. 34, indicating that discrimination was performed accurately.

FIG. 37 shows a comparison of results of experiments based on the three methods, i.e., AdaBoost, AdaBoost cascade, and AdaBoost reject learning. The total number of weak hypotheses indicates the number of weak classifiers needed to finish discrimination. The number is 405 in the case of AdaBoost, 253 in the case of AdaBoost cascade, and 117 in the case of AdaBoost reject learning, so that the number is smallest in the case of AdaBoost reject learning, i.e., discrimination is possible by a smallest number of weak classifiers.

The correct classification ratio (true positive) represents the ratio of correct classification for positive samples, which is preferably large. The incorrect classification ratio (false positive) represents the ratio of misclassifying negative samples as positive samples, which is preferably small. In AdaBoost learning, the ratio of correct classification is slightly lower but substantially the same compared with AdaBoost cascade, and the incorrect classification ratio is more favorable.

Regarding the number of times of evaluating weak hypotheses, the value on the left represents the average number of times of evaluating negative samples, and the value on the right represents the average number of times of evaluating positive samples.

In the case of AdaBoost, processing is not terminated based on a termination threshold, so that the number of times of evaluation is the same as the total number of weak hypothesis. In contrast, in the case of AdaBoost reject learning, the average number of times of evaluation for classifying a negative sample is 17.9, and the average number of times of evaluation for classifying a positive sample is 115.6. That is, in the case of AdaBoost reject learning, a negative sample can be classified by a smaller number of weak classifiers. In the case of AdaBoost cascade, the average number of times of evaluation for classifying a negative sample is 31.6, and the average number of times of evaluation for classifying a positive sample is 251.2.

The present invention is not limited to the embodiments described above, and various modifications are possible without departing from the spirit of the present invention. The present invention can be applied to information processing apparatuses including various image processing apparatuses for receiving and displaying moving pictures as well as still pictures.

The series of processes described above can be executed either by hardware or by software. For example, an object detecting apparatus can be implemented by a personal computer shown in FIG. 38.

Figure 38:
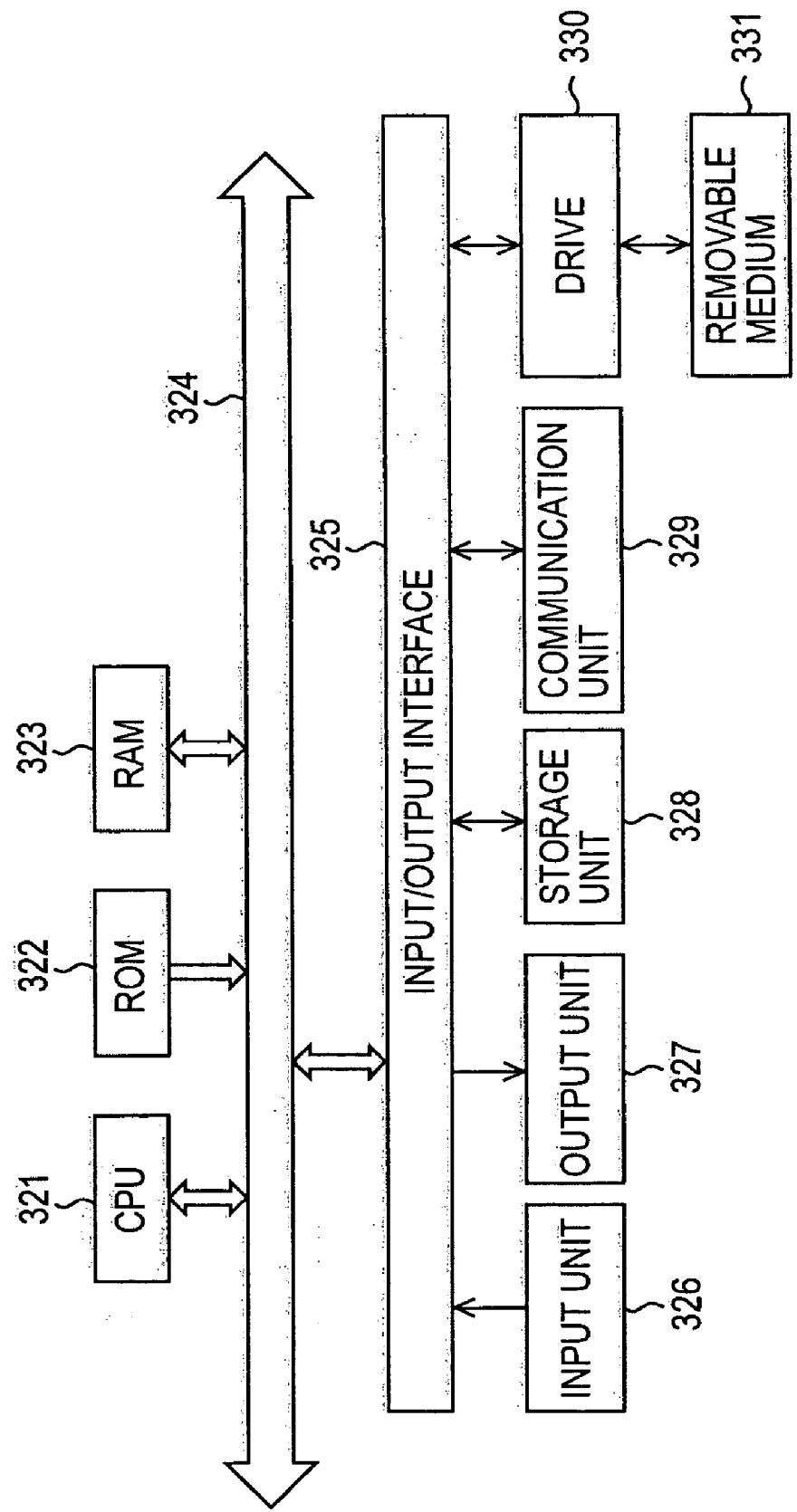
FIG. 38 is a block diagram showing an example construction of a personal computer.

Referring to FIG. 38, a central processing unit (CPU) 321 executes various processes according to programs stored in a read-only memory (ROM) 322 or programs loaded from a storage unit 328 into a random access memory (RAM) 323. The RAM 323 also stores data needed by the CPU 321 to execute various processes.

The CPU 321, the ROM 322, and the RAM 323 are connected to each other via a bus 324. The bus 324 is also connected to an input/output interface 325.

The input/output interface 325 is connected to an input unit 326, such as a keyboard and a mouse, a display, such as a cathode ray tube (CRT) display or a liquid crystal display (LCD), an output unit 327, such as a speaker, the storage unit 328, such as a hard disk, and a communication unit 329, such as a modem. The communication unit 329 carries out communications via networks including the Internet.

The input/output interface 325 is also connected to a drive 330 as needed. On the drive 330, a removable medium 331, e.g., a magnetic disk, an optical disk, a magneto-optical disk, or a semiconductor memory, is mounted as needed, and computer programs read therefrom are installed on the storage unit 328 as needed.

When the series of processes is executed by software, programs constituting the software are installed on a computer embedded in special hardware, or are installed from a recording medium or via a network to a general-purpose personal computer or the like that allows executing various functions with various programs installed thereon.

The programs may be recorded on a recording medium that is distributed separately from the computer to provide the programs to a user, for example, the removable medium 331 such as a magnetic disk (e.g., a floppy disk), an optical disk (e.g., a compact disk read-only memory (CD-ROM) or a digital versatile disk (DVD)), a magneto-optical disk (e.g., a mini disk (MD)), or a semiconductor memory, as shown in FIG. 38. Alternatively, the recording medium carrying the programs may be the ROM 322 or a hard disk included in the storage unit 328, provided to the user as included in the computer.

Steps that are executed according to the programs recorded on the recording medium need not necessarily be executed sequentially in the order described herein, and may include steps that are executed in parallel or individually.

In this specification, a system refers to the entirety of a plurality of apparatuses.

What is claimed is:

1. An information processing apparatus comprising:
   selecting means for selecting a weak classifier using data weights in each iteration of learning;
   reference-value calculating means for calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;
   removing means for removing some of the learning samples based on the reference value calculated;
   weight calculating means for calculating data weights based on the learning samples that have not been removed; and
   reflecting means for reflecting the data weights calculated by the weight calculating means on selection of a weak classifier by the selecting means in a next iteration of learning.

2. The information processing apparatus according to claim 1, wherein the reference-value calculating means accumulates values obtained by weighting positive results of classification by the weak classifiers by the confidences associated with the respective weak classifiers.

3. The information processing apparatus according to claim 1, wherein the reference-value calculating means calculates the cumulative sums in parallel.

4. The information processing apparatus according to claim 1, wherein the reference-value calculating means calculates a classification reference value that is used when discrimination is performed using the weak classifiers that have been learned, the reference-value calculating means also calculates a learning reference value that is less than the discrimination reference value, and the removing means removes learning samples with reference to the learning reference value.

5. The information processing apparatus according to claim 1, wherein the weak classifiers calculate results of classification based on a difference between a threshold and a difference between values of two pixels in image data of the learning samples.

6. An information processing method comprising:
   a selecting step of selecting a weak classifier using data weights in each iteration of learning;
   a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;

a removing step of removing some of the learning samples based on the reference value calculated;

a weight calculating step of calculating data weights based on the learning samples that have not been removed; and a reflecting step of reflecting the data weights calculated in the weight calculating step on selection of a weak classifier in the selecting step in a next iteration of learning.

7. A computer-readable medium having recorded thereon a computer-readable program comprising the steps of:

a selecting step of selecting a weak classifier using data weights in each iteration of learning;

a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;

a removing step of removing some of the learning samples based on the reference value calculated;

a weight calculating step of calculating data weights based on the learning samples that have not been removed; and a reflecting step of reflecting the data weights calculated in the weight calculating step on selection of a weak classifier in the selecting step in a next iteration of learning.

8. A program, stored on a computer-readable medium, that allows a computer to execute the steps of:

a selecting step of selecting a weak classifier using data weights in each iteration of learning;

a reference-value calculating step of calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;

a removing step of removing some of the learning samples based on the reference value calculated;

a weight calculating step of calculating data weights based on the learning samples that have not been removed; and a reflecting step of reflecting the data weights calculated in the weight calculating step on selection of a weak classifier in the selecting step in a next iteration of learning.

9. An information processing apparatus comprising:

a selecting unit configured to select a weak classifier using data weights in each iteration of learning;

a reference-value calculating unit configured to calculate a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;

a removing unit configured to remove some of the learning samples based on the reference value calculated;

a weight calculating unit configured to calculate data weights based on the learning samples that have not been removed; and a reflecting unit configured to reflect the data weights calculated by the weight calculating unit on selection of a weak classifier by the selecting unit in a next iteration of learning.

10. An information processing apparatus comprising:

detecting means for detecting an object of interest based on results of classification by a large number of hypotheses that are progressively generated in a learning process;

the learning process including:

a selecting means for selecting a weak classifier using data weights in each iteration of learning;

a reference-value calculating means for calculating a reference value based on cumulative sums that are calculated for respective learning samples, the cumulative sums being calculated by accumulating values obtained by weighting results of classification of the respective learning samples by weak classifiers that have been selected, the weighting being based on confidences associated with the respective weak classifiers, wherein the reference value is a termination threshold which is used to determine whether to perform calculation by a next weak classifier;

a removing means for removing some of the learning samples based on the calculated reference value;

a weight calculating means for calculating data weights based on the learning samples that have not been removed; and a reflecting means for reflecting the data weights calculated by the weight calculating means on selection of a weak classifier by the selecting means in a next iteration of learning.

* * * * *

UNITED STATES PATENT AND TRADEMARK OFFICE
CERTIFICATE OF CORRECTION

| | | |
|---|---|---|
| PATENT NO. | : 7,657,085 B2 | Page 1 of 1 |
| APPLICATION NO. | : 11/089229 | |
| DATED | : February 2, 2010 | |
| INVENTOR(S) | : Sabe et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this

Twenty-eighth Day of December, 2010

David J. Kappos
*Director of the United States Patent and Trademark Office*